(12) United States Patent
Flynn et al.

(10) Patent No.: US 11,058,215 B2
(45) Date of Patent: Jul. 13, 2021

(54) PRODUCT FOR HOLDING ITEMS AND METHOD FOR MAKING SAME

(71) Applicant: Nupur, LLC, Baltimore, MD (US)

(72) Inventors: Nupur Parekh Flynn, Baltimore, MD (US); Jennifer Ann Ewing, Easton, MD (US); Shannon Theresa Shingleton, Arnold, MD (US); Douglas Pemberton, Timonium, MD (US); Jeremy Asher Higgins, Kansas City, MO (US)

(73) Assignee: Nupur, LLC, Baltimore, MD (US)

( * ) Notice: Subject to any disclaimer, the term of this patent is extended or adjusted under 35 U.S.C. 154(b) by 0 days.

(21) Appl. No.: 15/930,909

(22) Filed: May 13, 2020

(65) Prior Publication Data

US 2021/0093078 A1    Apr. 1, 2021

Related U.S. Application Data

(60) Provisional application No. 62/907,822, filed on Sep. 30, 2019.

(51) Int. Cl.
*A47B 3/083* (2006.01)
*F16M 11/38* (2006.01)

(52) U.S. Cl.
CPC .............. *A47B 3/083* (2013.01); *F16M 11/38* (2013.01)

(58) Field of Classification Search
CPC ........... A47B 3/10; A47B 3/083; F16M 11/38
USPC .................. 108/169, 35, 36, 24, 34, 14, 132
See application file for complete search history.

(56) References Cited

U.S. PATENT DOCUMENTS

| | | | | |
|---|---|---|---|---|
| 875,195 | A | * | 12/1907 | Loftin ...................... A47B 3/10 190/12 R |
| 984,529 | A | * | 2/1911 | Bereman ................ A47B 3/087 108/35 |
| 1,154,692 | A | * | 9/1915 | Dehullu .................... A47B 3/04 108/34 |
| 1,270,730 | A | * | 6/1918 | Haydon .................... E03C 1/32 4/646 |
| 1,445,566 | A | * | 2/1923 | Stoll ...................... A47B 3/083 190/11 |
| 2,167,342 | A | * | 7/1939 | York ...................... A47B 3/083 108/35 |
| 2,233,202 | A | * | 2/1941 | Finch .................... A47B 3/087 108/35 |
| 2,311,798 | A | * | 2/1943 | Weber ...................... A47B 3/10 108/35 |
| 2,406,237 | A | * | 8/1946 | Milkoff .................... A47B 3/10 190/11 |
| 2,709,631 | A | * | 5/1955 | Covucci ................ A47B 3/087 108/36 |
| 2,762,554 | A | | 9/1956 | Burman |

(Continued)

OTHER PUBLICATIONS

Written Opinion cited in Application No. PCT/US2020/053494 dated Jan. 5, 2021.

(Continued)

*Primary Examiner* — Jose V Chen
(74) *Attorney, Agent, or Firm* — DLA Piper LLP (US)

(57) ABSTRACT

A product for holding an item. Enclosure shells can be connected together to form a v-shape surface to hold the item when opened. Legs can connect to the sides of the enclosure shells. The legs can be configured to hold up the v-shape surface platform when opened.

19 Claims, 118 Drawing Sheets

(56) References Cited

U.S. PATENT DOCUMENTS

| | | | | |
|---|---|---|---|---|
| 2,817,567 | A * | 12/1957 | Shepherdson | A47B 3/0911 108/132 |
| 2,862,777 | A | 12/1958 | Paige | |
| 3,227,106 | A * | 1/1966 | Waddell | A47B 43/02 108/14 |
| 3,476,456 | A | 11/1969 | Canavan | |
| 3,554,141 | A * | 1/1971 | Burr | A47B 3/0815 108/132 |
| 4,790,416 | A | 12/1988 | Baker | |
| D306,100 | S * | 2/1990 | Wende | 108/24 |
| 5,067,417 | A * | 11/1991 | Marmentini | A47B 3/083 108/130 |
| 6,148,895 | A | 11/2000 | Biggers | |
| 7,805,784 | B2 * | 10/2010 | Lemire | A61G 7/0509 5/611 |
| 8,188,410 | B2 * | 5/2012 | Dean | A47B 3/0911 219/452.13 |
| 8,490,551 | B1 * | 7/2013 | Wagner | A47B 31/04 108/25 |
| 2005/0031148 | A1 | 2/2005 | McNary | |
| 2005/0235886 | A1 * | 10/2005 | Koning | A47B 3/0818 108/132 |
| 2005/0247243 | A1 * | 11/2005 | Laws | A47B 3/0812 108/132 |
| 2009/0277320 | A1 | 11/2009 | Wallis | |
| 2010/0089407 | A1 | 4/2010 | Gardner et al. | |
| 2012/0042809 | A1 * | 2/2012 | Ensley | A47B 3/0815 108/132 |
| 2015/0083522 | A1 | 3/2015 | Chancler | |

OTHER PUBLICATIONS

International Search Report cited in Application No. PCT/US2020/053494 dated Jan. 5, 2021.

Image File Wrapper of U.S. Appl. No. 29/734,515, filed Feb. 24, 2021.

Image File Wrapper of U.S. Appl. No. 29/747,612, filed Feb. 24, 2021.

* cited by examiner

Components

- 2X Enclosure Shells (105)
- 4X Clips (110)
- 2X Legs (115)
- 2X Clasps (120)
- 4X Magnets (125)
- 2X Feet (not pictured) (130)
- 4X Springs (not pictured) (135)
- 4X Screws (not pictured) (140)

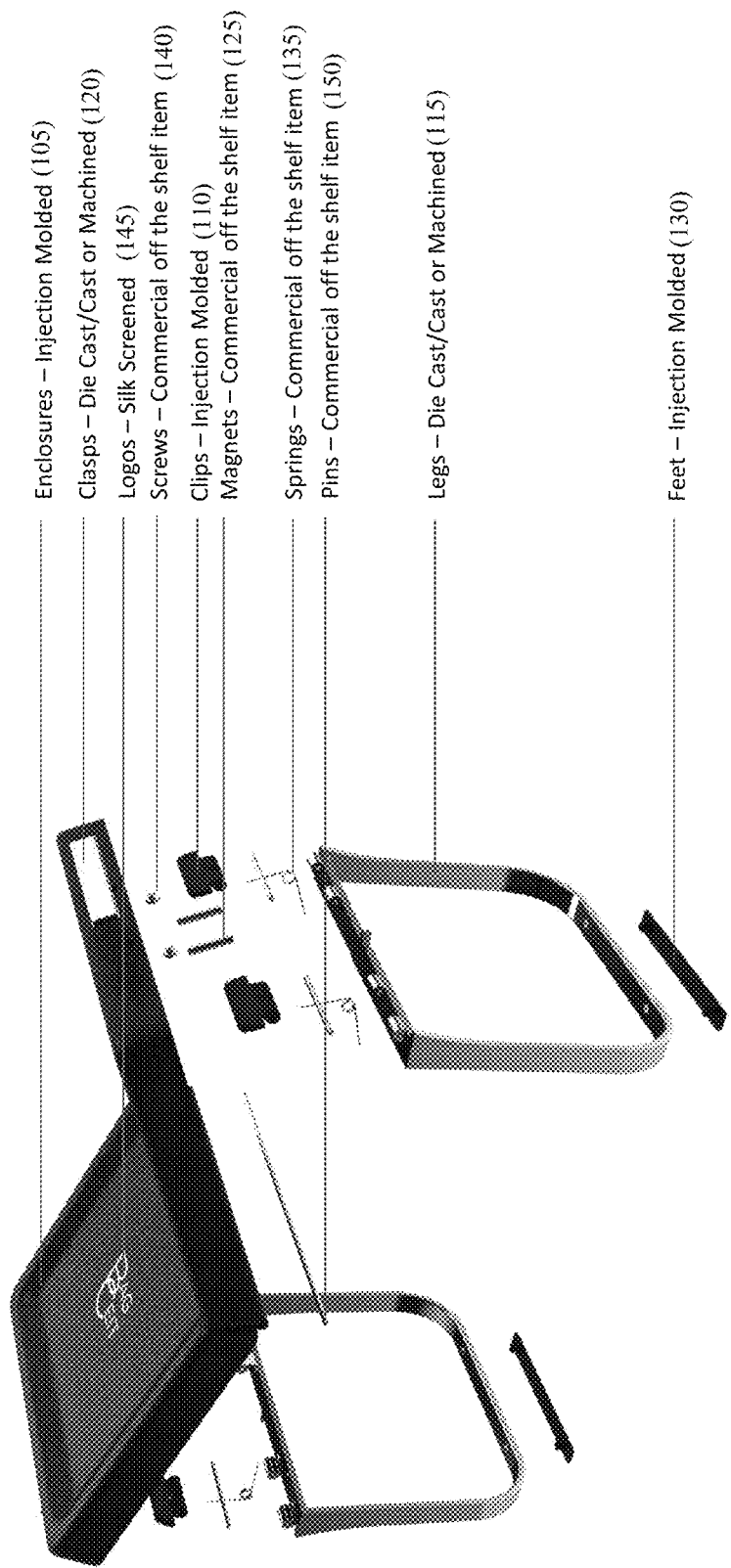

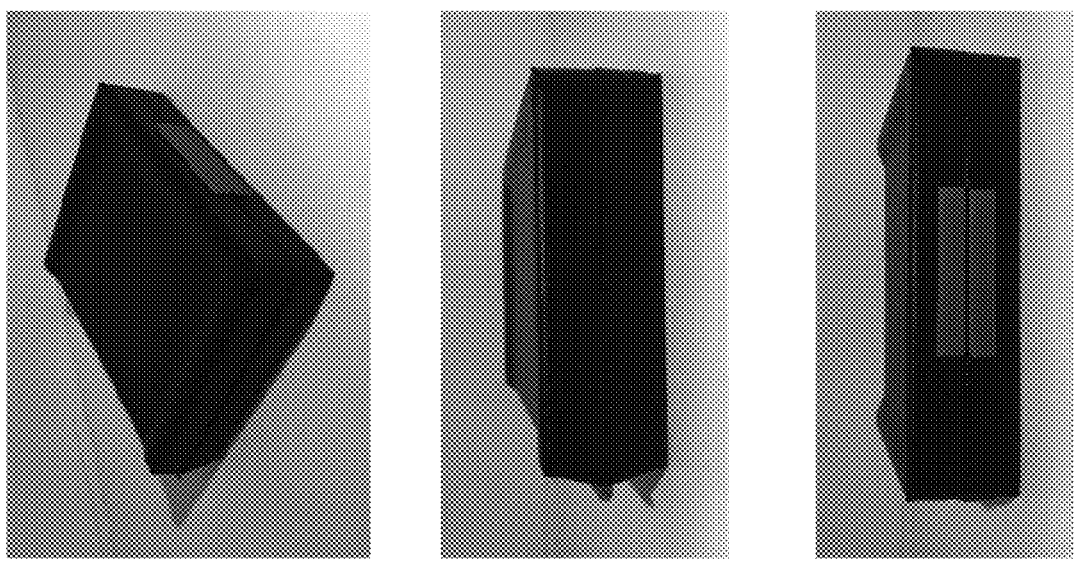
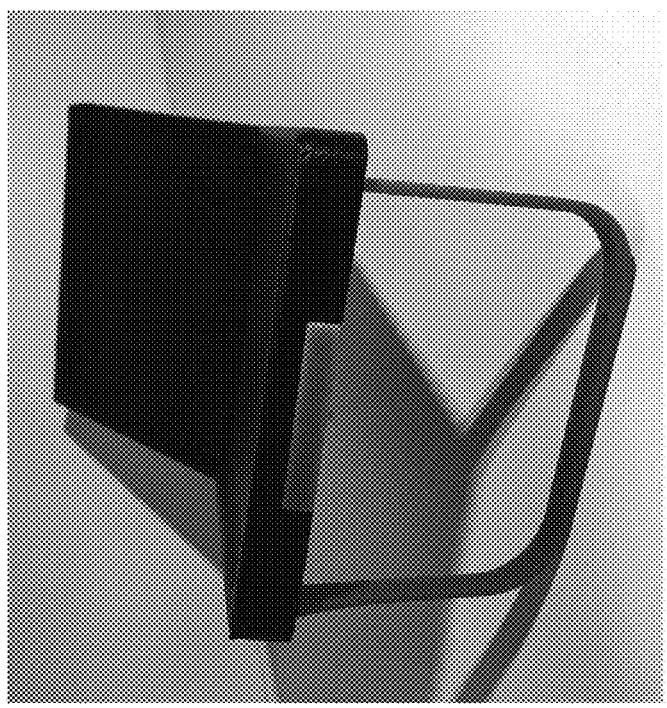
FIG. 2

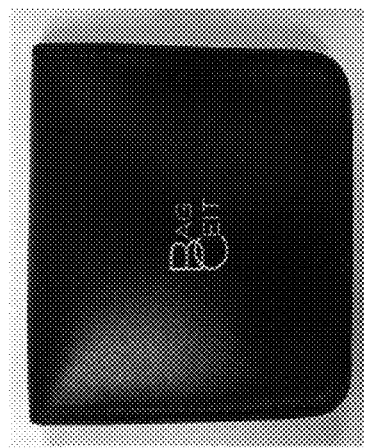
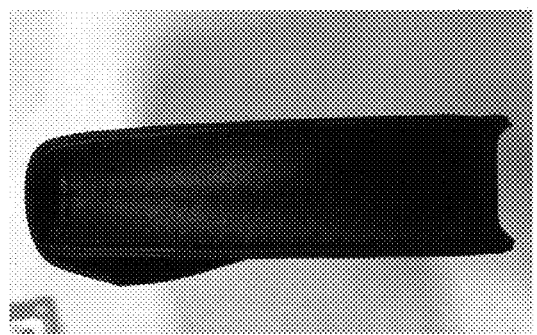
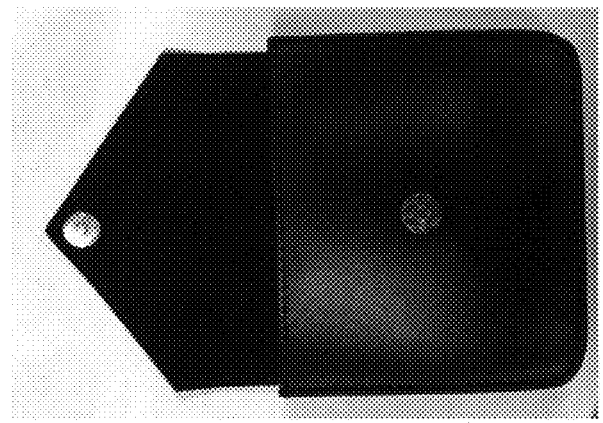
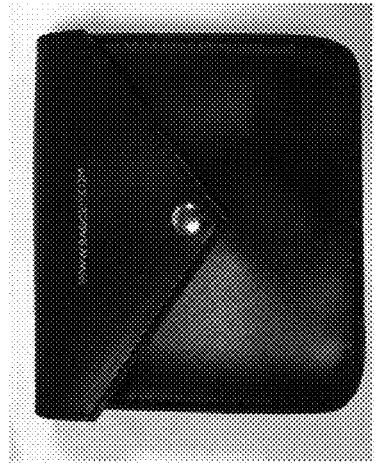
FIG. 4A

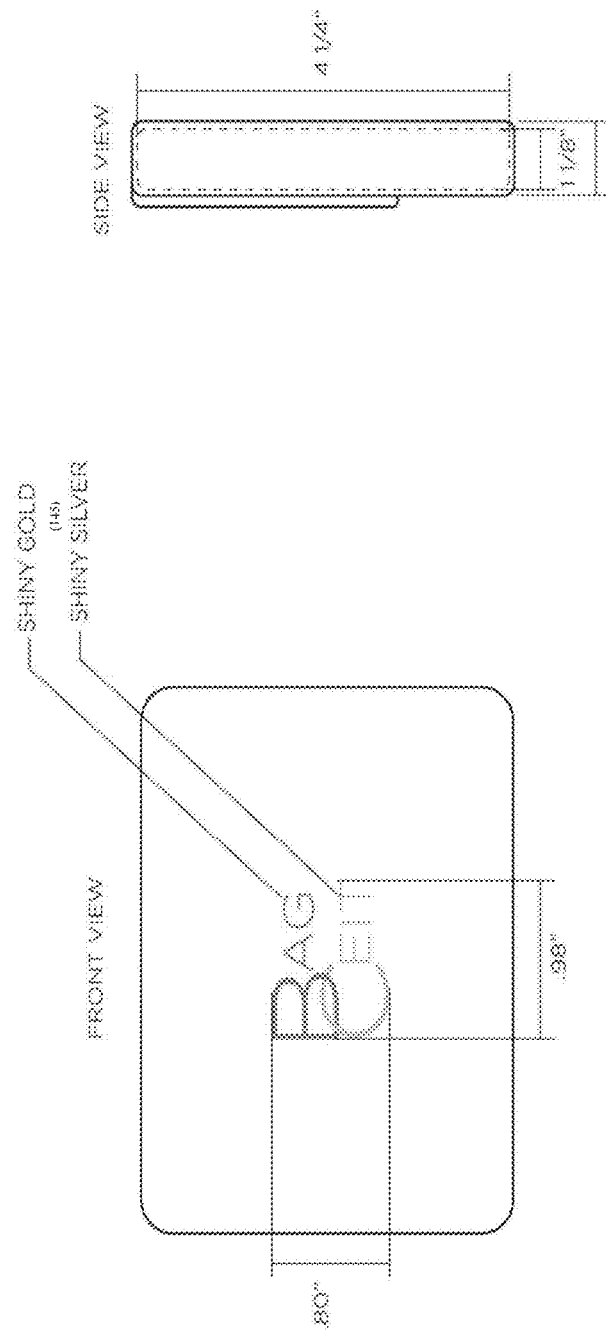
FIG. 4B
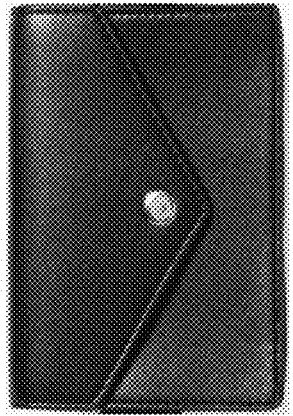

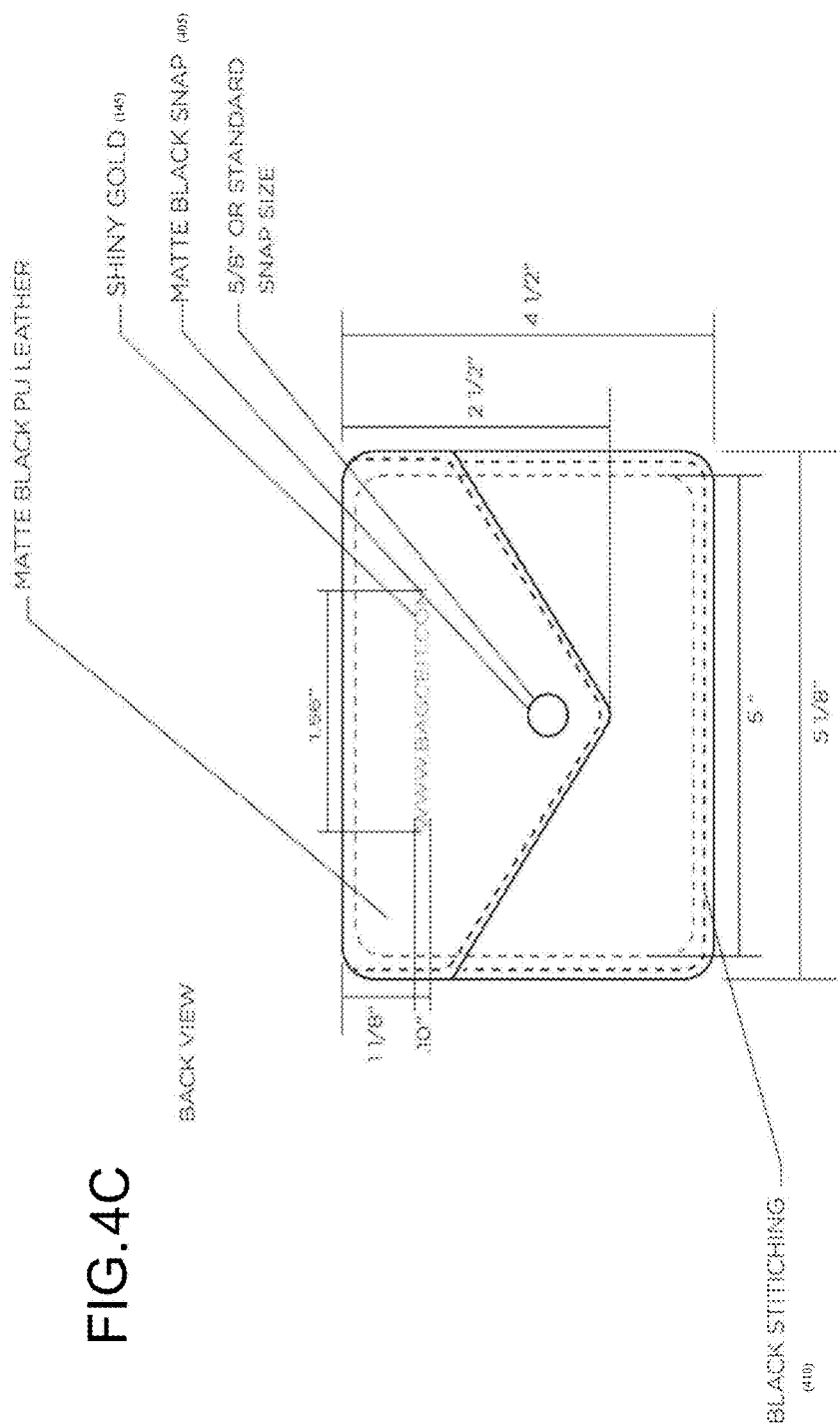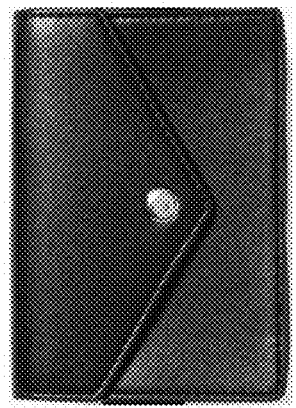
FIG. 4C

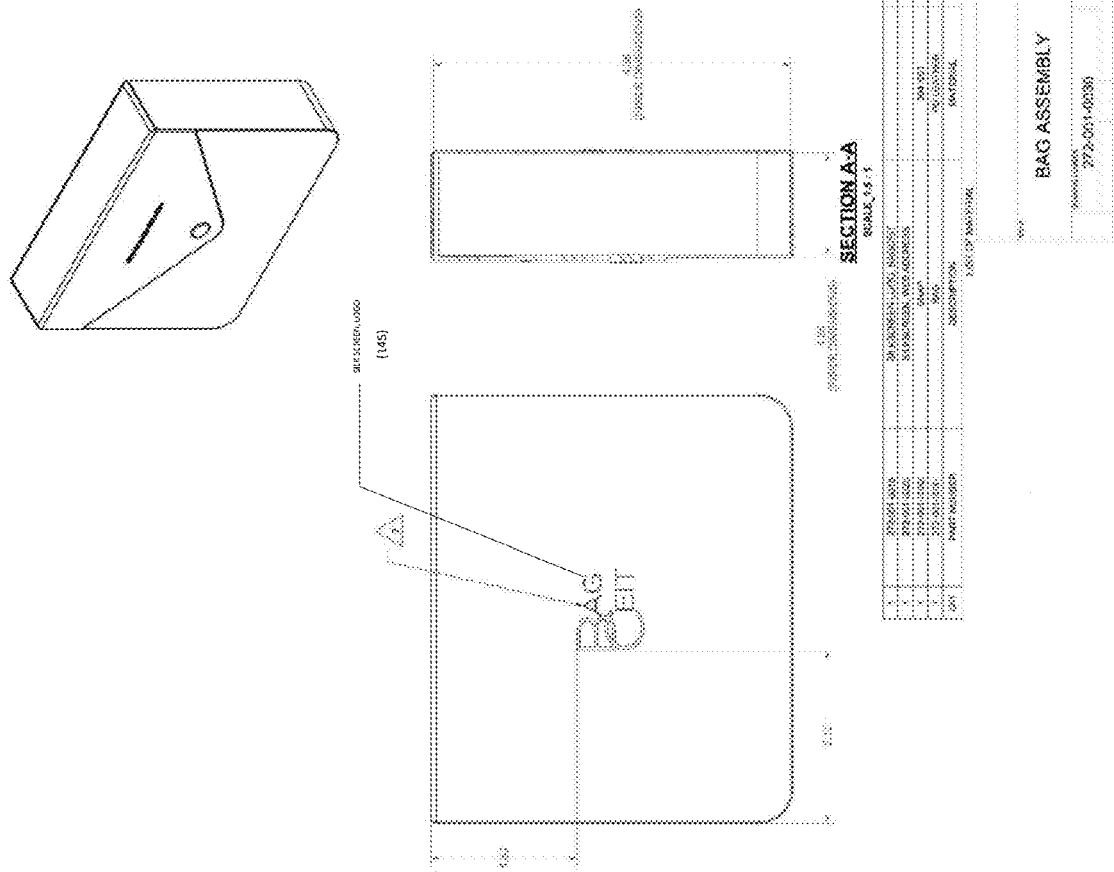
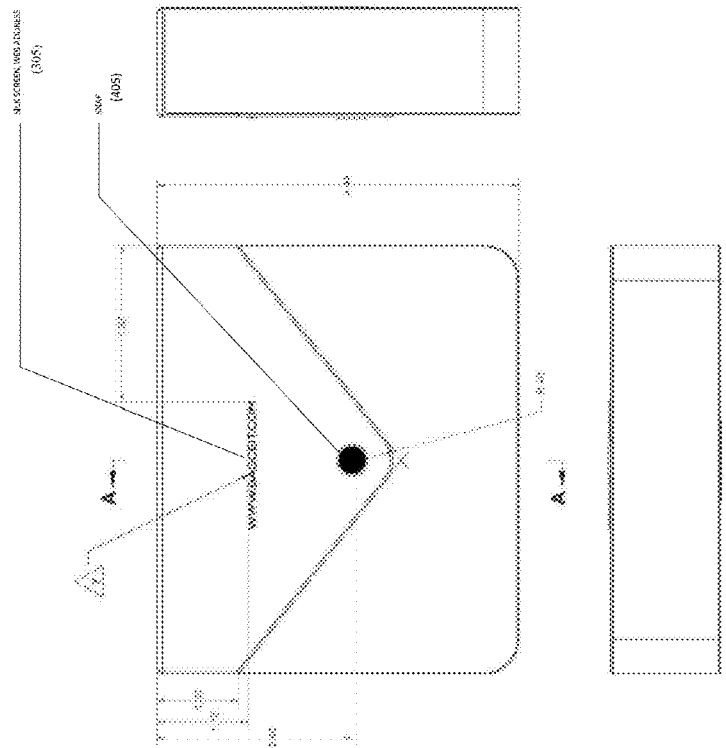
FIG. 4D

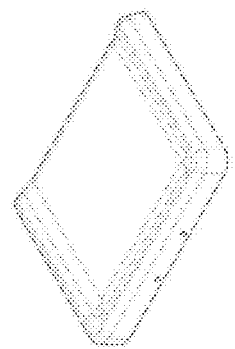
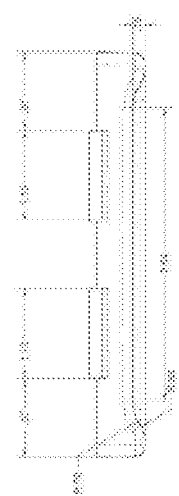
FIG. 7A

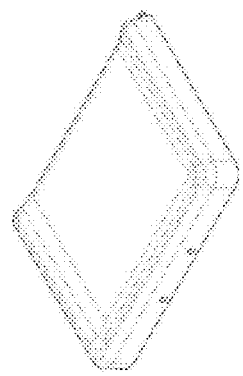
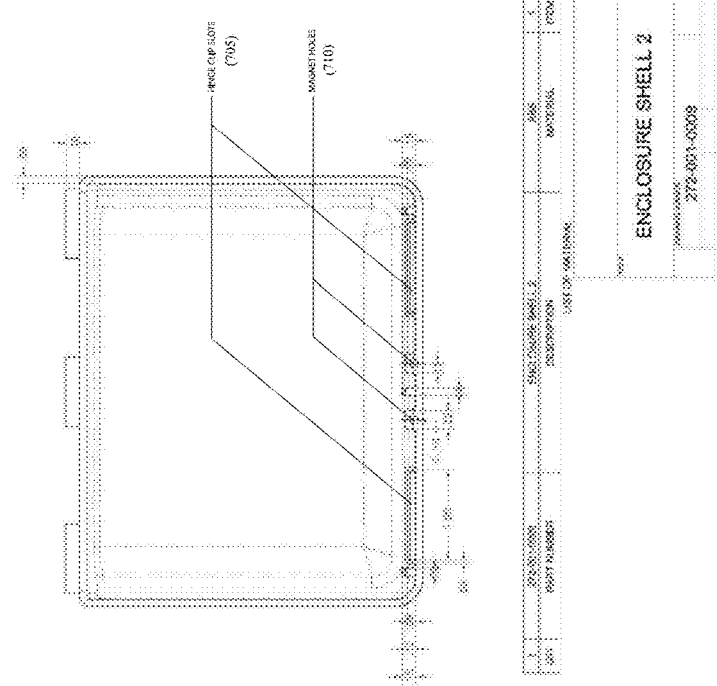
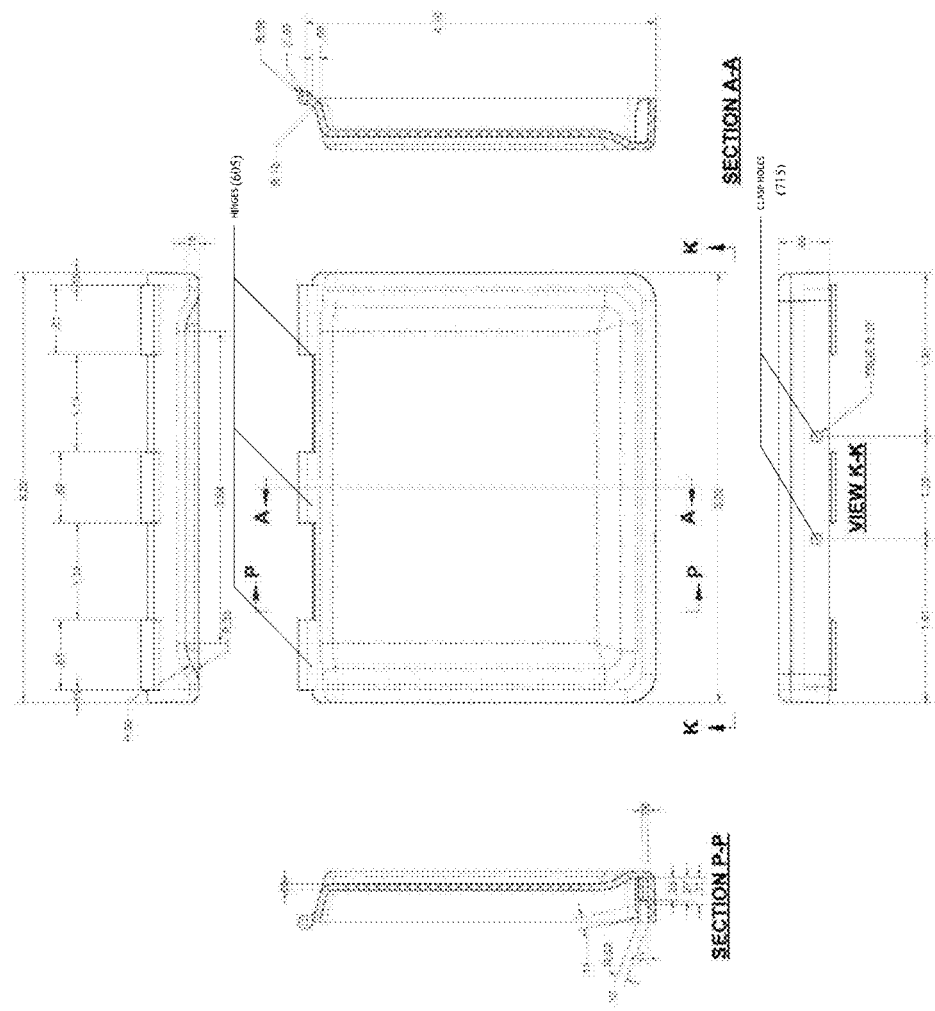
FIG. 7B

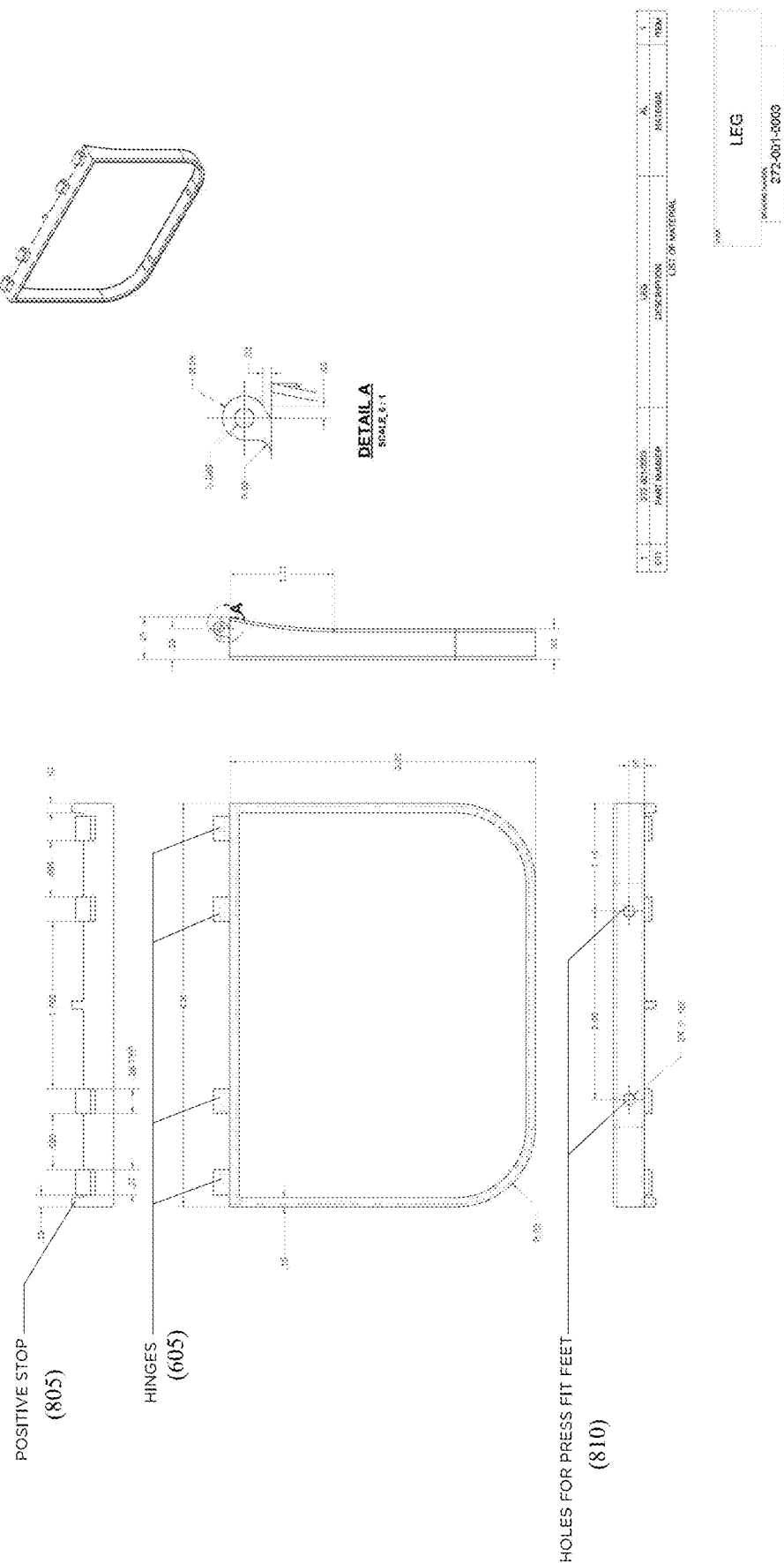

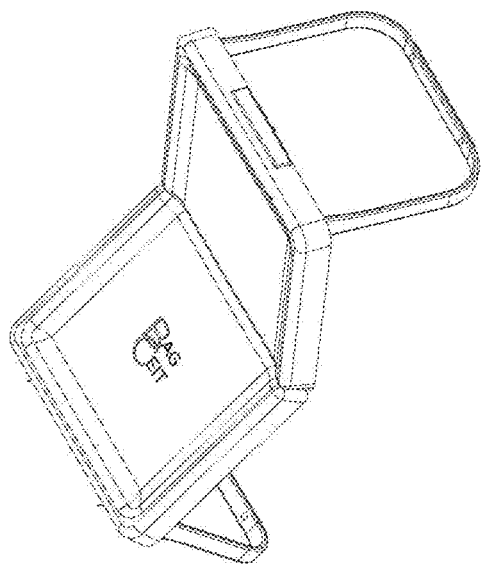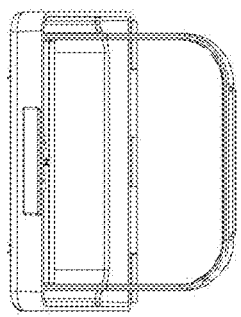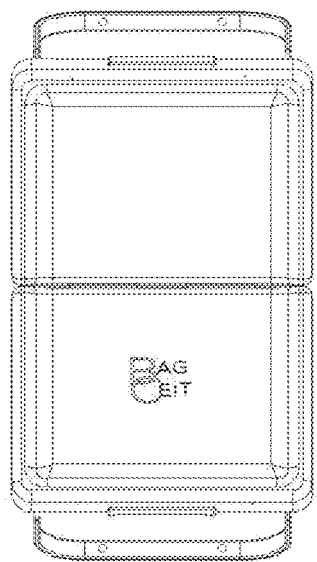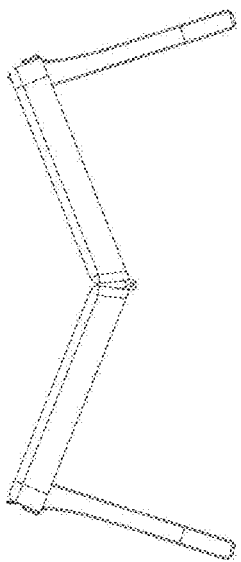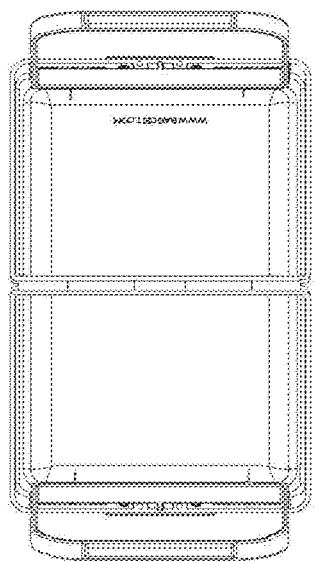
FIG. 8B

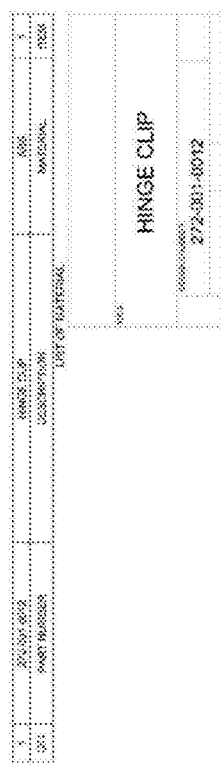
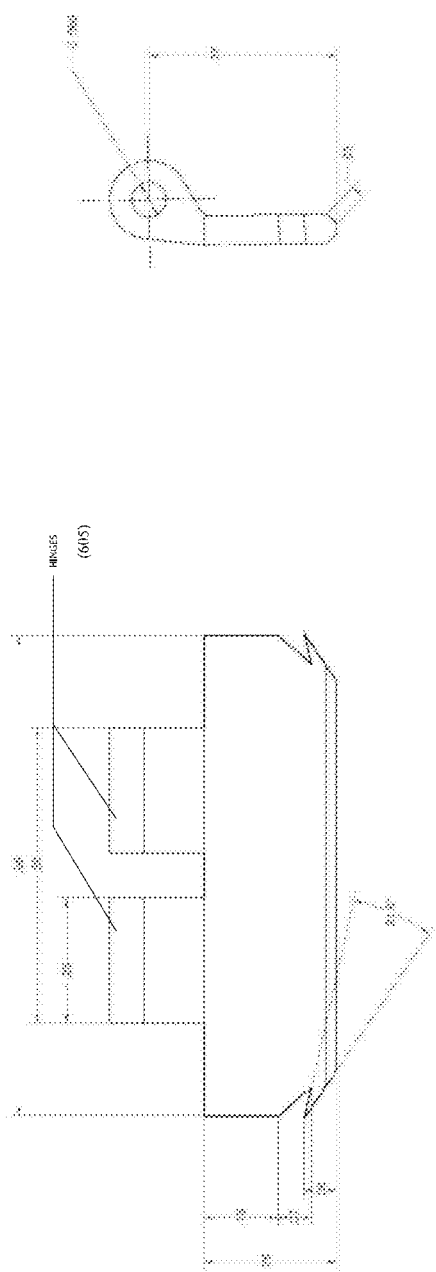
FIG. 9

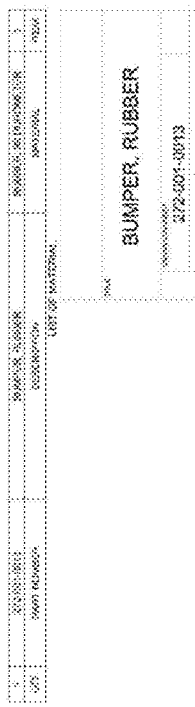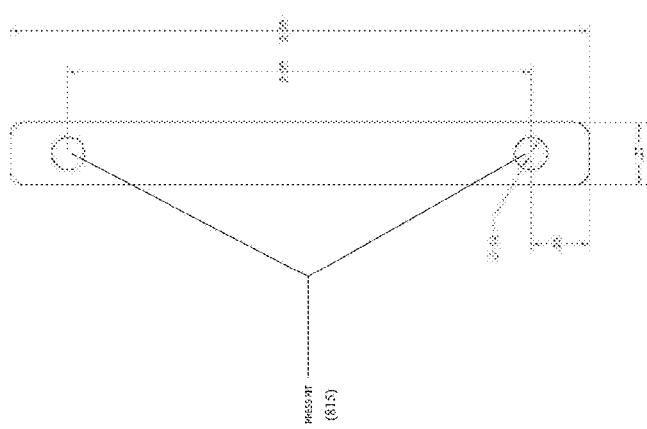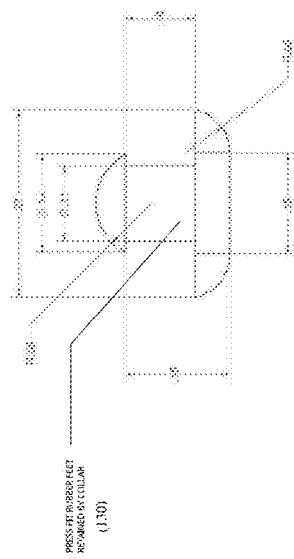
FIG. 10

FIG. 12A

Work Instructions

BAGCEIT

272-001-0001

| | |
|---|---|
| 1.0 | Purpose |
| 1.1 | This work instruction addresses the required tasks for the assembly of the BAGCEIT for Nupur (272-001) |
| 2.0 | Scope |
| 2.1 | This work instruction applies to the BAGCEIT assembly (272-001) |
| 3.0 | Records |
| 3.1 | n/a |
| 4.0 | Associated Documents |
| 4.1 | 213-001-9000 – Document List |
| 5.0 | Definitions |
| 5.1 | WIP: Work in Progress |
| 5.2 | QTY: Quantity |
| 6.0 | Responsibility |
| 6.1 | Production: Responsible for execution of tasks herein and reporting. |
| 6.2 | Quality: Responsible for inspection checks and trending of data to inform production |
| 7.0 | Tools, Fixtures, Gauges |
| 7.1 | Wire cutters |
| 7.2 | Phillips head screwdriver |
| 7.3 | Super Glue |
| 7.4 | Metal File |
| 7.5 | Mallet / Hammer |
| 7.6 | Tape Measure |
| 8.0 | Safety Requirements |
| 8.1 | Protective eye wear |

FIG. 12B 8.2 Gloves

9.0 Instructions – General assembly

9.1 Retrieve all necessary materials and prepare for assembly. Refer to figure 1 for all materials.

*Figure 1: BAGCEIT BOM*

| REF # | QTY | PART NUMBER | DESCRIPTION | MATERIAL |
|---|---|---|---|---|
| 1-1 | 1 | 272-001-0002 | ENCLOSURE SHELL 1 | ABS |
| 1-2 | 1 | 272-001-0009 | ENCLOSURE SHELL 2 | ABS |
| 1-3 | 2 | 272-001-0003 | LEG | ALUMINIUM |
| 1-4 | 1 | 272-001-00011 | PIN, LONG | SST |
| 1-5 | 4 | 272-001-0012 | HINGE CLIP | ABS |
| 1-6 | 2 | 272-001-0013 | BUMPER | RUBBER |
| 1-7 | 4 | 272-001-0014 | PIN, SHORT | SST |
| 1-8 | 2 | 272-001-0018 | CLASP | SST |
| 1-9 | 4 | 91772A503 | PAN HEAD SCREW, 2-56 X .06 LG | SST |
| 1-10 | 4 | 9271K13 | SPRING, TORSION, LH. 16OD | MUSIC-WIRE STEEL |
| 1-11 | 4 | DH18 | MAGNET | SST |
| 1-12 | 4 | 272-001-0031 | SUPER GLUE | GLUE |

9.2 Cut (1) long pin (1-4) to 4.75" cut (4) short pins (1-7) to 1.125" using wire cutters. Remove all burrs and sharp edges with a metal file. File down the pin so that both ends have flat faces.

FIG. 12C 9.3 Line up the long hinge of Enclosure shell 1 (1-1) and Enclosure shell 2 (1-2) and secure together by inserting (1) long pin (1-4) with a hammer or mallet. NOTE: Before inserting the pin, test fit the pin in the hinge to ensure that it will be flush with the out ends of the hinge. No part of the pin should be sticking out. If required, file down the pin until it is the correct size.

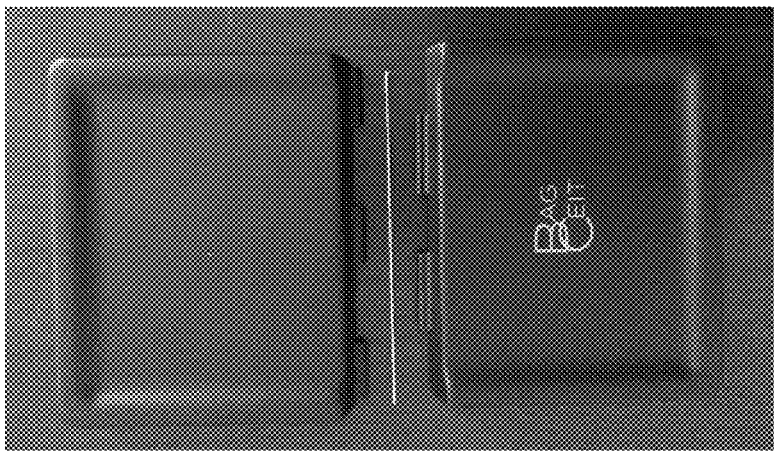

9.4 Add 1 small drop of super glue into each designated magnet holes (2) in enclosure shell 1 (1-1). Before the glue dries, insert (2) magnets (1-11) into the magnet holes. Use a hammer or mallet and gently tap down until they are fully seated inside the holes.

FIG. 12D 9.5  each of the installed magnets (4), orient and test with another magnet to find which end will ATTRACT to the already installed magnet. This test magnet should now be installed directly across into enclosure shell 2 (1-2) with the same procedure as step 9.4, ensuring that the side that attracted is facing up out of the hole.

9.6  Install (1) clasp (1-8) onto the side of enclosure shell 1 (1-1) using (2) pan head screws (1-9). Repeat for enclosure shell 2 (1-2)

9.7  Insert (1) Bumper (1-6) into holes at bottom of (1) leg (1-3). Repeat this process to create (2) legs with bumpers.

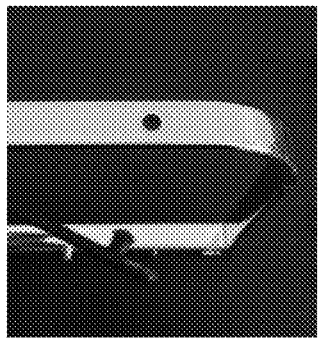 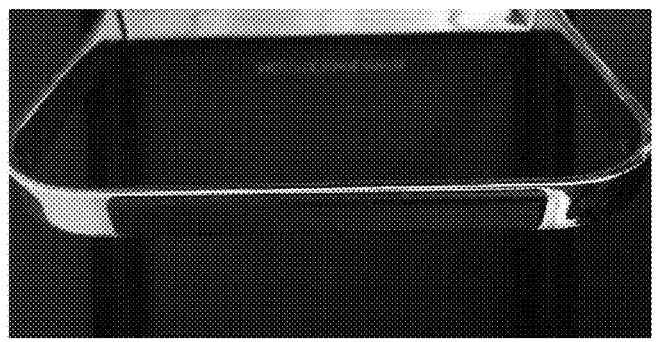

FIG. 12E 9.8 Place (1) Leg (1-3) flat side down onto a table. Install (2) Hinge clips (1-5) with the flat side facing up using (1) short pin (1-7) per hinge. With the pin partly installed, slide a torsion spring in the middle of the hinge clip so that the pin secures it in place. Ensure that the torsion spring is installed with one end facing down and flush with the side of the leg. Trim the torsion spring with wire cutters so that the top end is flush with the hinge clip and the bottom end doesn't extend beyond the flat face of the leg (1-3). Repeat to create (2) leg assemblies

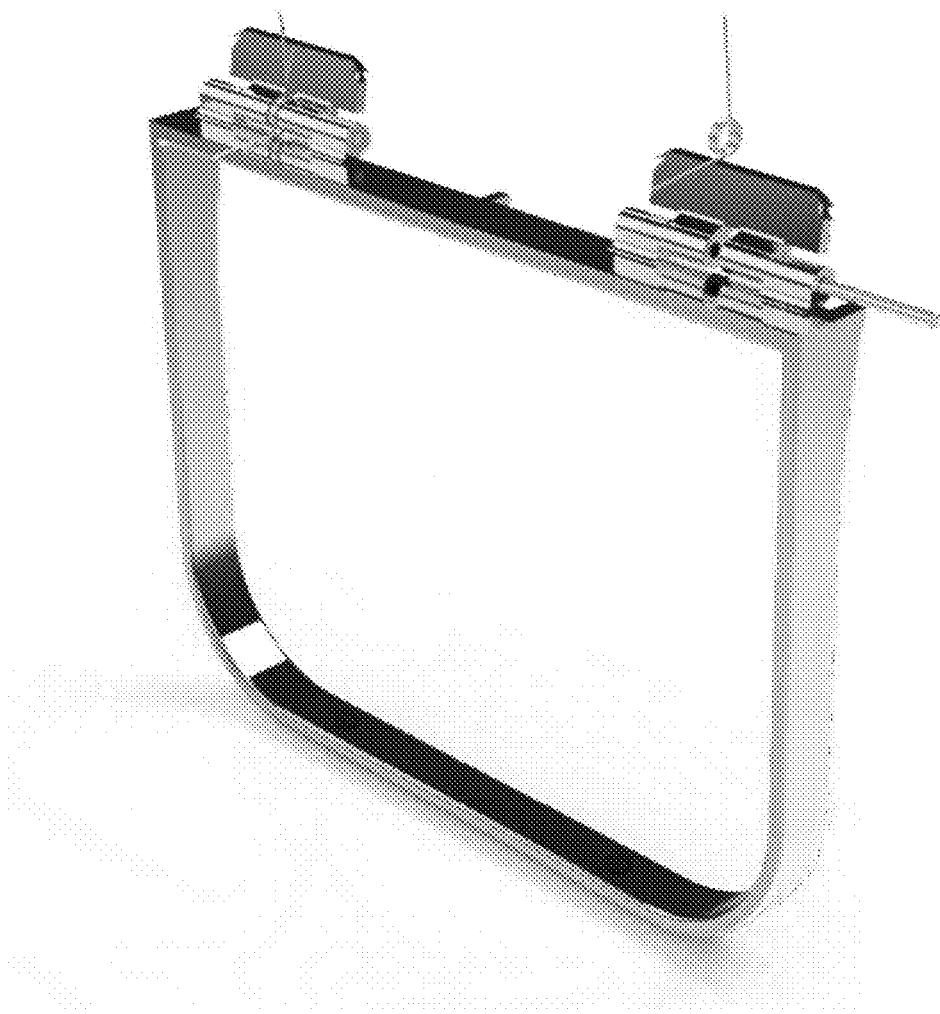

9.9 Take the leg and clip assembly and insert the hinge clips (1-5) into slots in enclosure shell 1 (1-1) and enclosure shell 2 (1-2) so that the flat face of the leg is facing towards the center of the assembly.

10.0 Inspection
10.1 All parts to be visually inspected for correct part assembly and visual defects.

11.0 Revisions
0.01 Initial Release

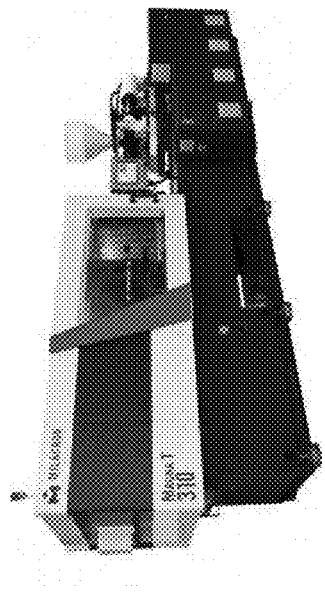
Applications
Enclosures
Clips
Feet
FIG. 13
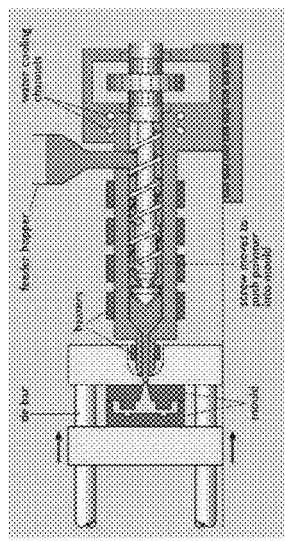
STEP 1301 - Molds close – cycle begins
STEP 1302 - Heated plastic is injected into the mold
STEP 1303 - Part is given cooling time
STEP 1304 - Screw retracts while drawing in new plastic for the next part
STEP 1305 - Molds opens, and ejector pins push part out of mold – cycle ends

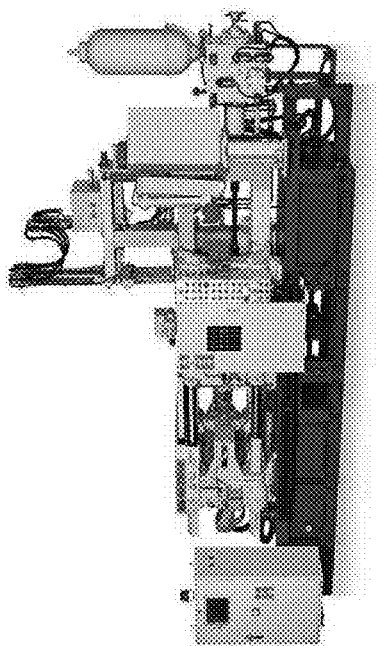
Applications
Legs
Clasps
FIG. 14
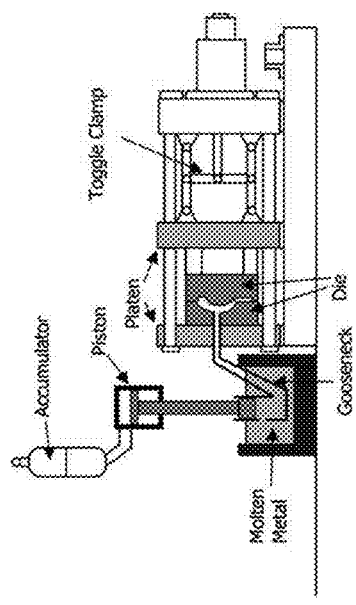
STEP 1401 Dies closed – cycle begins
STEP 1402 Heated metal is injected into the mold
STEP 1403 Part is given cooling time
STEP 1404 Piston retracts
STEP 1405 Molds opens, and ejector pins push part out of mold, flash is removed – cycle ends

FIG. 19B

Example Dimensions

Example dimensions are:

- 3.5 inches tall x 5 inches wide x 8 inches long when the product is fully open

- Small low-rise seat comprised of a durable fabric (e.g. canvas) supported by lightweight collapsible metal legs.

- When the seat is open, a bag can be placed upon it. The seat can slide under a chair, can sit next to a chair, or in front of your feet. The product can fit in tight spaces in some embodiments.

- When the product is folded closed, it can be smaller (e.g. half the size) and thus portable.

- It can fit under multiple types of chairs

- It can come with a small carrying case and/or a strap (e.g. wrist strap)

- It can accommodate multiple types and sizes of bags

FIG. 19C

Example Optional Features

- Lightweight
- Compact
- Portable—drop into a bag or briefcase or use as a wristlet
- Easy to store
- Easy to use
- Stable on multiple types of floor surfaces
- Ability to clean (e.g., with antibacterial wipes for sake of hygiene) and/or anti-rust material(s)
- Inexpensive
- Sturdy

Product Features

Can be lightweight, compact, portable, easy to use

Example Features:

- Can keeps bag from touching floor
- Can be small (e.g., approx. 3.5 in x 5in x 8in when fully open)
  - Can be half the size when folded
- Can fit under all types of chairs
- Can be small carrying case with wrist strap
- Can be cleaned
- Can be stable on all types of floor surfaces
- Can have unique aesthetic
- Can accommodate different size bags

FIG. 19E

Embodiment 3

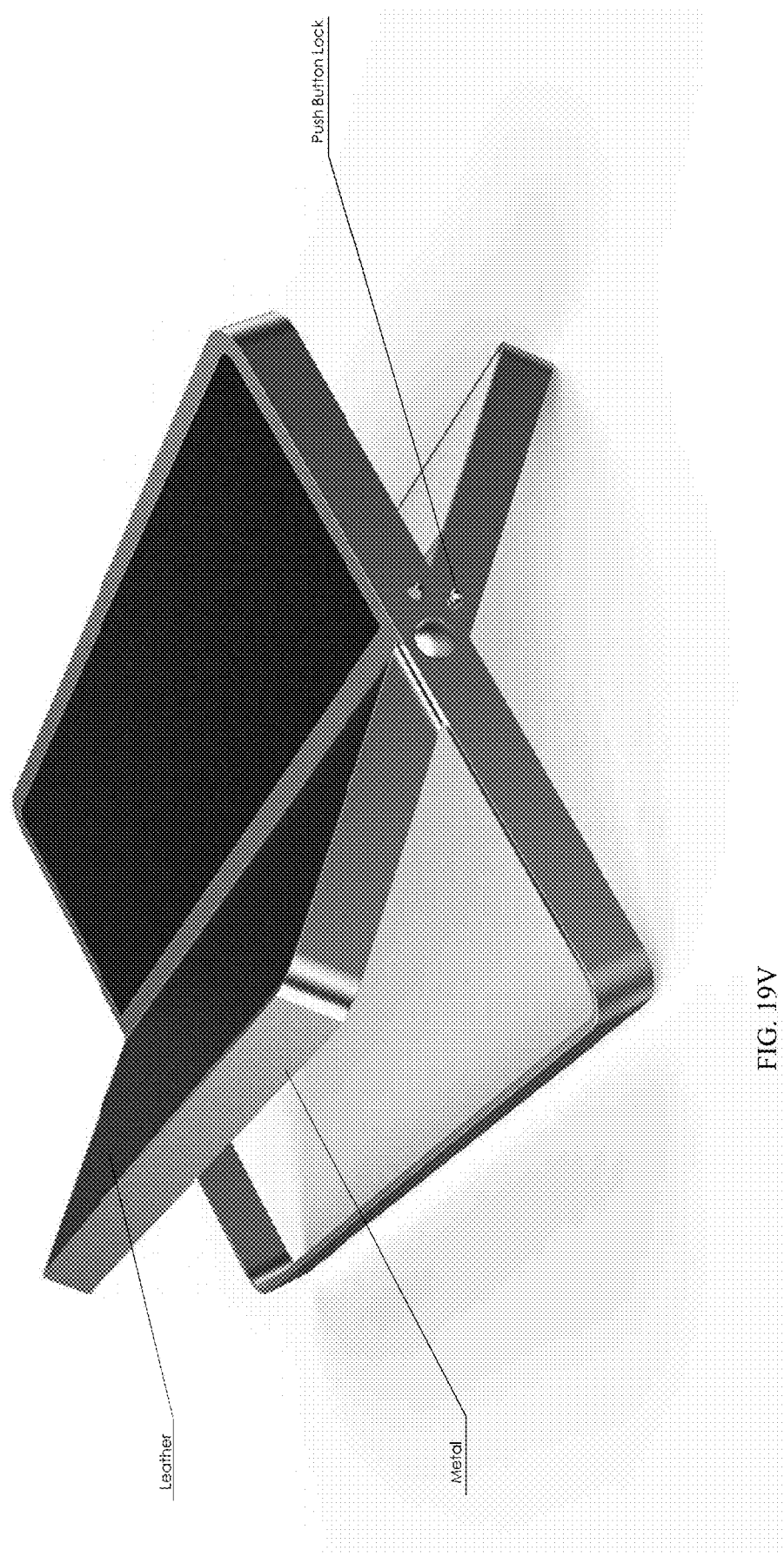

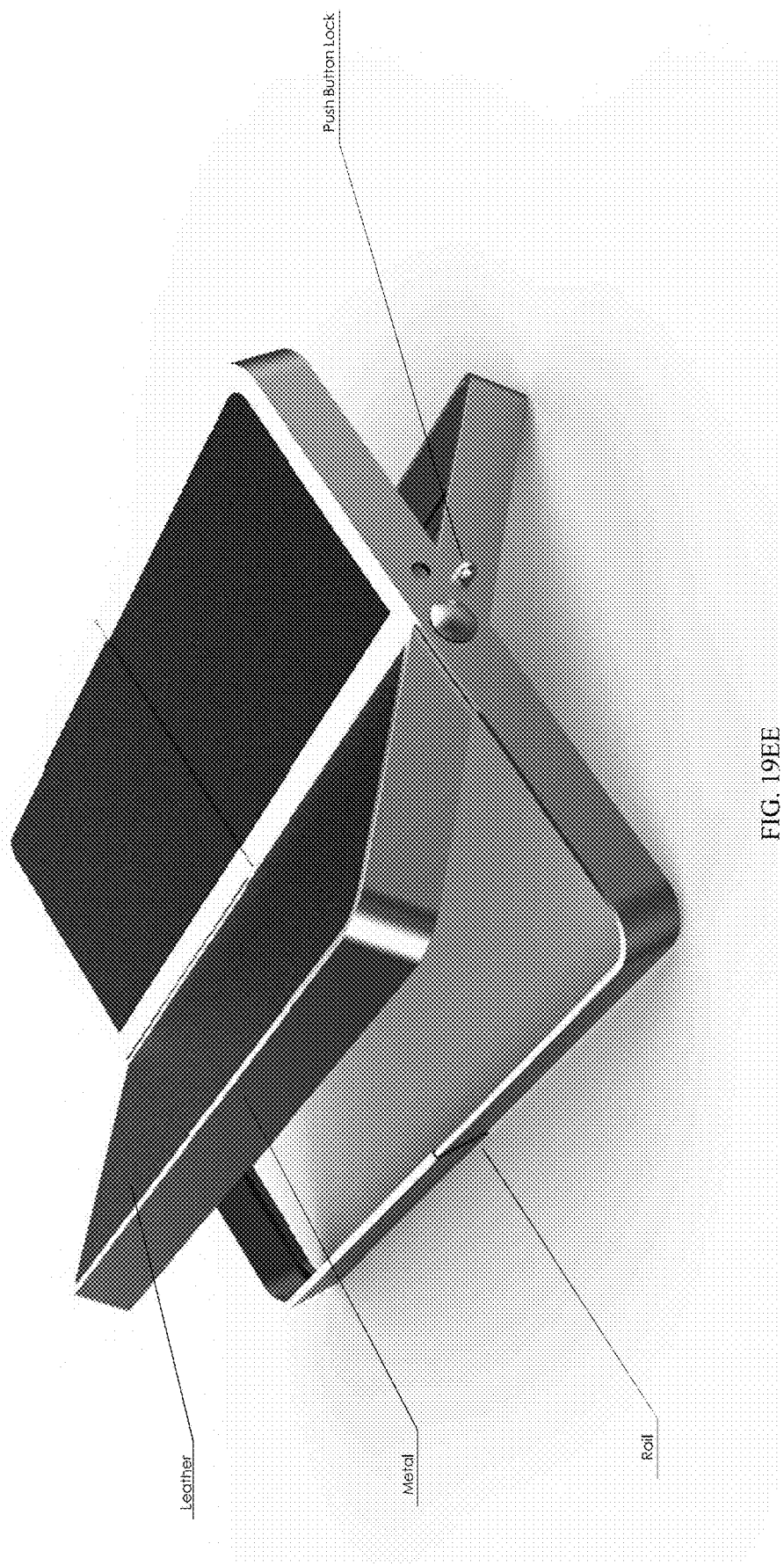

Embodiment 4

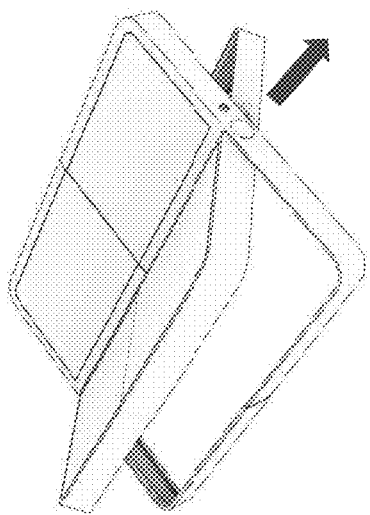

Push button to unlock

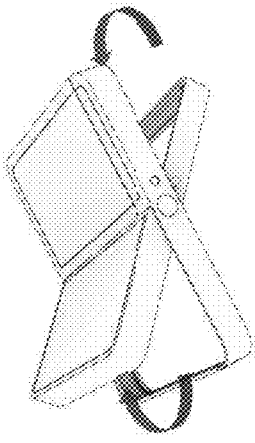

Hold button and twist to open

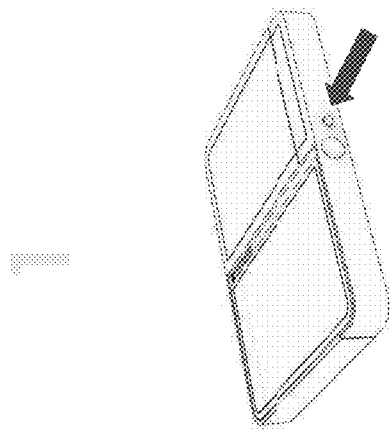

Adjust along rails to desired length

This product can function like a foldable rack. In the locked position, two panels can lay flat, nesting inside one another. The panels can be connected with a hinge on either side and can be locked into place with a spring-located push pin. When unfolded from the flat position, the panels can create an X frame that can cup and hold the bag. The frame can operate on a rail system, similar to curtain rods, so that the product can be adjusted to accommodate different sized bags and make storage more compact.

FIG. 19FF

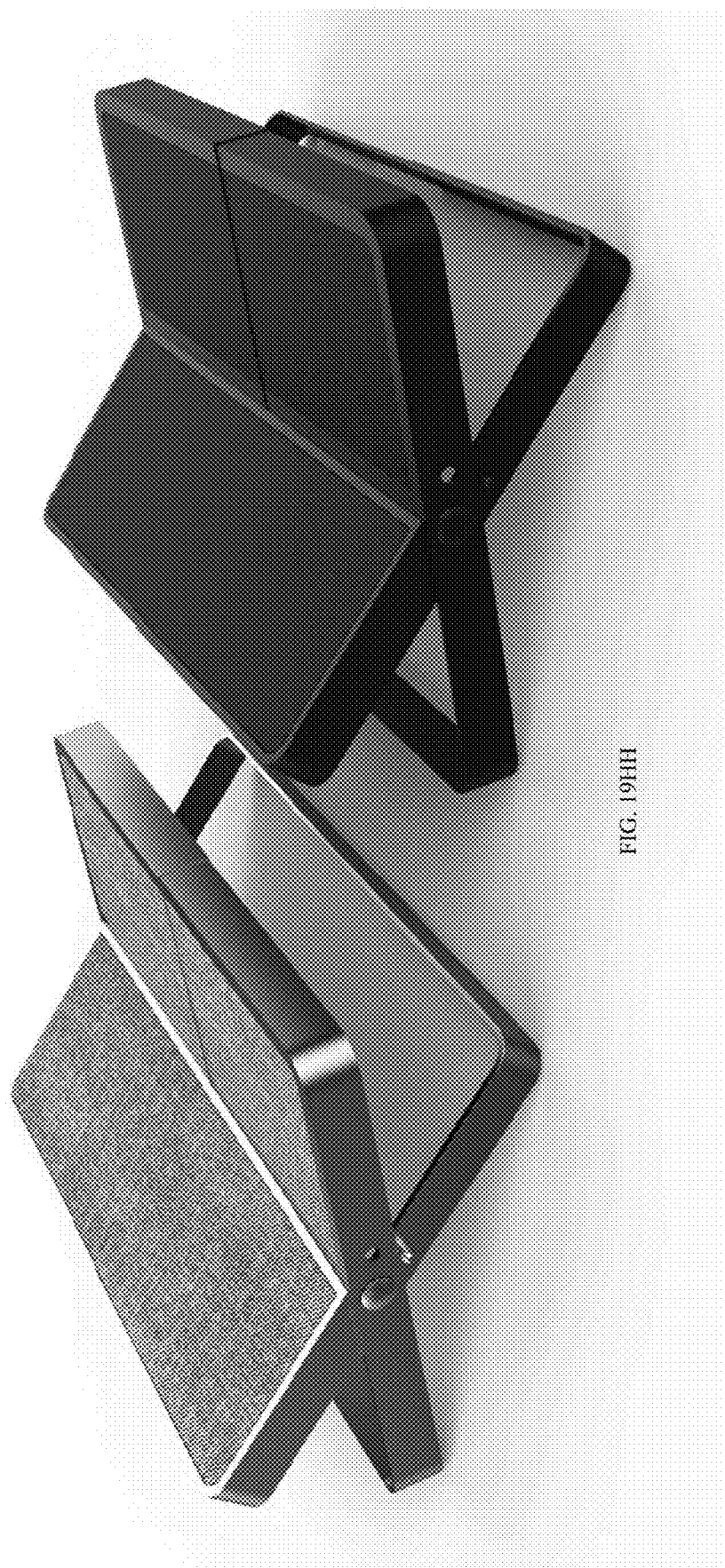

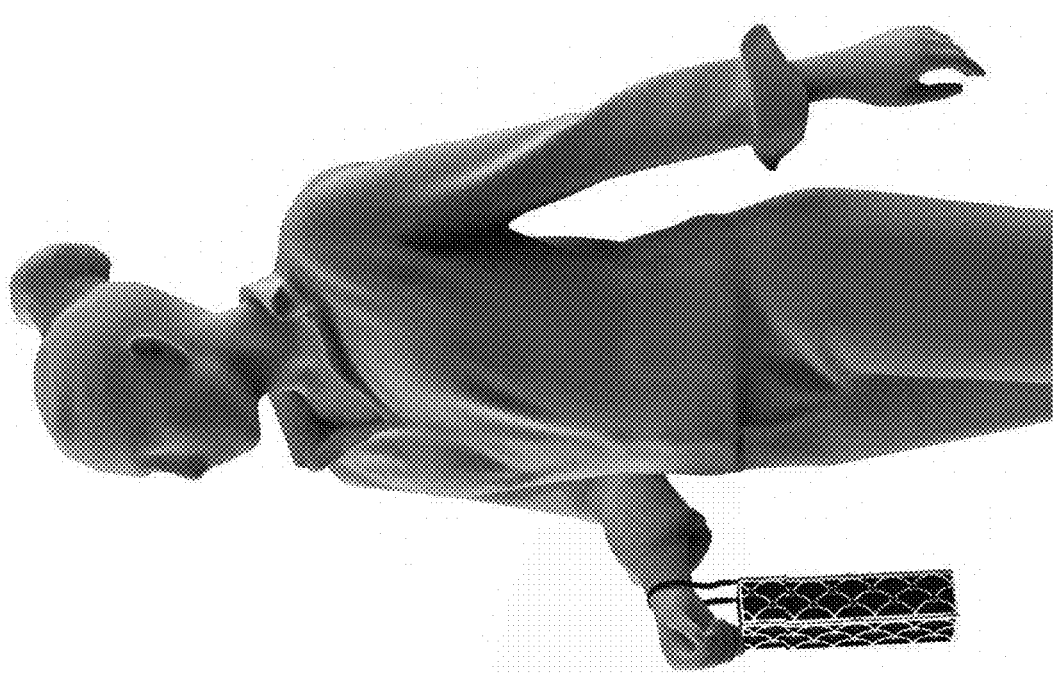
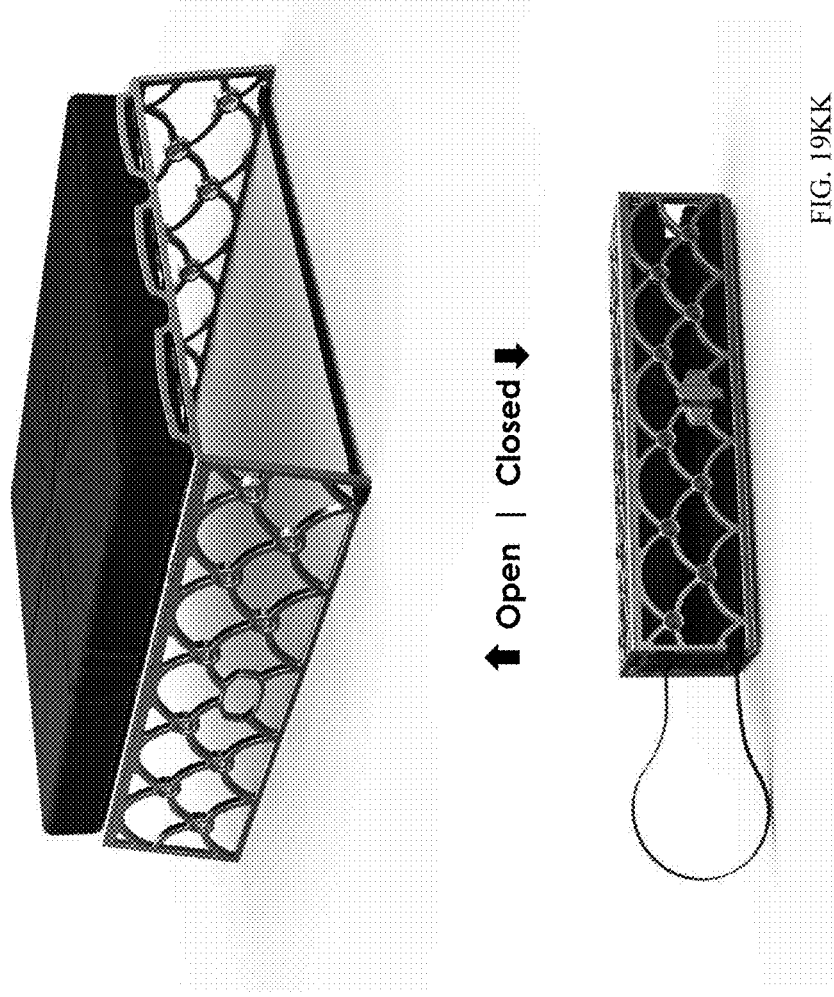
FIG. 19KK

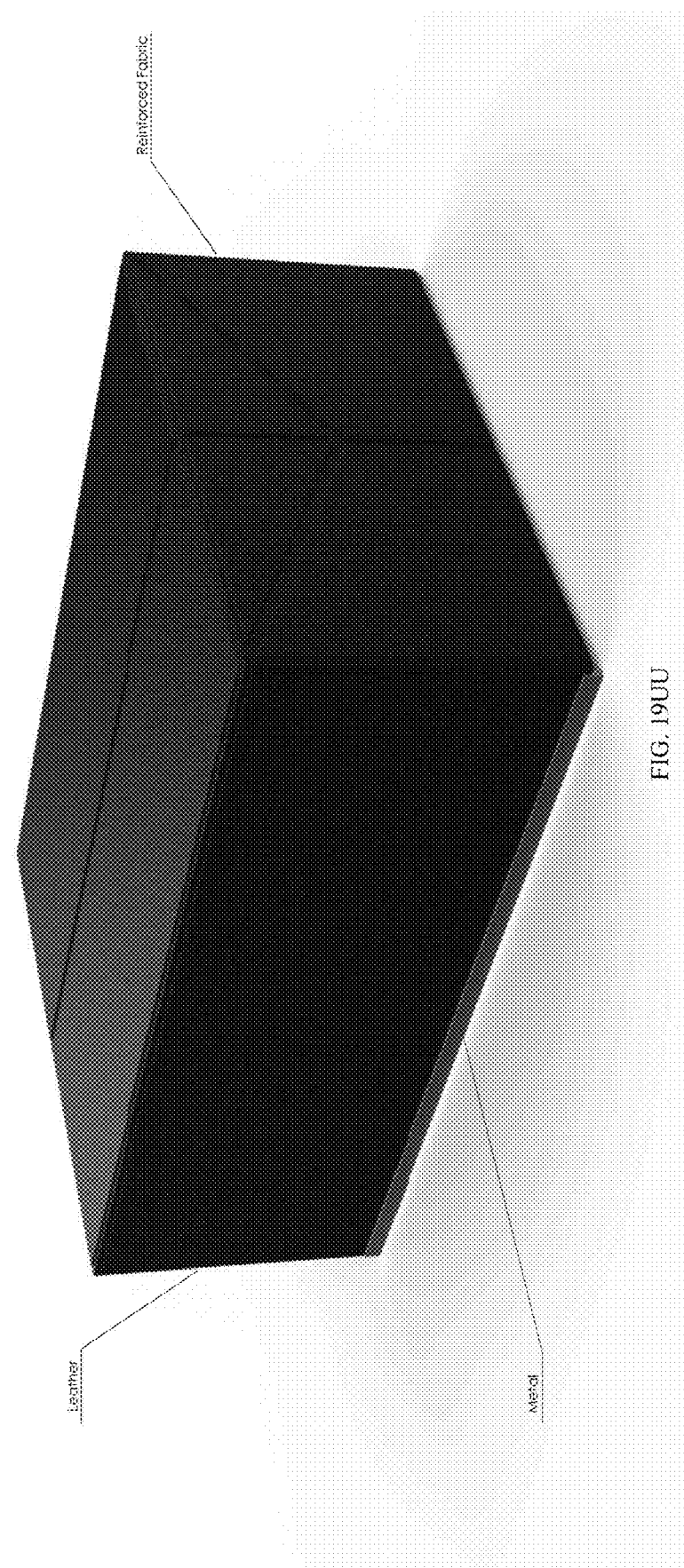

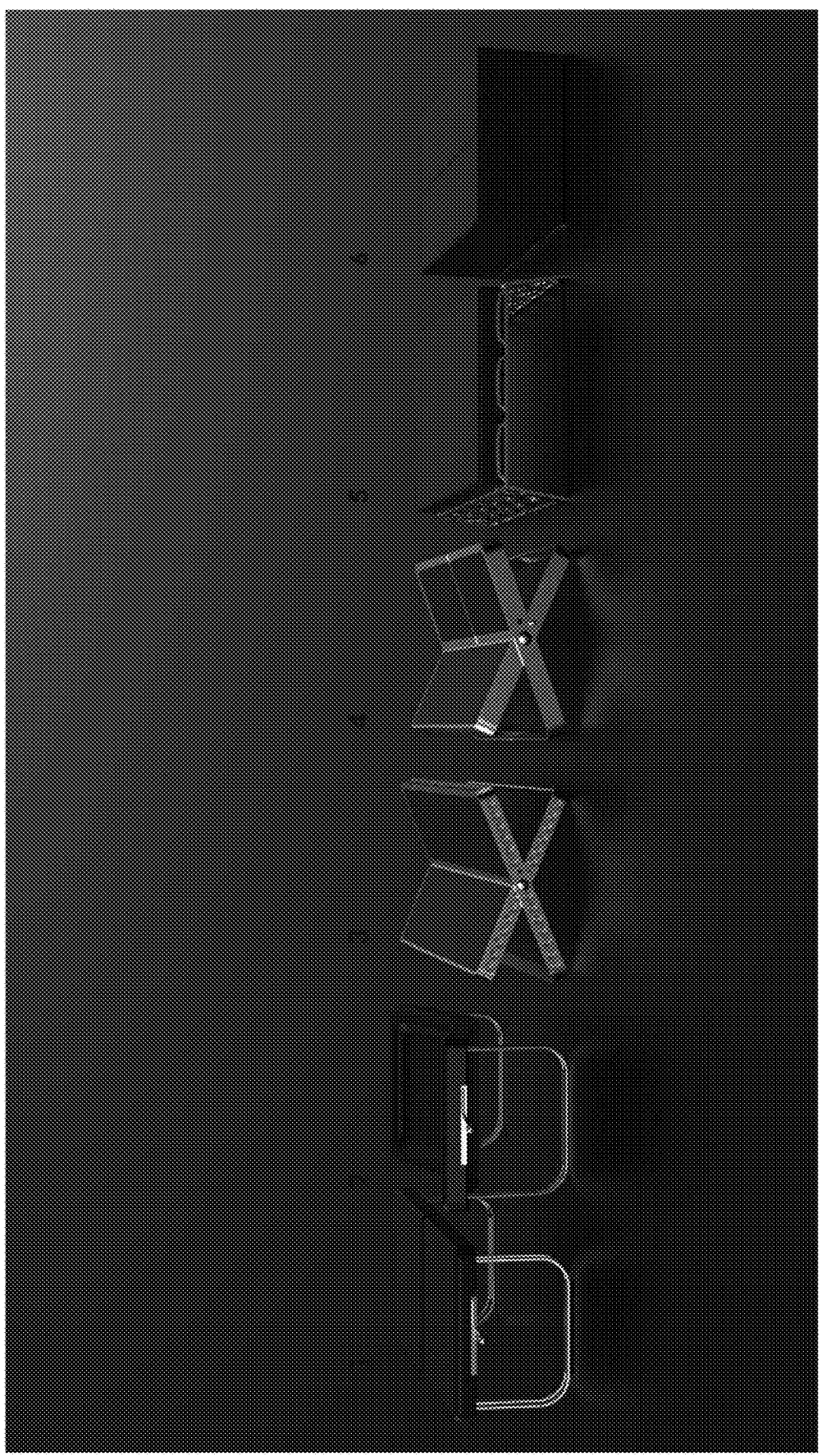
FIG. 19AAA

PRODUCT FOR HOLDING ITEMS AND METHOD FOR MAKING SAME

This application claims the benefit of U.S. Provisional Patent Application No. 62/907,822 filed Sep. 3, 2019, the entire contents of which are incorporated herein by reference. This application is also related to U.S. Design patent application Ser. No. 29/734,515, filed May 13, 2020, the entire contents of which are also incorporated by reference.

BRIEF DESCRIPTION OF THE FIGURES

FIGS. 1A-1B illustrate various components of a product used to hold items, according to aspects of the disclosure.

FIGS. 2-3 illustrate various views of a product used to hold items, according to aspects of the disclosure.

FIG. 4A-4E illustrates an example enclosure that can be used to hold the product, according to aspects of the disclosure.

FIG. 6A-11 illustrates various engineering drawings for the product used to hold items, according to aspects of the disclosure.

FIGS. 12A-F illustrates an example method for making the stand, according to aspects of the disclosure.

FIG. 13 illustrates an example injection molding process that can be used for enclosures, clips and/or feet, according to aspects of the disclosure.

FIG. 14 illustrates an example die casting process that can be used for legs and/or clasps, according to aspects of the disclosure.

FIGS. 19A-E set forth additional information related to the product, according to various embodiments of the disclosure.

FIGS. 19F-19AAA illustrate multiple details of multiple aspects of the disclosure.

DETAILED DESCRIPTION OF ASPECTS OF THE DISCLOSURE

Figure 1A:
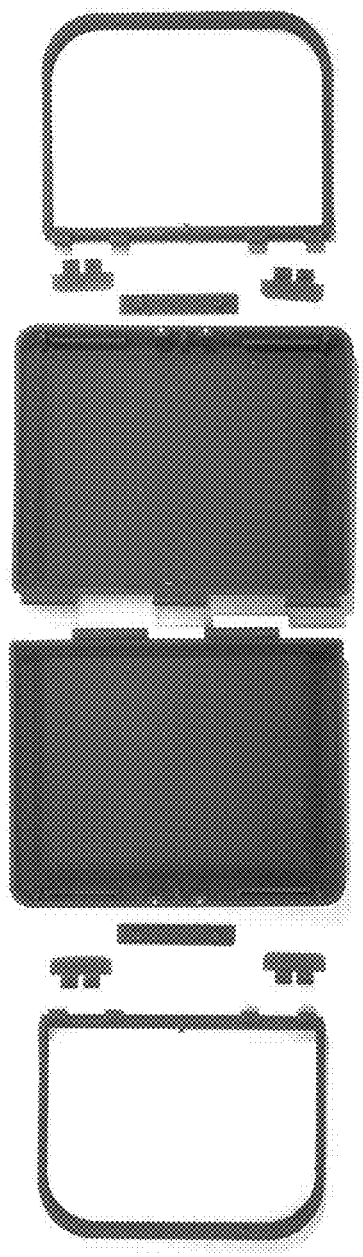

FIG. 1A illustrates various components of a product (also referred to as a stand) used to hold items, according to aspects of the disclosure. FIG. 1A illustrates a product that can comprise enclosure shells (105), clips (110), legs (115), clasps (120), and magnets (125), according to aspects of the disclosure. Feet (130), springs (135), and screws (140) can also be included. FIG. 1B illustrates another view of the product that can comprise: enclosures (e.g., injection molded); clasps (e.g., die case or machined), logos (145) (e.g., silk screened), screws (e.g., commercial off the shelf), clips (e.g., injection molded), magnets (e.g., commercial off the shelf), clips (e.g., injection molded), magnets (e.g., commercial off the shelf), springs (e.g., commercial off the shelf), pins (150) (e.g., commercial off the shelf), legs (e.g., die cast or machined), feet (e.g., injection molded).

FIG. 2 illustrates various views of a product used to hold items, according to aspects of the disclosure.

Figure 3:
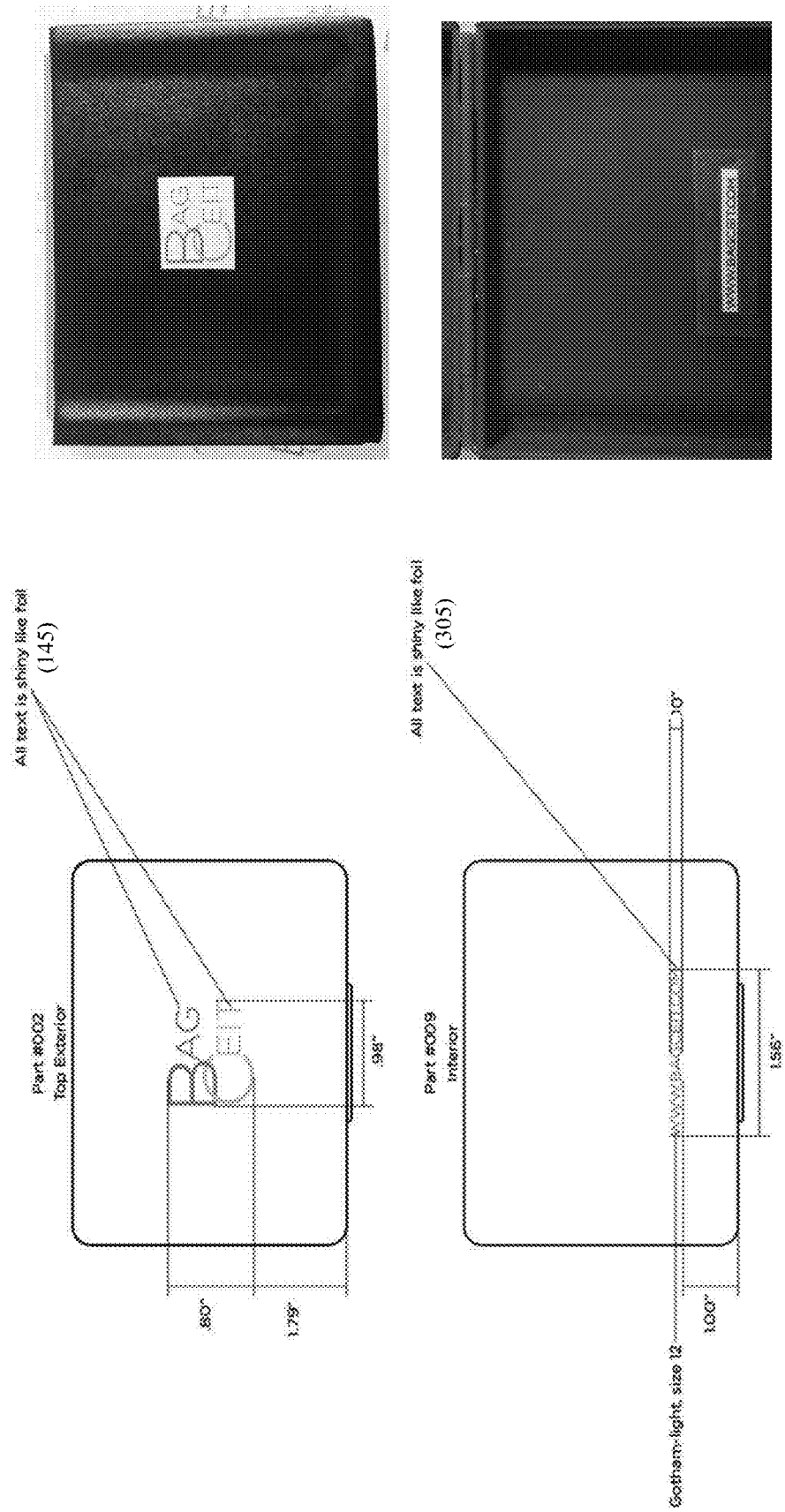

FIG. 3 illustrates various views of a product used to hold items, according to aspects of the disclosure. FIG. 3 shows how information (e.g., logos (145), web site address (305)) can be displayed on the product. The logo can be shiny (e.g., like foil).

Figure 4E:
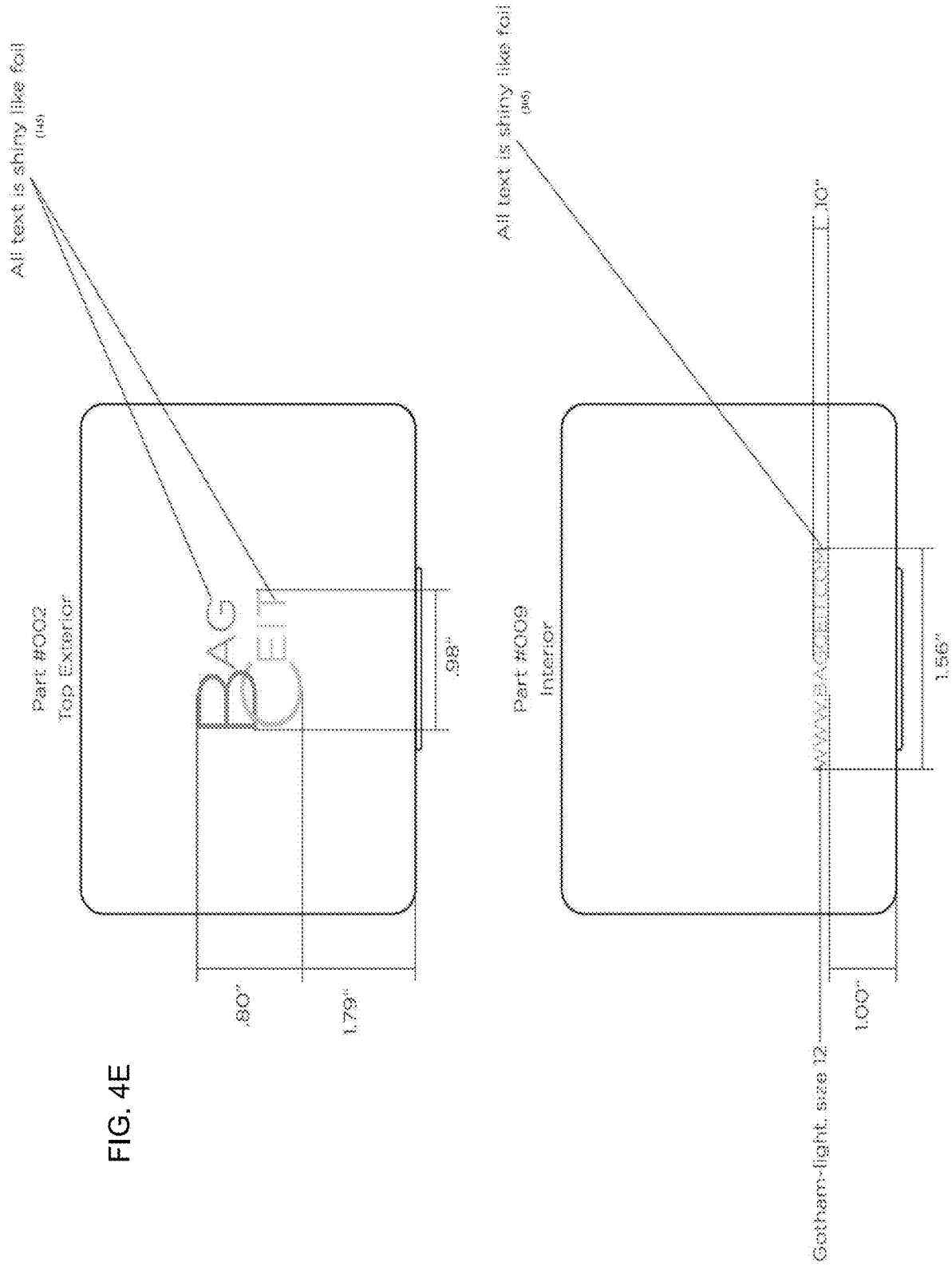

FIG. 4A illustrates an enclosure that can be used to hold the product, according to aspects of the disclosure. Any type of enclosure may be used. For example, a baggie can be used in some aspects of the disclosure. The baggie can be made of: satin, silk, cotton, linen, polyester, leather, faux leather, or any combination thereof. Many other types of material can also be used. In other aspects of the disclosure, an envelope may be used. FIGS. 4A-4E illustrate an envelope (e.g., enclosure) that can be used to hold the product, according to aspects of the disclosure. FIG. 4B illustrates an example front and side view of the envelope. Information (e.g., a logo 145) can be included on the envelope. FIG. 4C illustrates an example back view of the envelope, with a logo (145), and a snap (405) used to close the envelope. FIG. 4D illustrates example engineering drawings of the envelope, which also illustrate the logo (145), web site address (305), and snap (405). FIG. 4E illustrates an example top exterior view and interior view of the envelope, and also illustrates the logo (145), email address (305) and snap (405). The envelope can be made of: satin, silk, cotton, linen, polyester, leather, faux leather, or any combination thereof. Many other types of material can also be used. In addition, many other types of holders for the product, other than a baggie or envelope, can be used in aspect of the disclosure.

Figure 5:
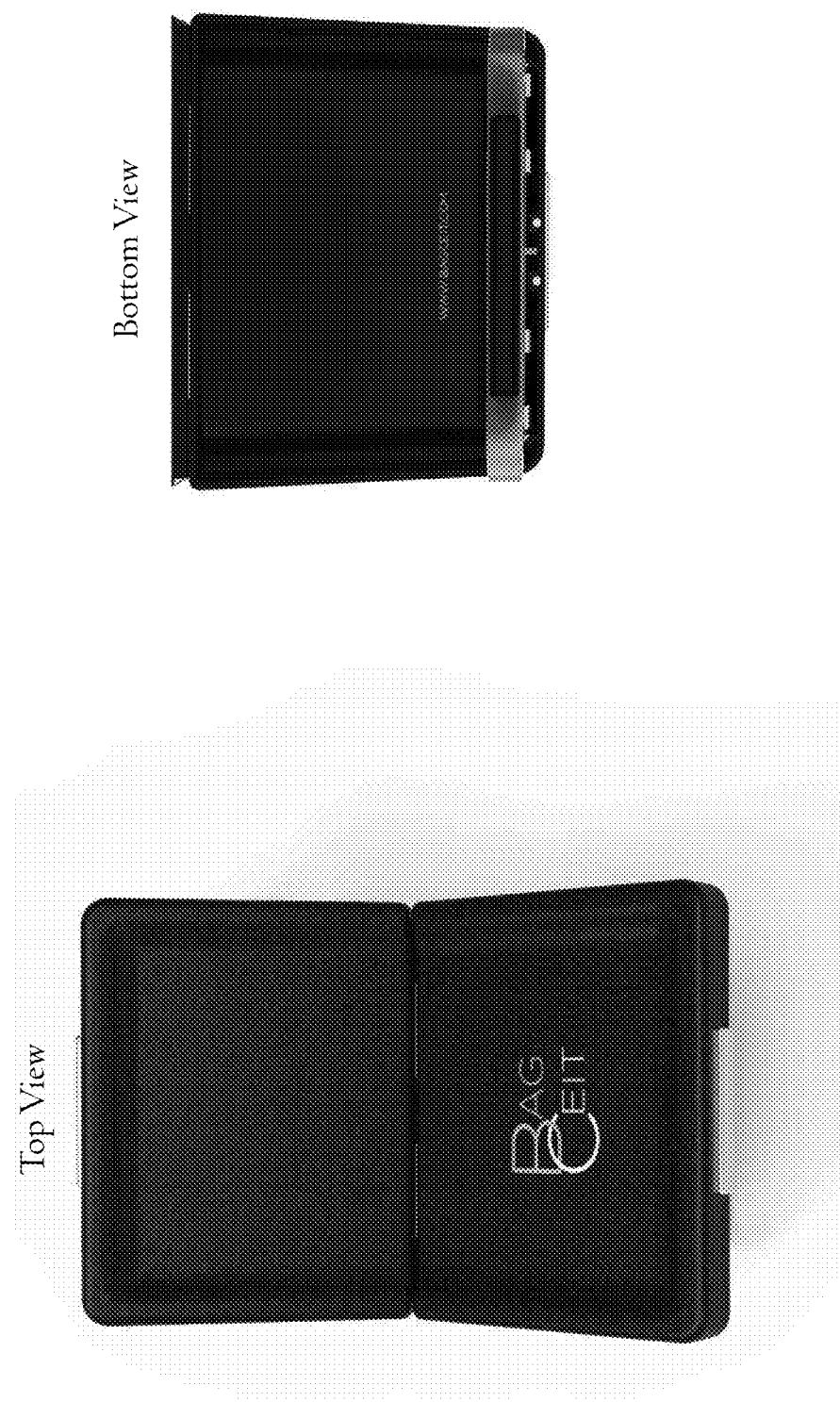
FIG. 5 illustrates a top and bottom view of the product used to hold items, according to aspects of the disclosure.

FIG. 5 illustrates a top and bottom view of the product used to hold items, according to aspects of the disclosure. The product can be made of plastic (e.g., black plastic). The hardware can be made of silver, gold, black, or any other color.

FIG. 6A-11 illustrates various engineering drawings for the product used to hold items, according to aspects of the disclosure. Note that the measurements disclosed in this application are merely example measurements, and that those of ordinary skill in the art will see that many other measurements may be used for any component of the product used to hold items. In some aspects of the disclosure, the product can hold an item (e.g., bag, computer, phone, shoes, coat) up to approximately 10 pounds. In other aspects, if measurements that are larger or smaller than those provided in the examples, the product can hold heavier (e.g., duffle bag, bigger computer) or lighter (e.g., cell phone) items.

Figure 6A:
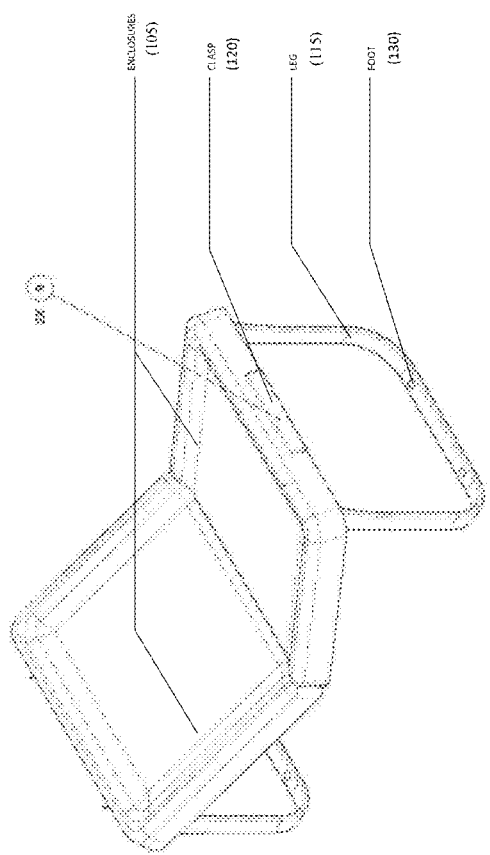
Figure 6B:
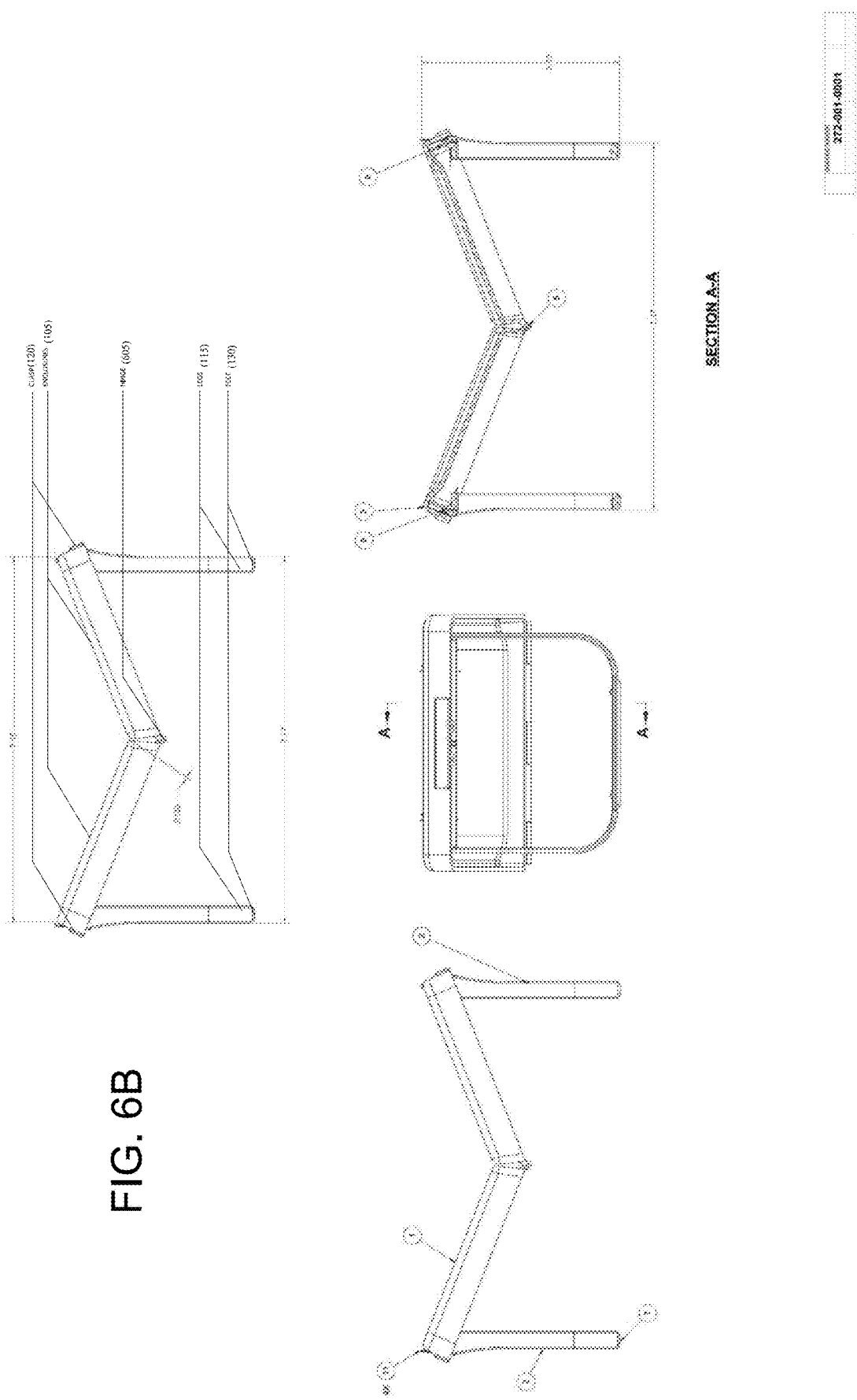

FIGS. 6A-6B illustrate an example stand with a v-shape surface for holding items, according to aspects of the disclosure. As shown in FIGS. 6A and 6B, the stand can include: a magnet (e.g., part number DH18 made of 304 SST); a tension spring (e.g., LH 160D, which can be part number 9271K13); a pan head screw (e.g., 2.56×0.06 LG, which can be part number 91772A503); a clasp (e.g., made of 304 SST), a pin (e.g., made of 304 SST), a bumper (e.g., made of 90 durometer rubber), a hinge clip (e.g., made of ABS), enclosure shells (e.g., made of ABS), or legs (e.g., made of AL), or any combination thereof. FIG. 6A illustrates the enclosures (105), a clasp (120), a leg (115) and a foot (130). FIG. 6B illustrates a clasp (120), enclosures (105), a hinge, legs (115), and feet (130).

FIG. 7A illustrates various views of an example first enclosure shell, according to aspects of the disclosure. FIG. 7B illustrate various views of an example second enclosure shell, according to aspects of the disclosure. FIGS. 7A and 7B illustrate hinges (605), clasp holes (715), hinge cup slots (705), and magnet holes (710).

FIG. 8A illustrates an example leg, according to aspects of the disclosure. Positive stops (805), hinges (605), and holes for press feet (810) are illustrated. In the embodiment of 8A, the legs are approximately perpendicular with respect to the ground when the stand is opened. FIG. 8B illustrates an embodiment of the product with example legs different from the one in FIG. 8A. As shown in FIG. 8B, the legs are at an obtuse angle with respect to the ground when the stand is open.

FIG. 9 illustrates an example hinge clip, according to aspects of the disclosure. Example hinges (605) are shown. FIG. 10 illustrates an example bumper, according to aspects of the disclosure. An example press fit (815), and an example press fit rubber feet (130) retained by a collar are shown.

Figure 11:
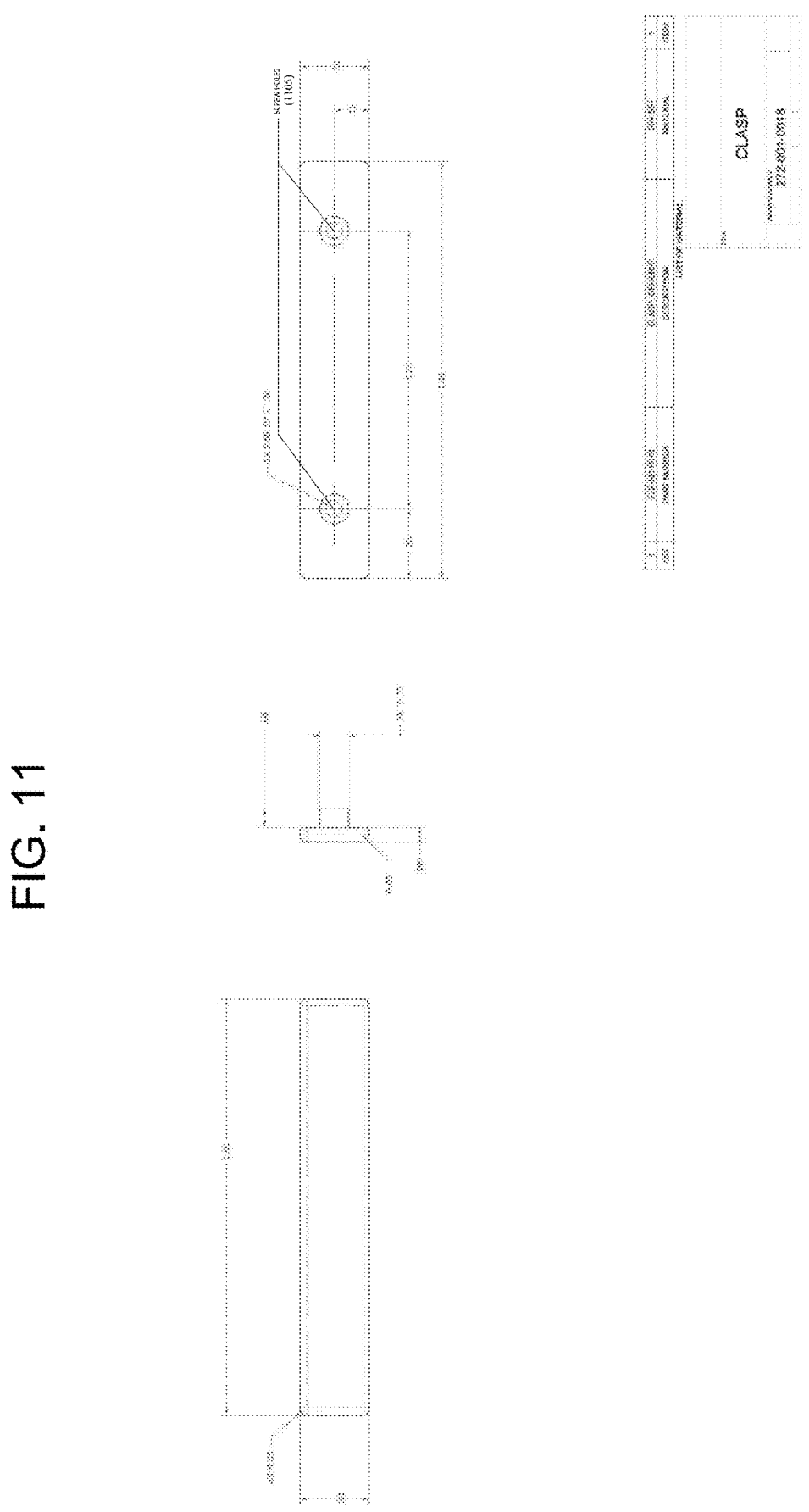
Figure 12F:

FIG. 11 illustrates an example clasp, according to aspects of the disclosure. Example screw holes (1105) are shown.

FIGS. 12A-F illustrates an example method for making the stand, according to aspects of the disclosure. In 9.1 all necessary materials can be retrieved. An example list of materials is provided in 9.1. In 9.2, a long pin can be cut (e.g., 4.75 inches). And 4 short pins can be cut (e.g., 1.125 inches). Wire cutters can be used. Burrs and sharp edges can be removed with a metal file. The pin can be filed down so that both ends have flat faces. In 9.3, a long hinge of the enclosure shells 1 and 2 can be lined up and secured together by inserting a long pin with a hammer or mallet. Before inserting the pin, a fit of the pin can be tested in the hinge to ensure that it will be flushed with the out ends of the hinge. In some aspects of the disclosure, no part of the pin should be sticking out. The pin can be filed down until it is the correct size.

In 9.4, a small drop of glue (e.g., super glue) can be added into each designated magnet hole in an enclosure shell. Before the glue dries, magnets can be inserted into the magnet holes. A hammer or mallet and gently tap down until they are fully seated inside the holes.

In 9.5, for each of the installed magnets, they can be oriented and tested with another magnet to find which end will attract to the already installed magnet. This test magnet can be installed across into enclosure shell 2 with the same procedure as step 9.4, helping ensure that attracted magnet is facing up out of the hole.

In 9.6, a clasp can be installed onto the side of the enclosure shell using pan head screws. This can be repeated for the second enclosure shell.

In 9.7, a bumper can be inserted into holes at the bottom of a leg. This can be repeated to create two legs with bumpers.

In 9.8, a leg can be placed flat side down onto a table, and hinge clips can be installed with the flat side facing up using a short pin per hinge. With the pin partly installed, slide a spring (e.g., torsion spring) in the middle of the hinge clip so that the pin secures it in place. Ensure that the spring is installed with one end facing down and flush with the side of the leg. The spring can be trimmed with wire cutters so that the top end is flush with the hinge clip and the bottom end doesn't extend beyond the flat face of the leg. This can be repeated to create the leg assemblies.

In 9.9, the hinge clip(s) can be inserted into slots in the enclosure shells so that the flat face of the leg is facing towards the center of the assembly. The legs can be attached at any angle using the process described in 9.8 and 9.9.

In 10.0, the assembly can be inspected and a label can be placed. It should be noted that the above example method of assembly is only one example of how the product can be assembled. Many other methods of assembly can be performed.

In addition, multiple other parts can be used to replace the parts described in FIG. 12A-F. For example, the clasp can be connected to enclosures using screws, a press fit (e.g., such feet), a glue or other adhesive, a mold that clasps into place, a design of two interlocking plastic parts, or a rivet, or any combination thereof. As another example, the legs can be shut with a user's fingers, or with a pocket knife mechanism, or a cam lock of the legs (e.g., fold over legs so they snap in place), or any combination thereof. As another example, the hinge can be self closing (e.g., spring loaded and/or with a pin), a piano hinge, a boss on one piece that the other piece can snap onto, no hinge (e.g., merely interlocking), a living hinge, or a self-opening hinge (e.g., spring loaded), or any combination thereof. As other example, the product can be closed using magnets, with a clasp with a locking mechanism, a cam lock (e.g., lid with snap feature) to lower the body, a strap (e.g., around the product), a clasp lock (e.g., jewelry box lock), snap hooks, or a spring load hinge with an open and closed position (e.g., such as a glasses case), or any combination thereof.

FIG. 13 illustrates an example injection molding process that can be used for enclosures, clips and/or feet, according to aspects of the disclosure. In 1301, the molds can close and the cycle can begin. In 1302, heated plastic can be injected into the mold. In 1303, the part can be given cooling time. In 1304, the screw can retract while drawing in new plastic for the next part. In 1305, the molds can open, and the ejector pins can push the part out of molds, and the cycle can end.

FIG. 14 illustrates an example die casting process that can be used for legs and/or clasps, according to aspects of the disclosure. In 1401, the dies can be closed and a new cycle can begin. In 1402, heated metal can be injected into the mold. In 1403, the part can be given cooling time. In 1404, the piston can retract. In 1405, the molds can open, and the ejector pins can push the part out of mold, the flash can be removed, and the cycle can end.

Figure 15:
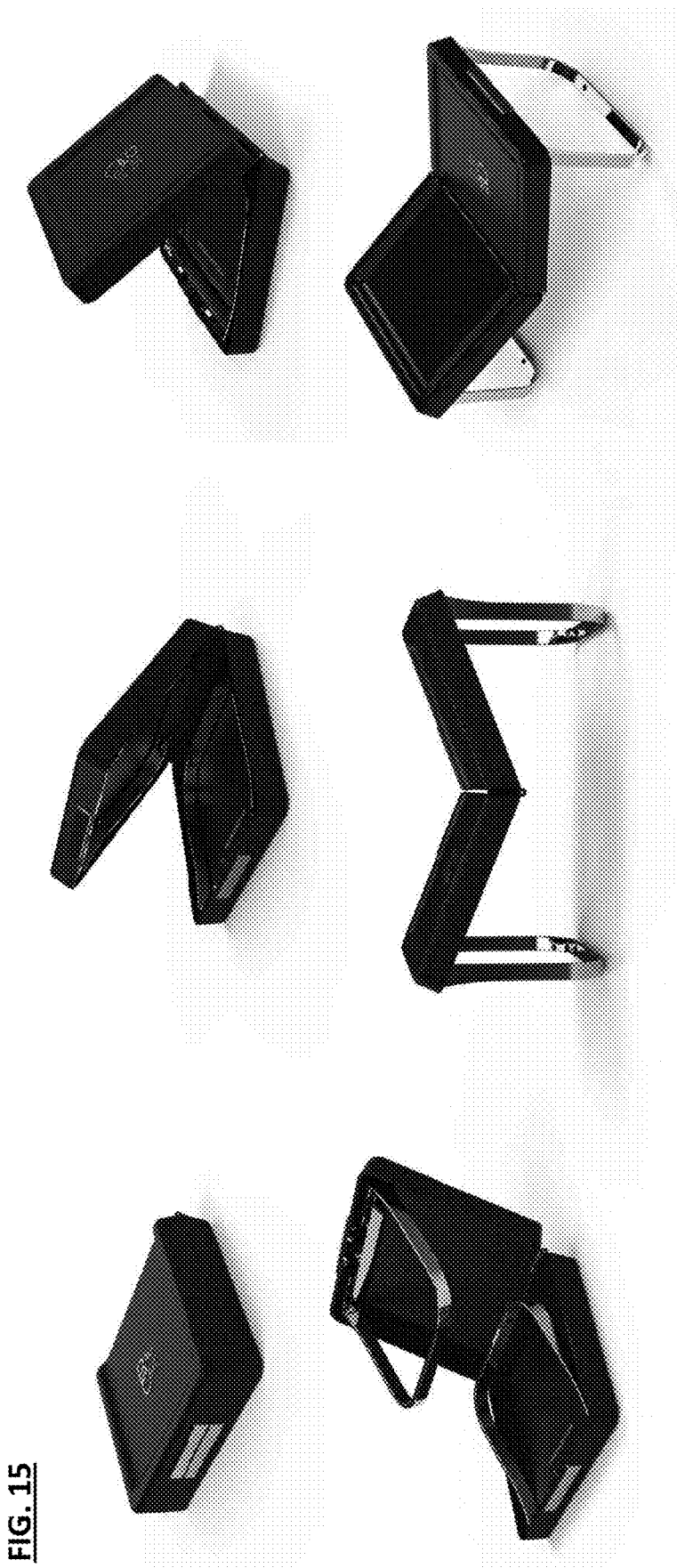
FIG. 15 illustrates several different assembly views of the product used to hold items, according to aspects of the disclosure.

FIG. 15 illustrates several different assembly views of the product used to hold items, according to aspects of the disclosure.

Figure 16:
FIG. 16 illustrates an example method of opening the product used to hold items, according to aspects of the disclosure.

FIG. 16 illustrates an example method of opening the product used to hold items, according to aspects of the disclosure. In 1, the product can be removed from anything used to hold it (e.g., a bag, cover, etc. —or nothing) and opened. In 2, the legs can fold out automatically as the product is opened. In this way, the user does not need to touch the bottom of the legs (e.g., the part of the legs that touch the ground) in order to open the product. In 3, the product can be flipped over and is ready for use.

Figure 17:
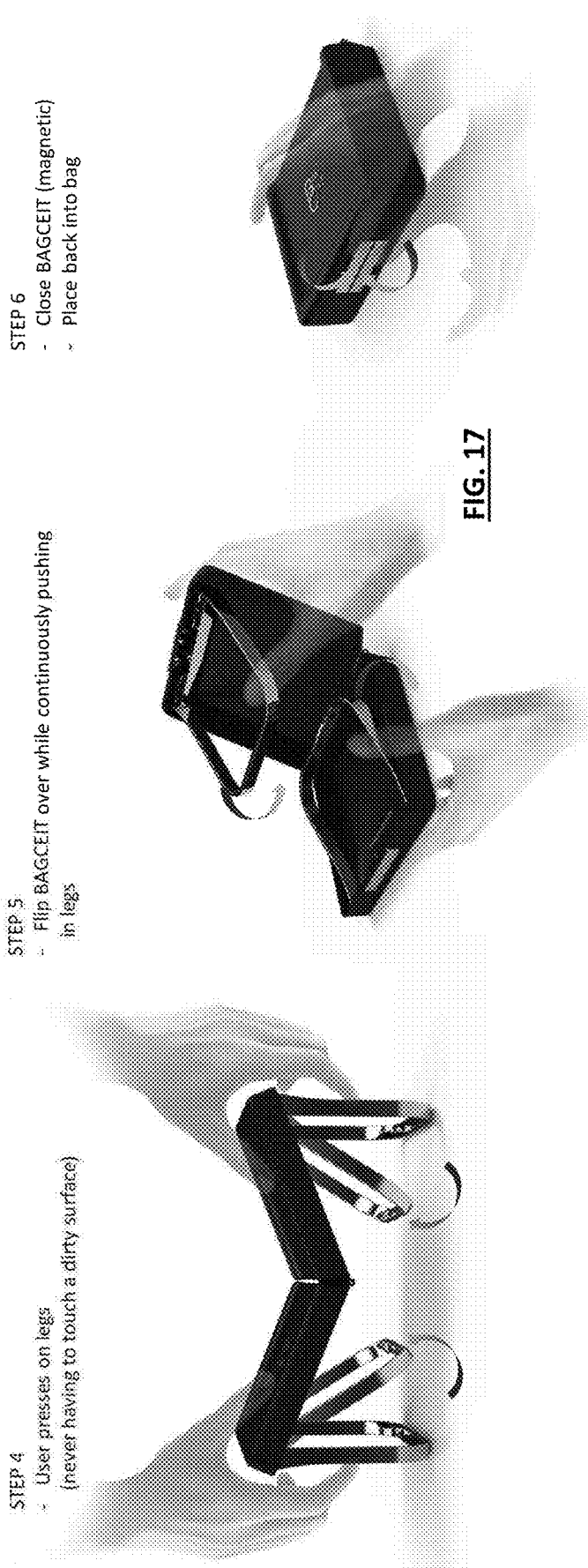
FIG. 17 illustrates an example method of closing the product used to hold items, according to aspects of the disclosure.

FIG. 17 illustrates an example method of closing the product used to hold items, according to aspects of the disclosure. In 4, the user can press on the side(s) of the legs, and the legs then close, so that the user does not need to touch the bottom of the legs (e.g., so that the user may never have to touch a dirty surface). In 5, the product can be flipped over while continuously pushing in the legs. In 6, the product can be closed (e.g., using magnets). It may be placed in a bag, cover or other item.

Figure 18A:
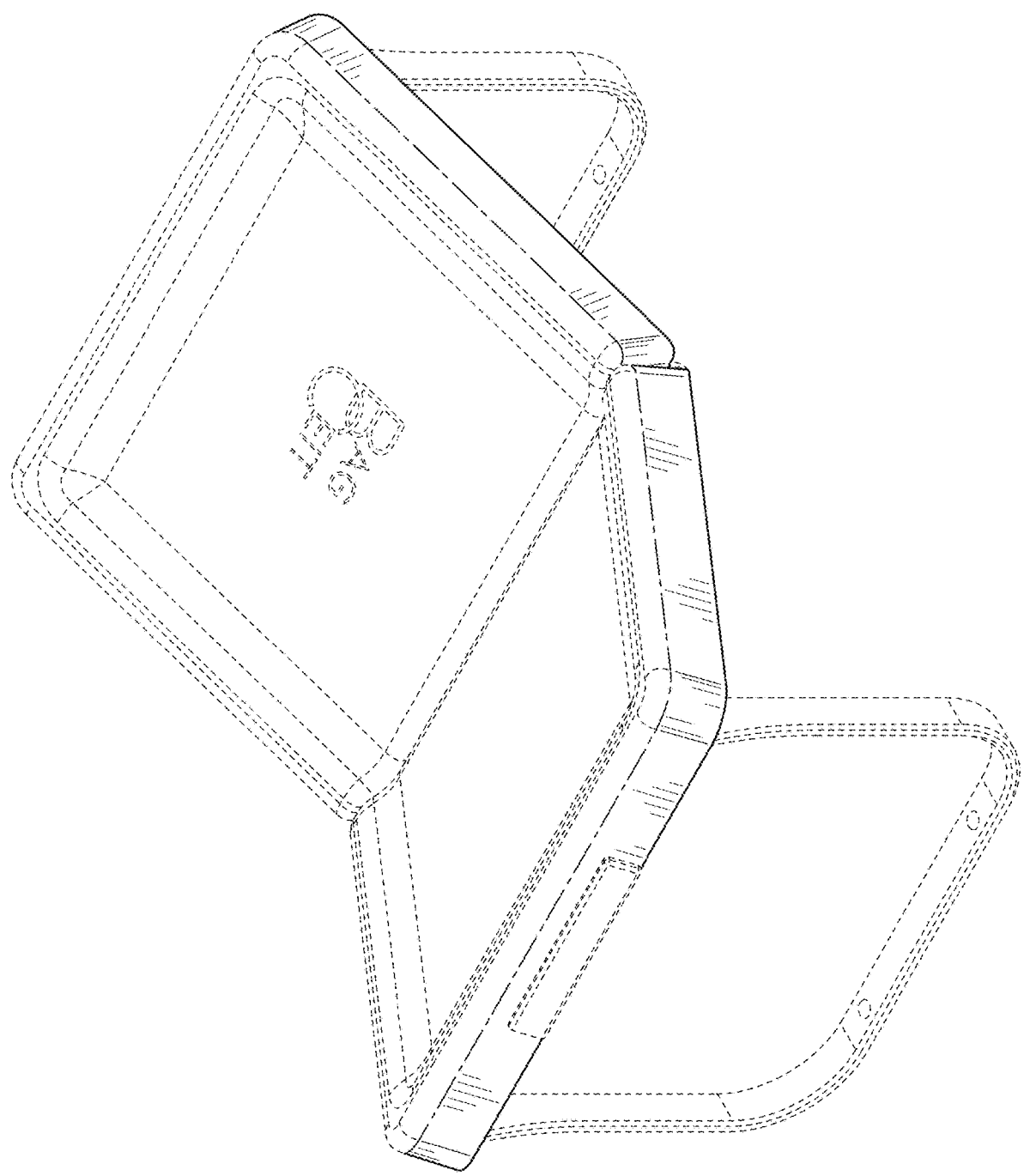
FIGS. 18A-18TT illustrate various views of various aspects/embodiments of the disclosure.
Figure 18B:
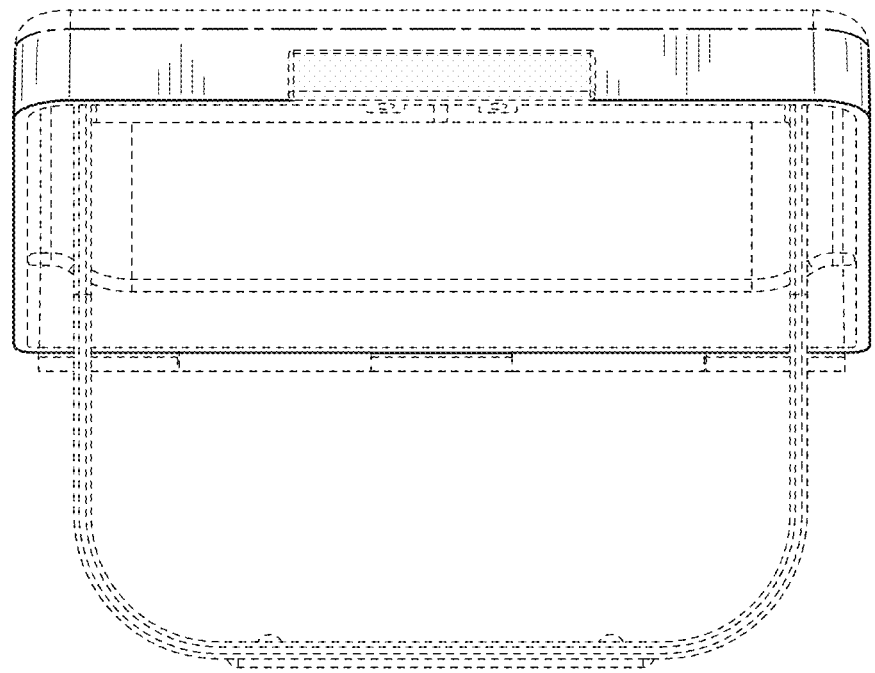
Figure 18C:
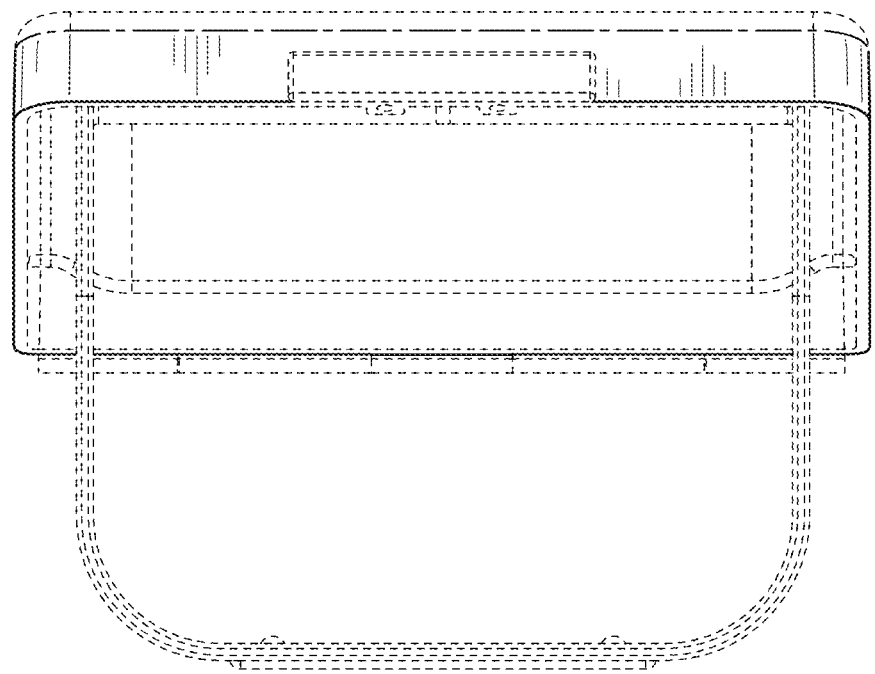
Figure 18D:
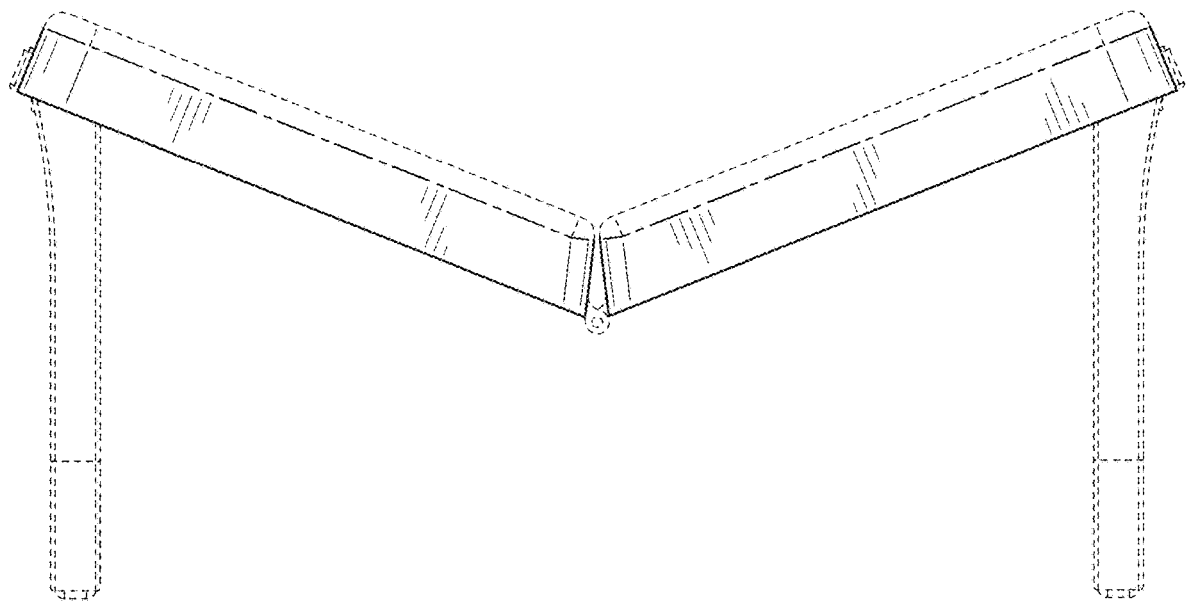
Figure 18E:
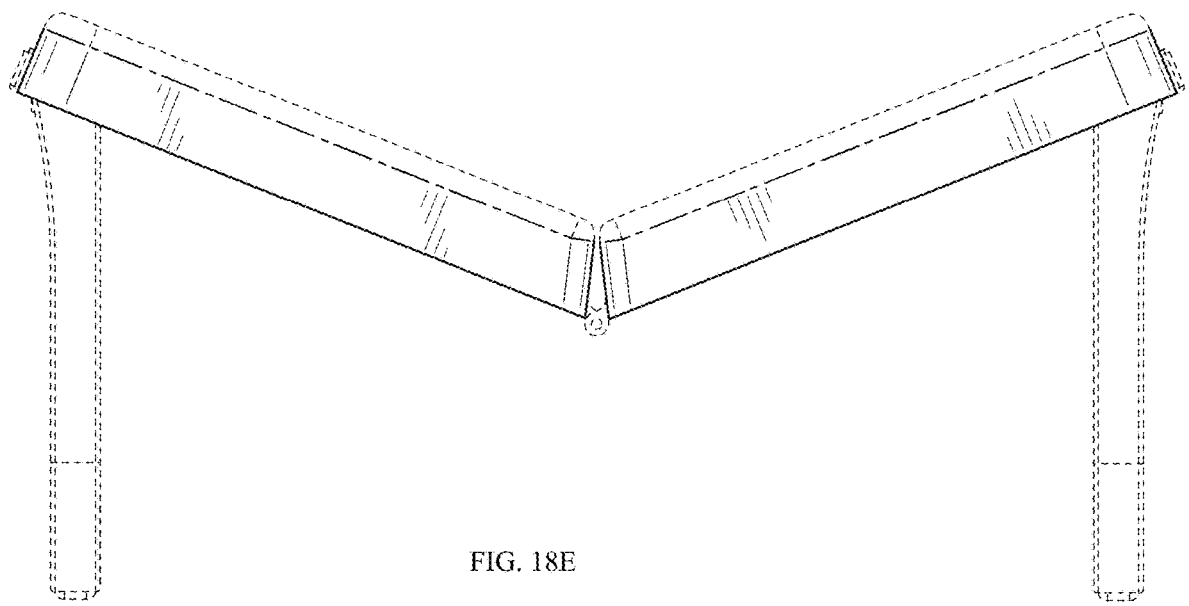
Figure 18F:
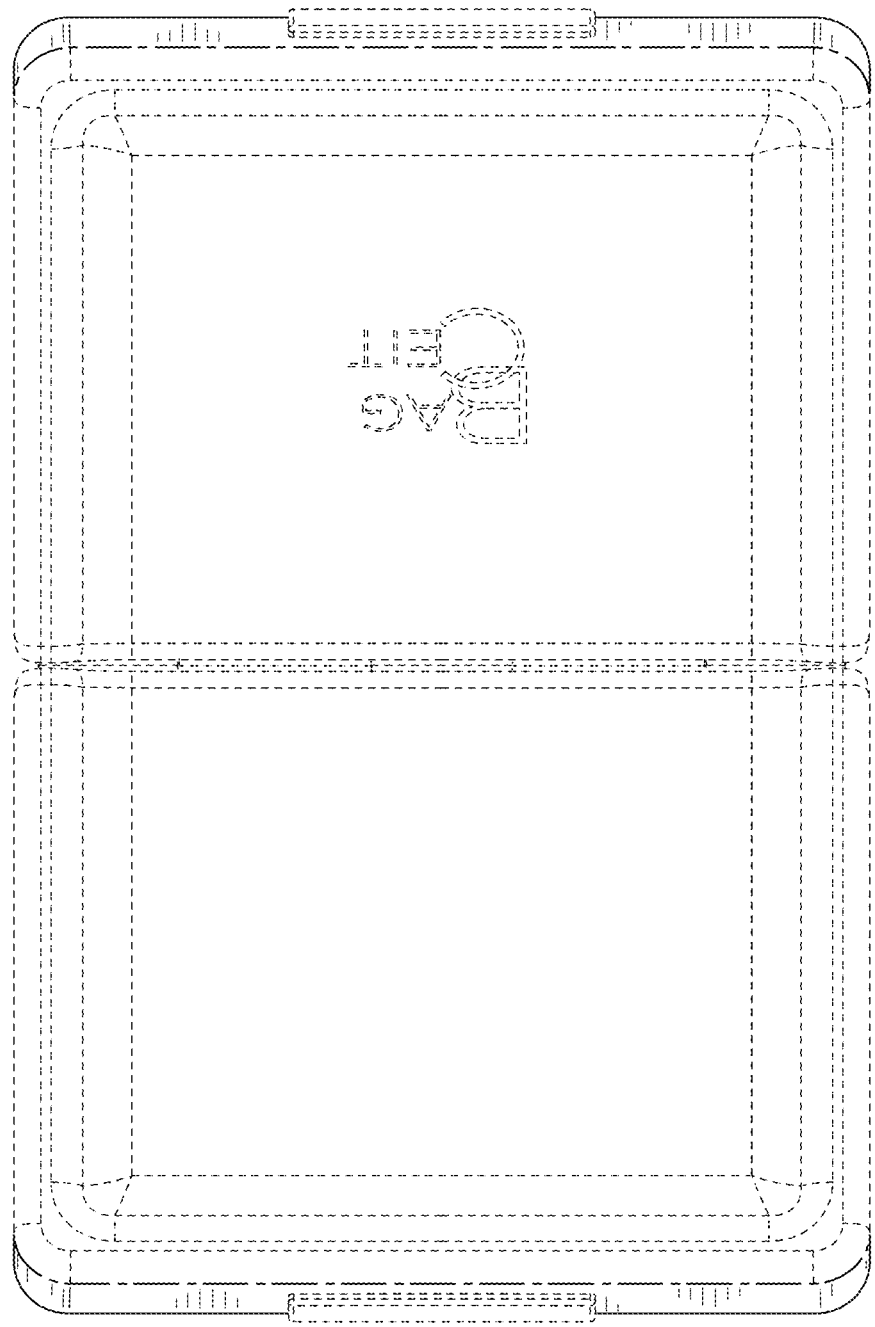
Figure 18G:
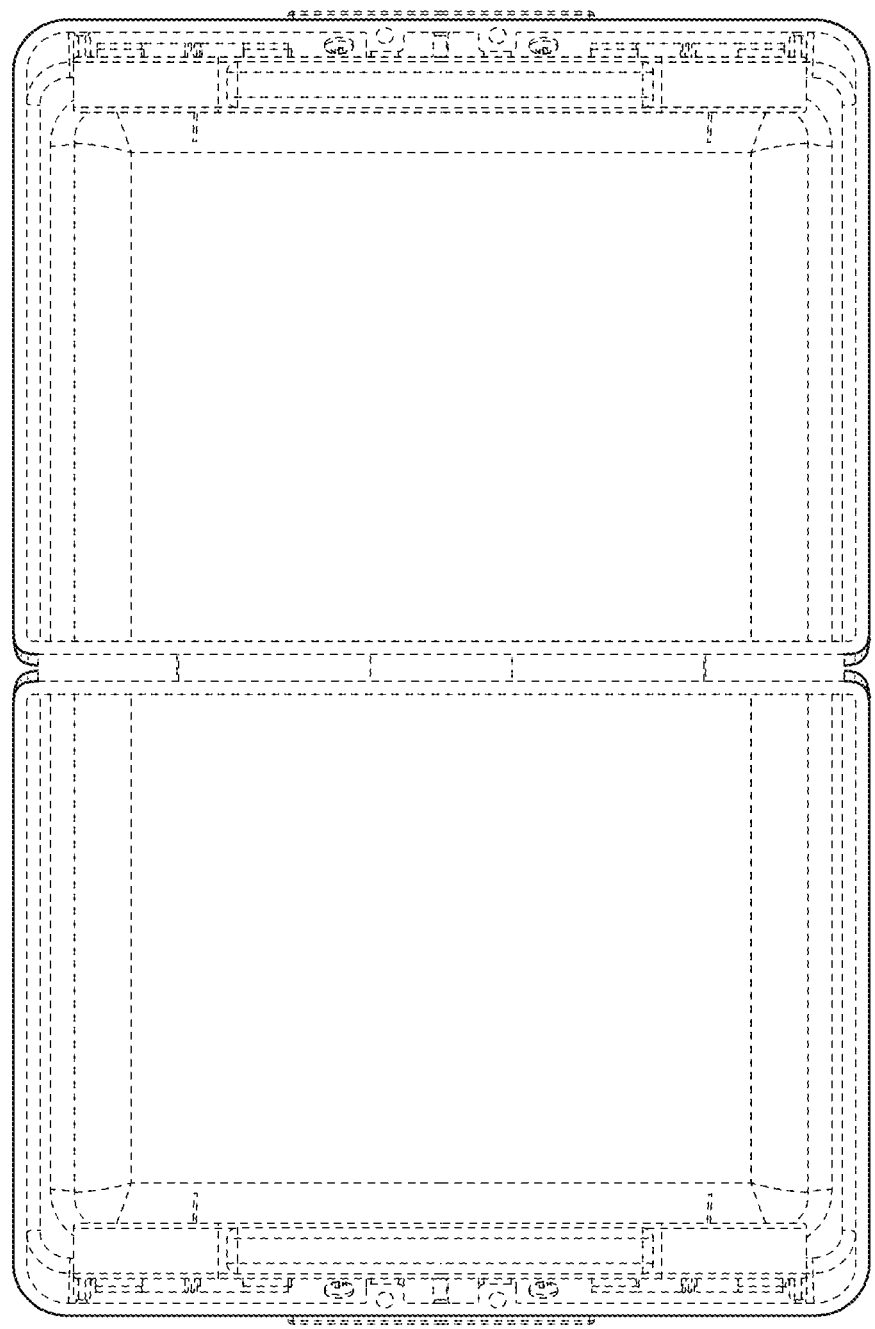
Figure 18H:
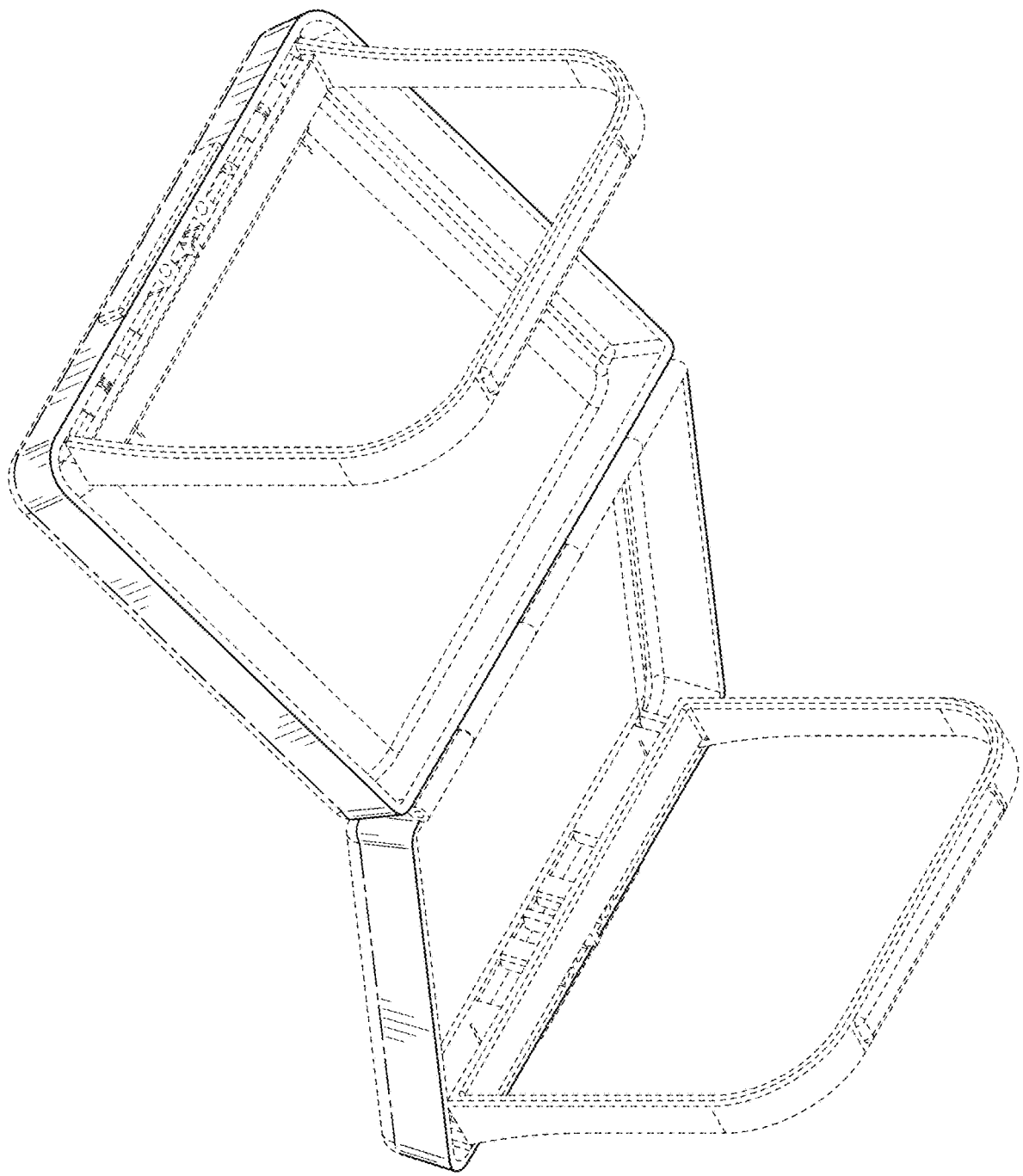
Figure 18I:
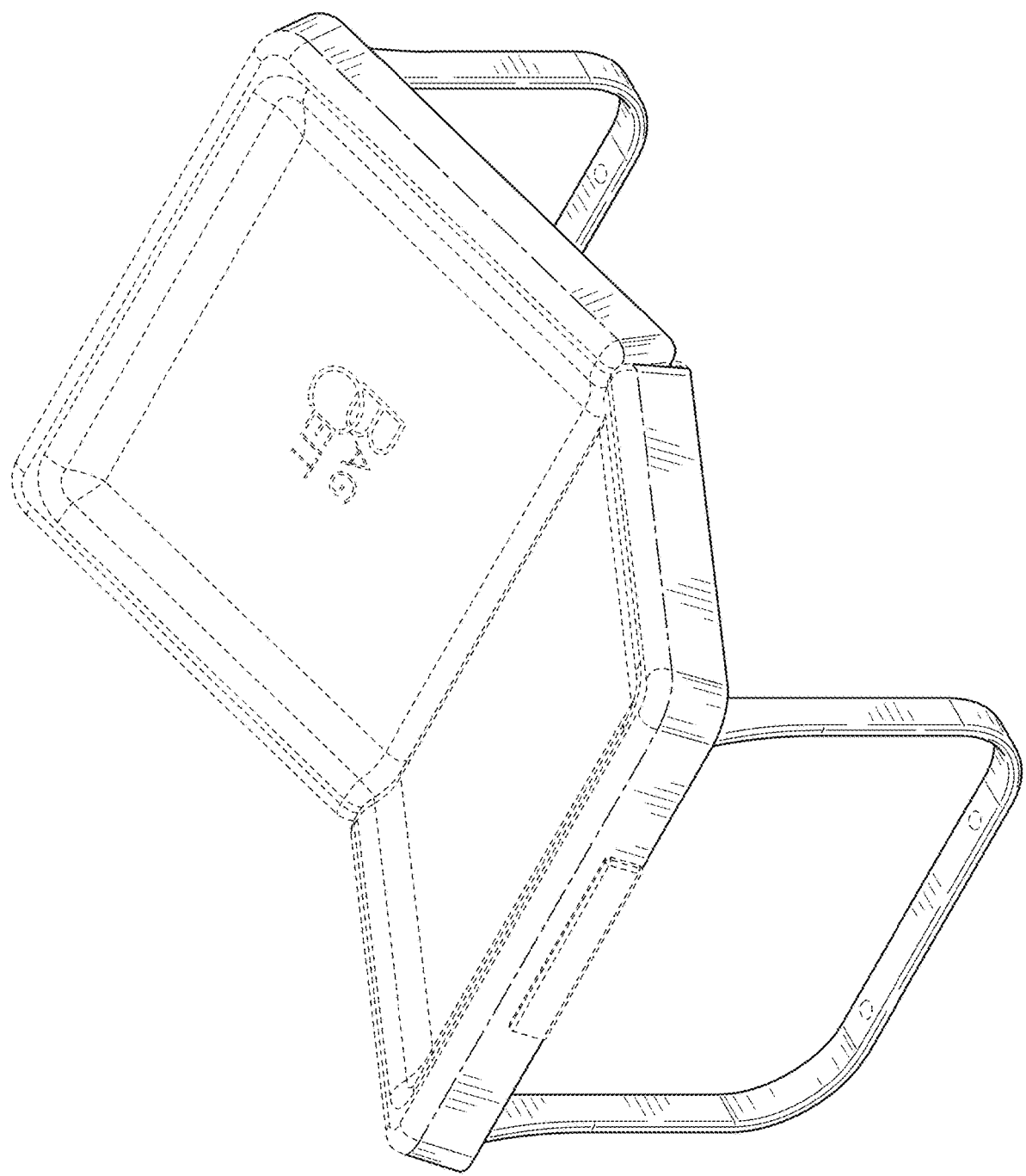
Figure 18J:
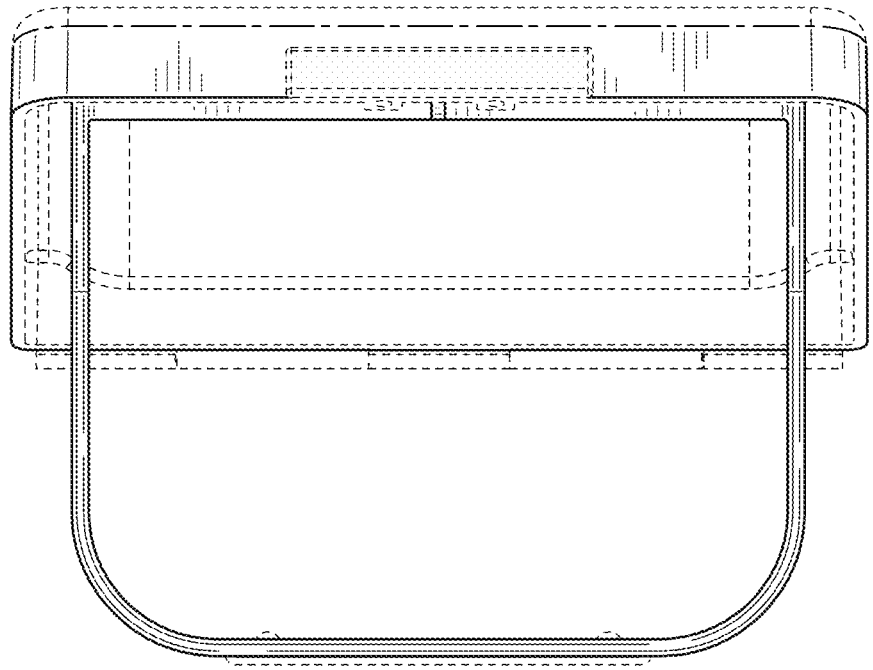
Figure 18K:
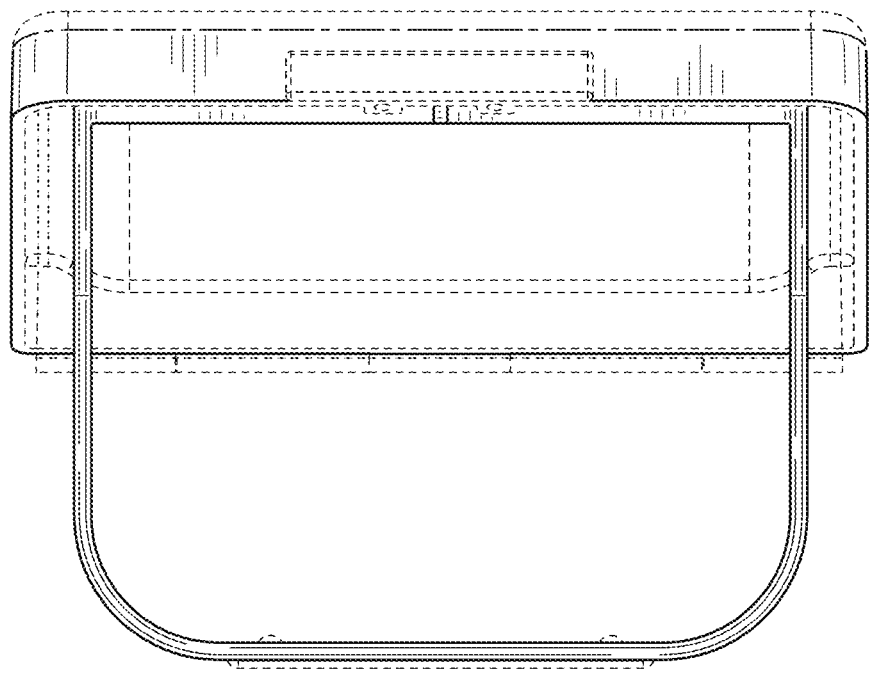
Figure 18L:
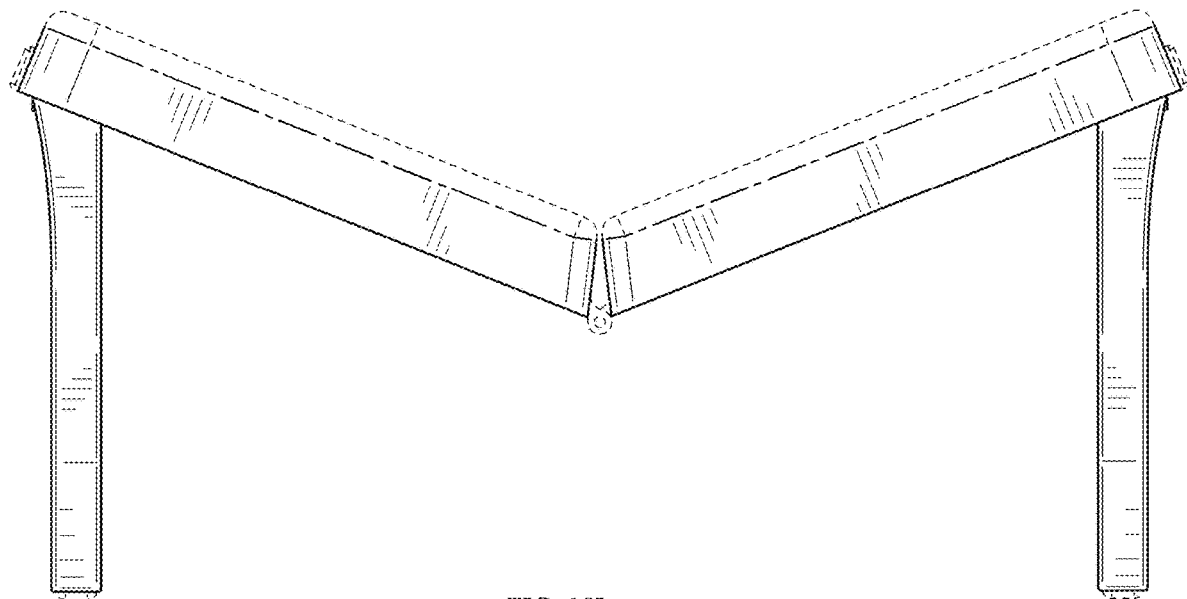
Figure 18M:
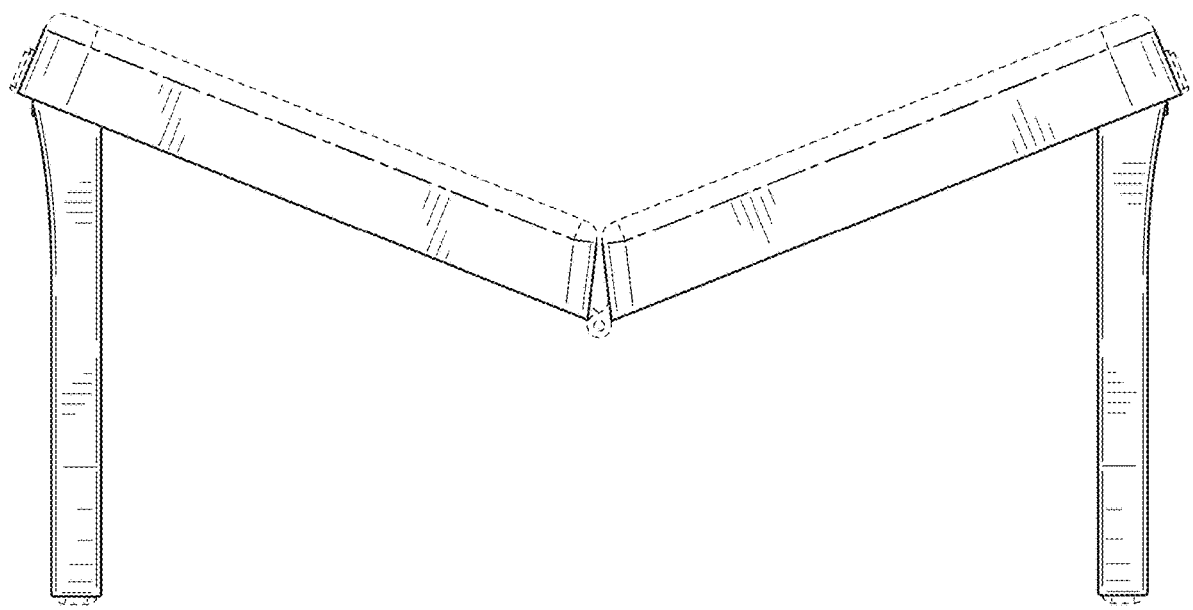
Figure 18N:
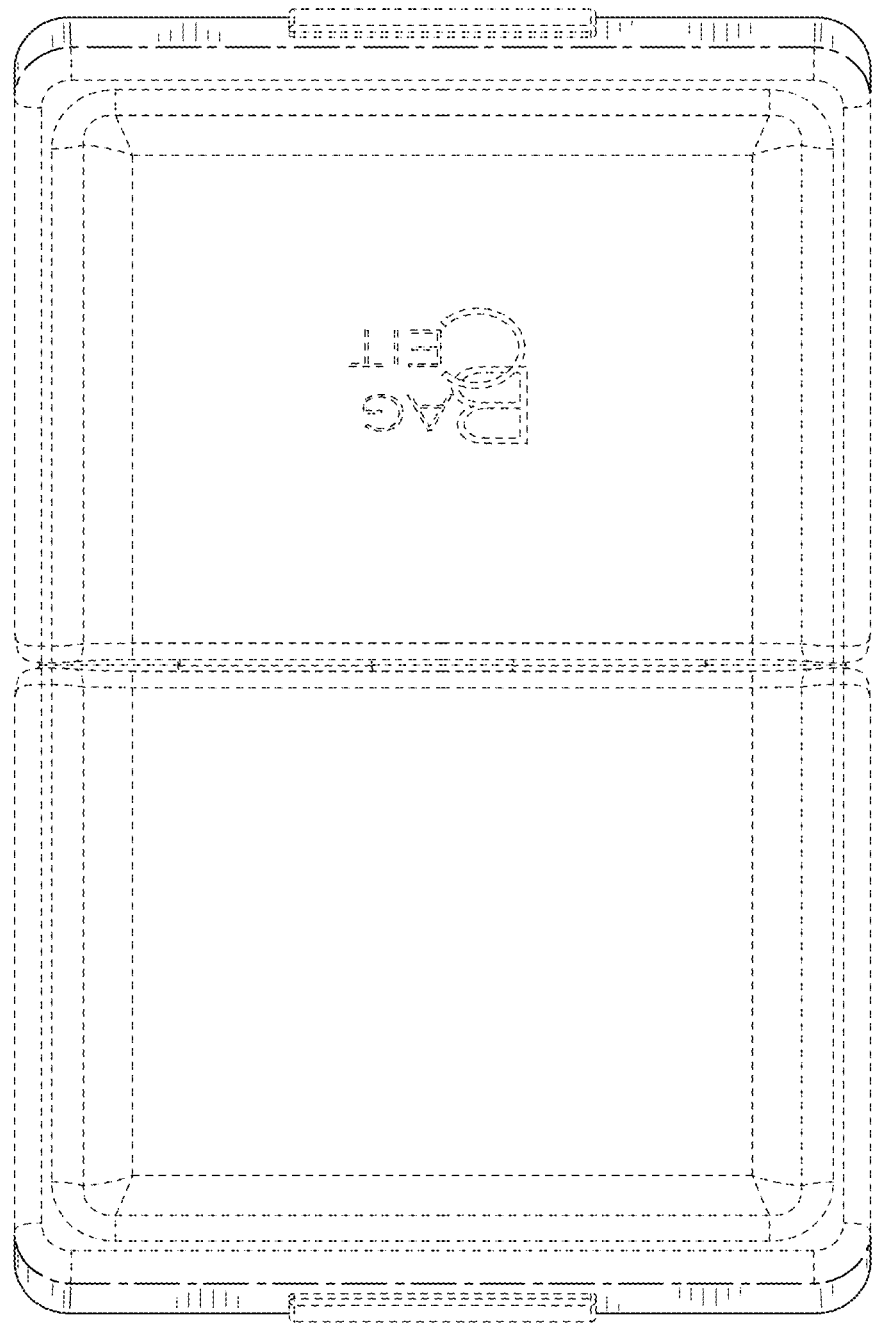
Figure 18O:
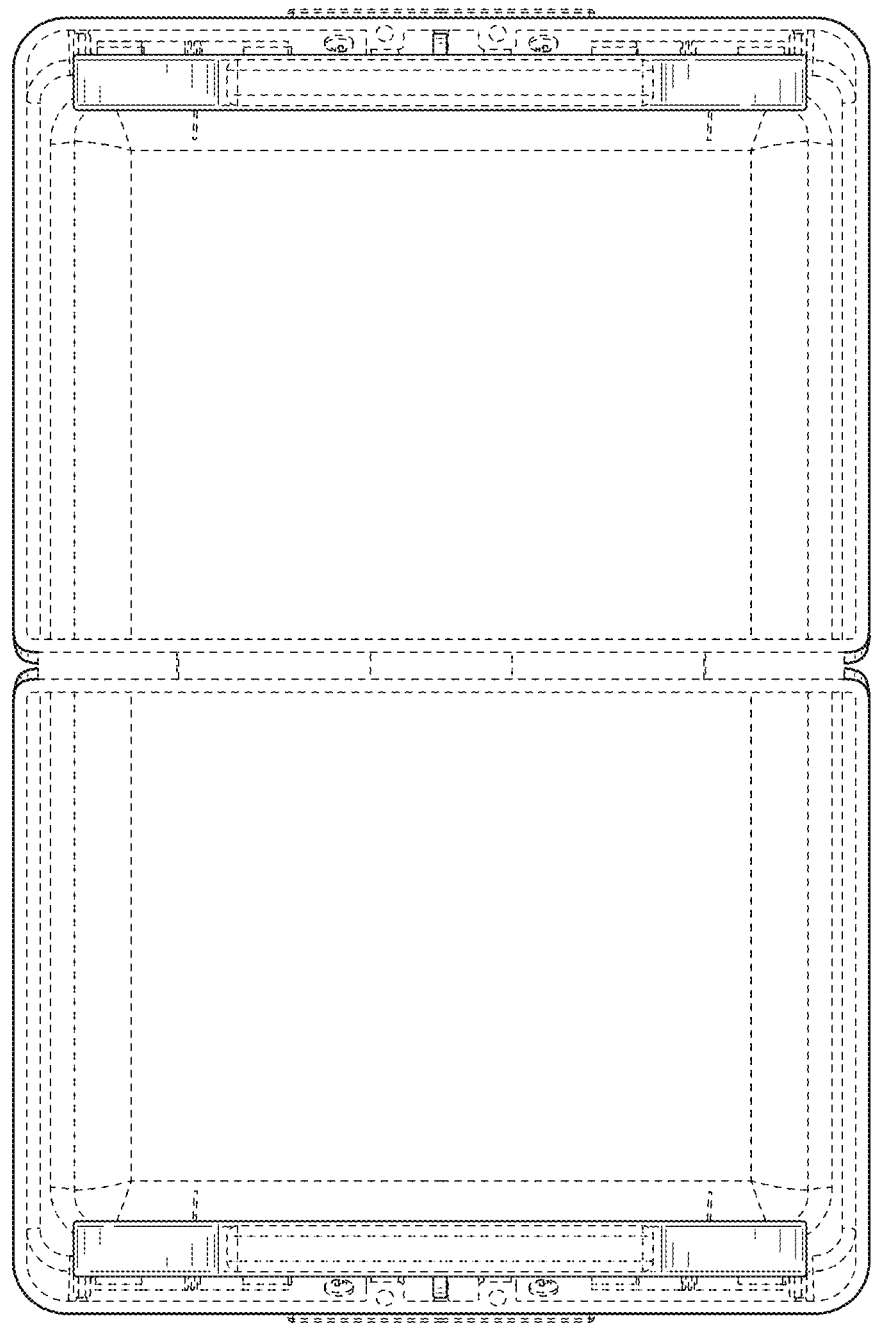
Figure 18P:
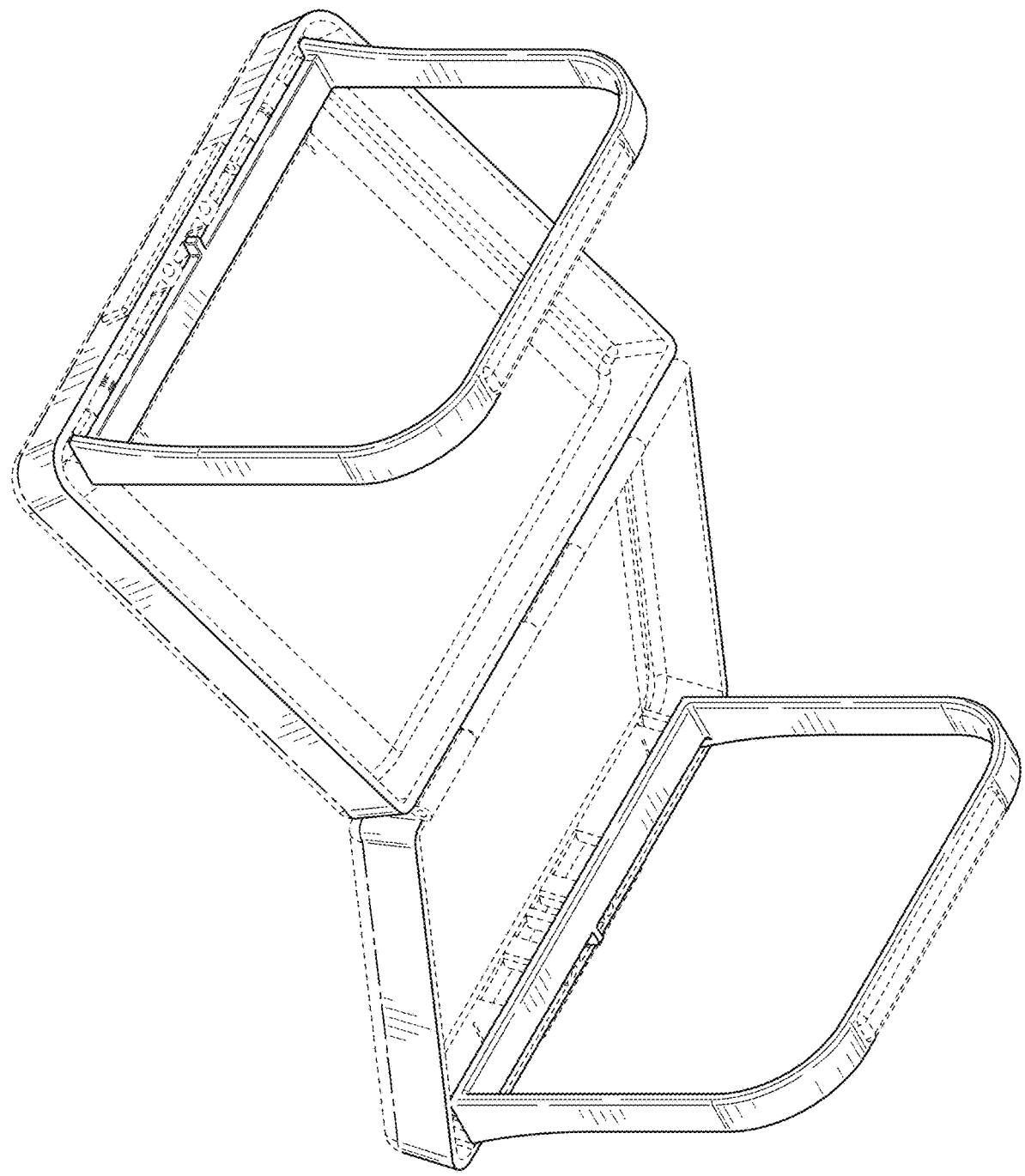
Figure 18Q:
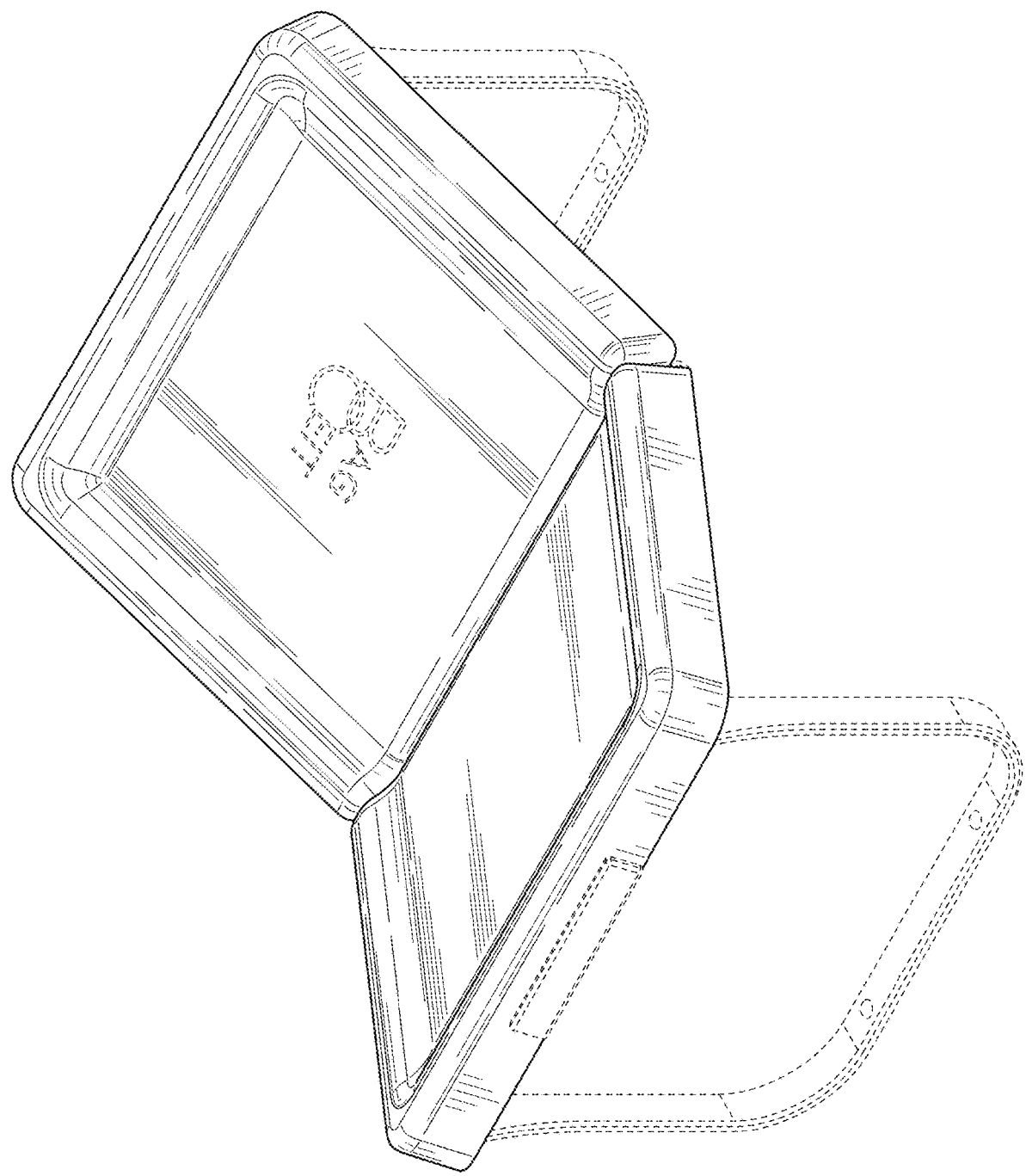
Figure 18R:
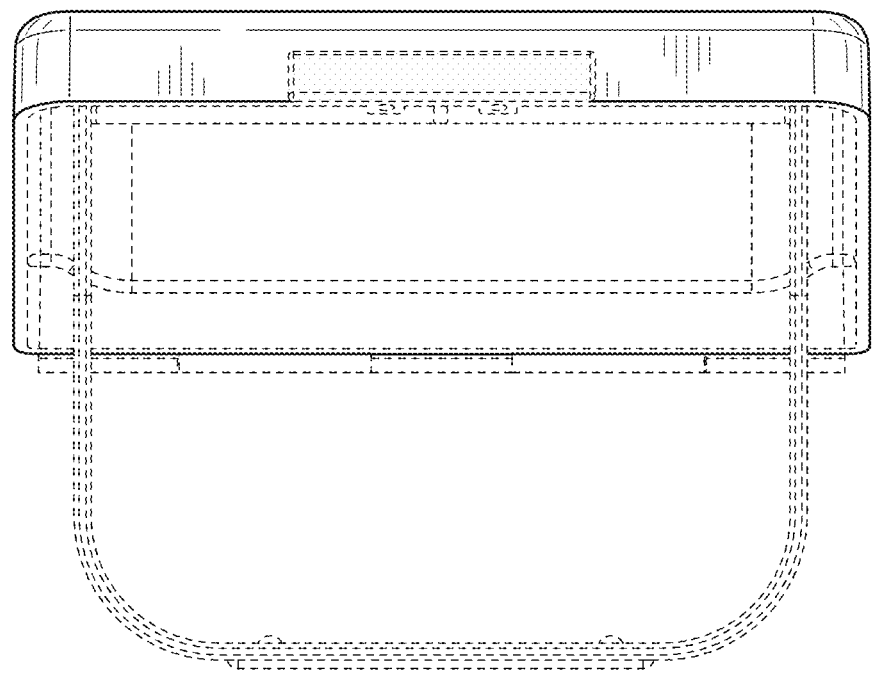
Figure 18S:
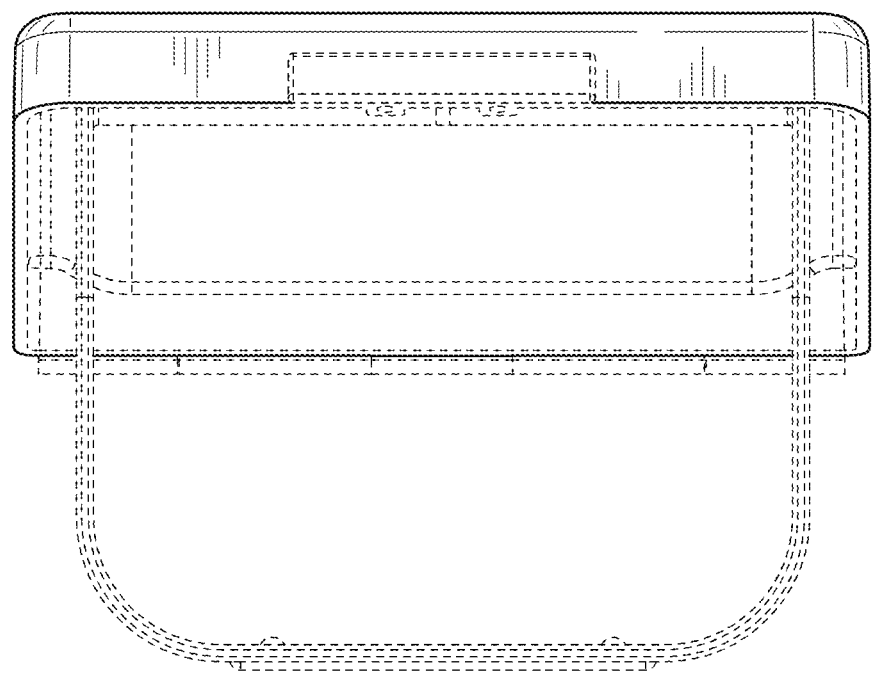
Figure 18T:
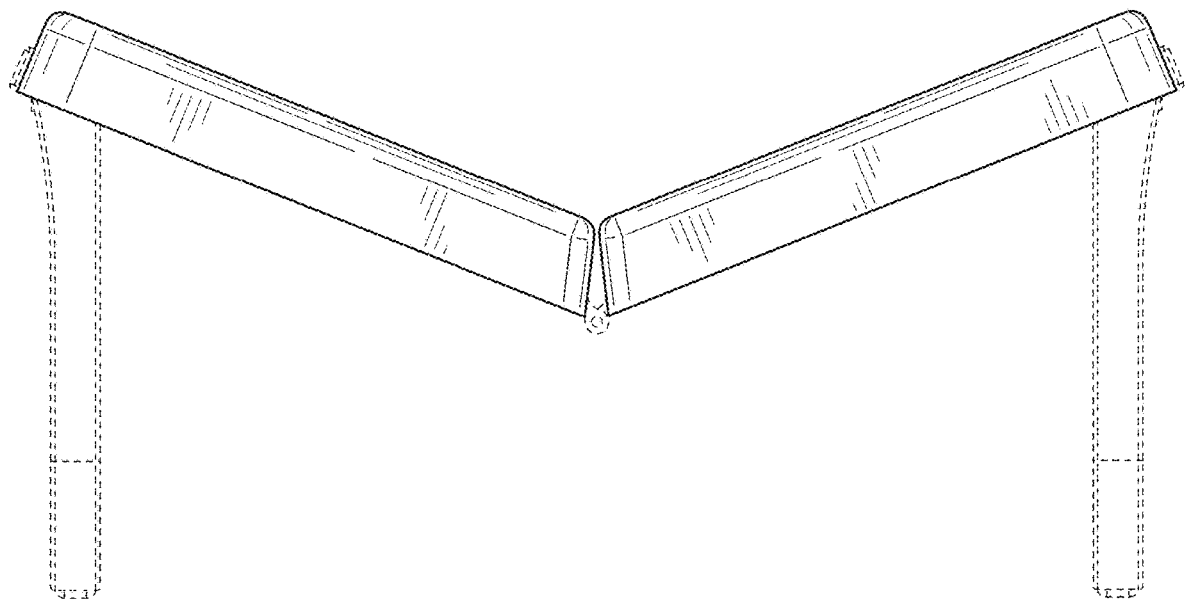
Figure 18U:
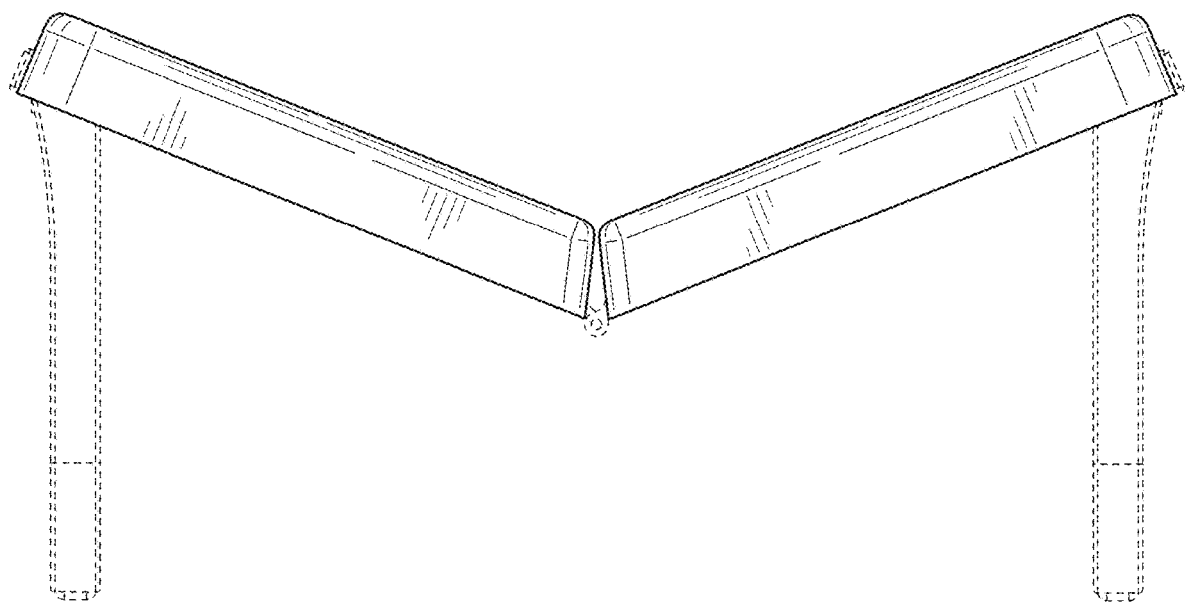
Figure 18V:
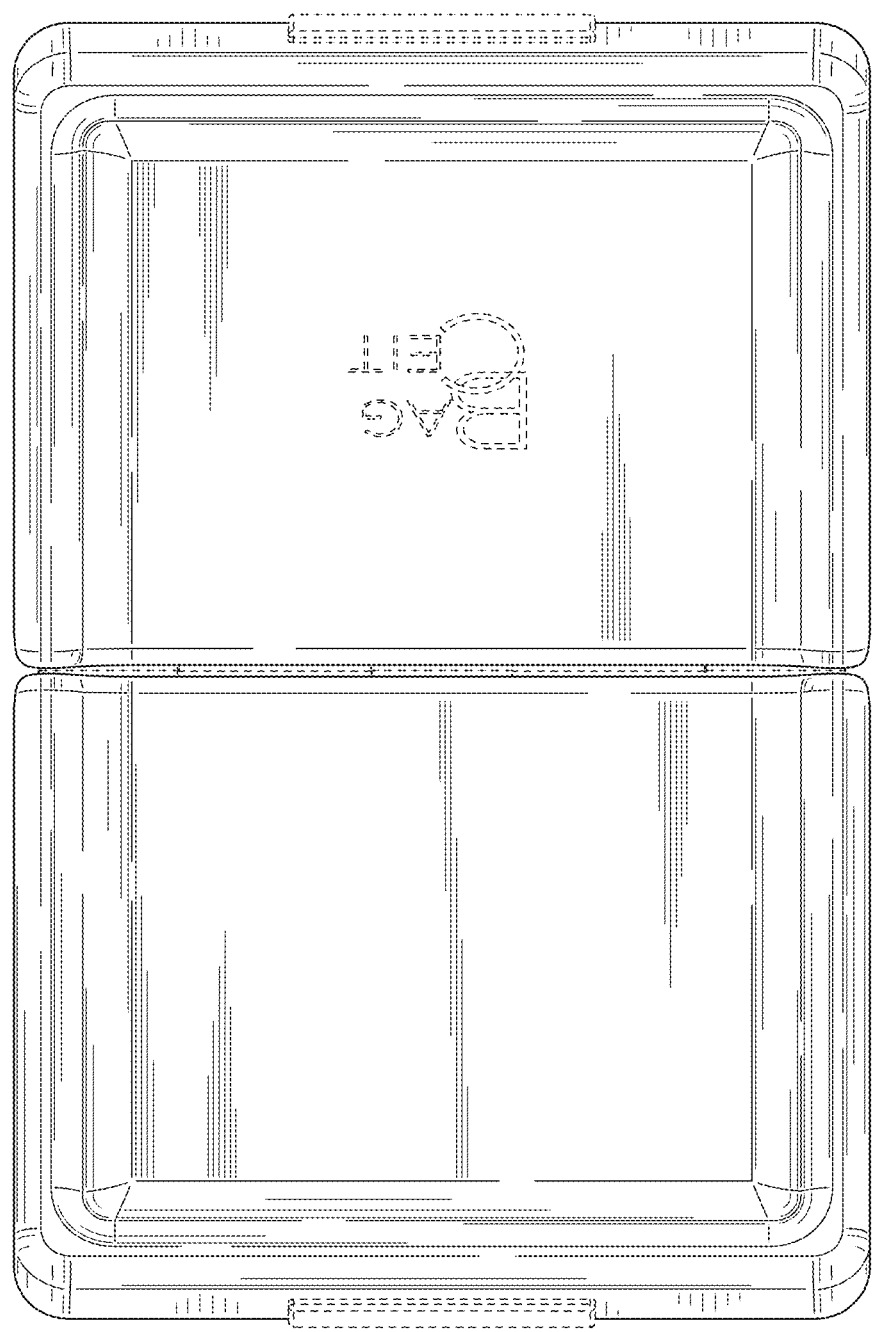
Figure 18W:
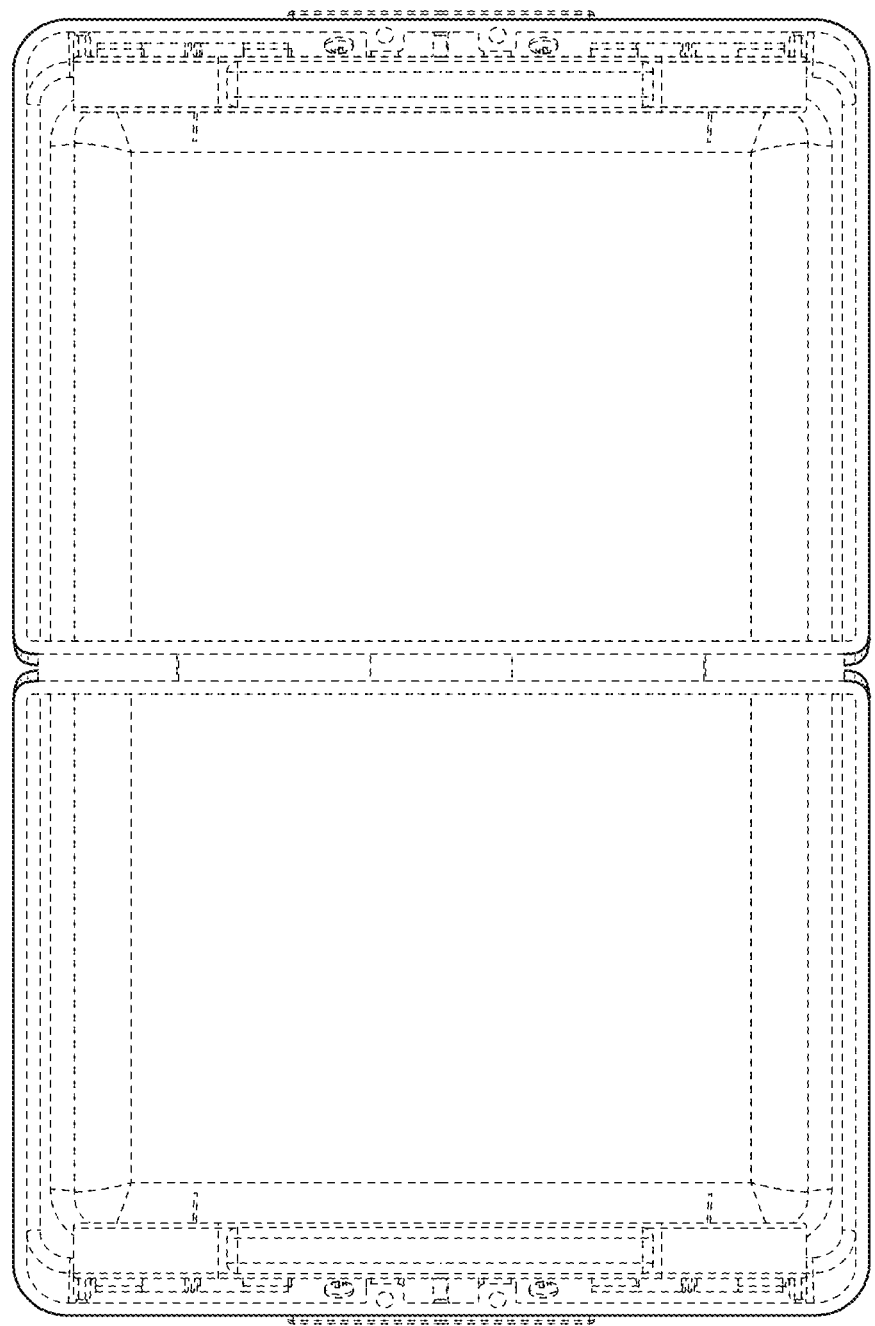

FIGS. 18A-18TT illustrate various views of various aspects/embodiments of the disclosure. FIGS. 18A-18H illustrate various views of an embodiment where the V-shape of the stand is shown in solid lines. FIGS. 18I-18P illustrate various views of an embodiment where the V shape of the stand and the legs are shown in solid lines.

Figure 18X:
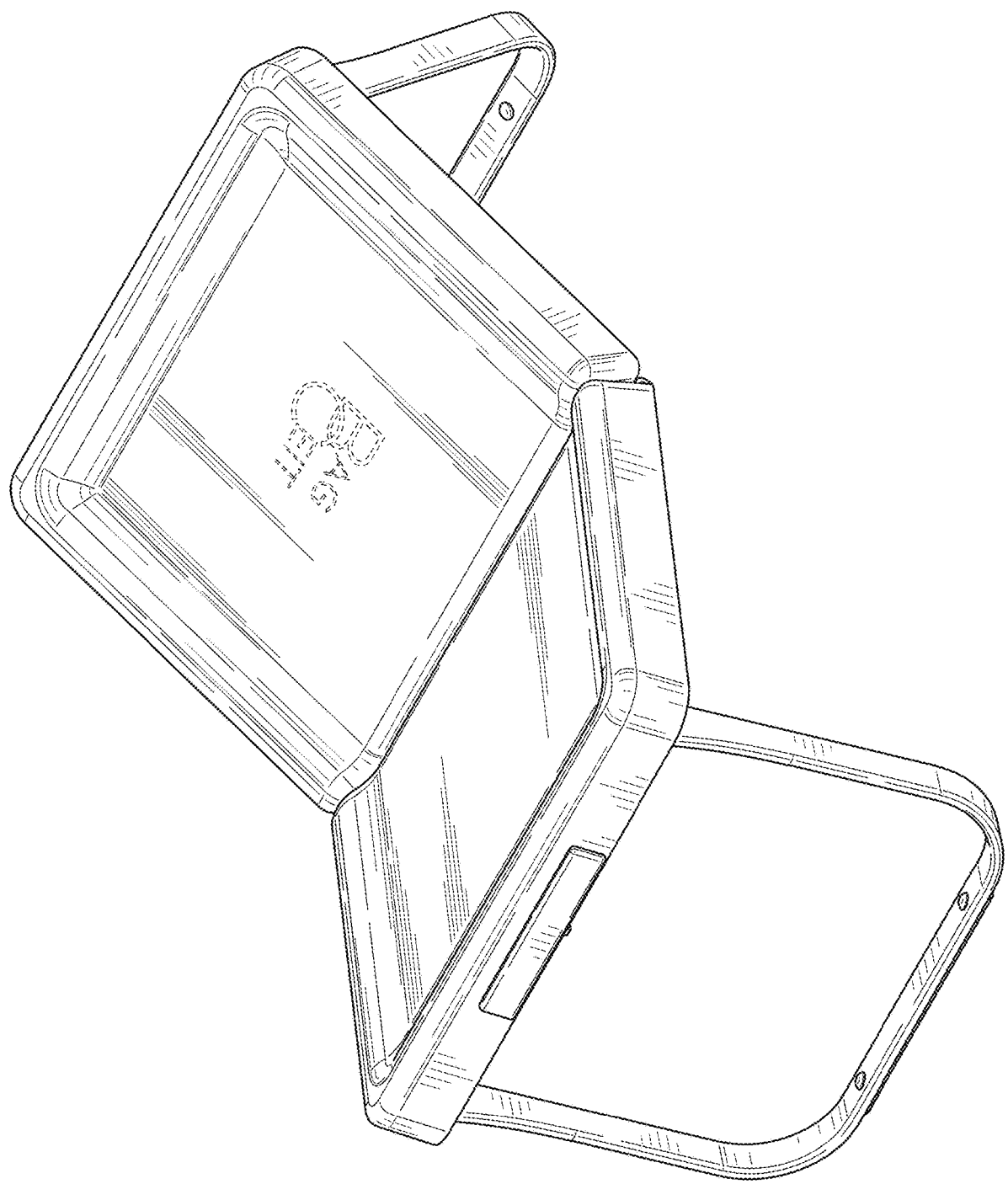
Figure 18Y:
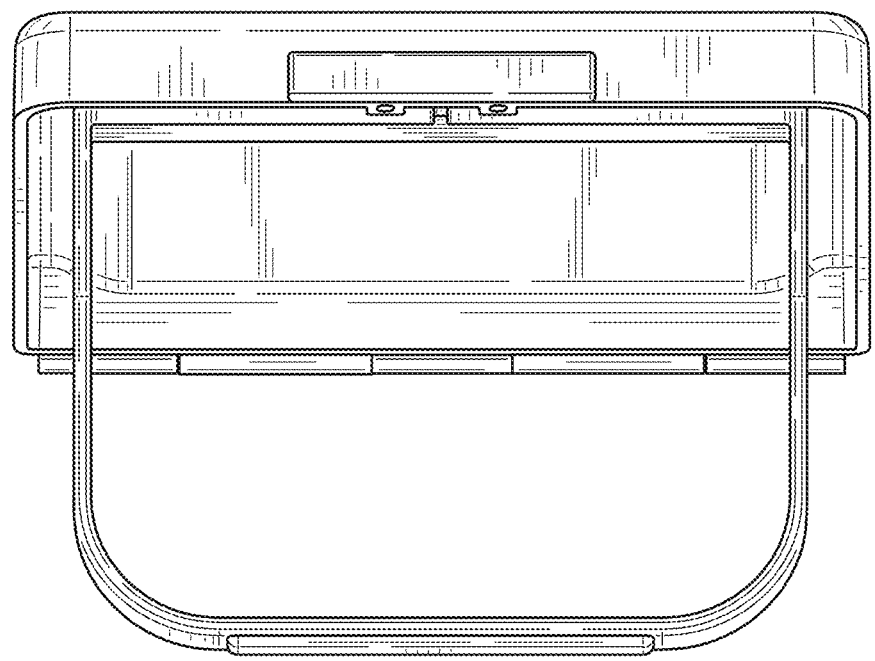
Figure 18Z:
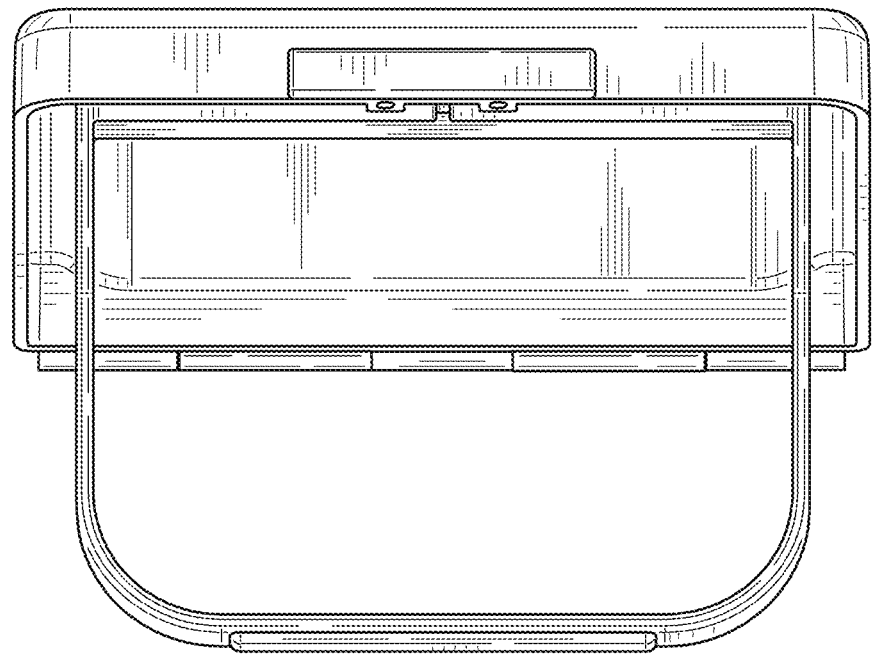
Figure 18A:
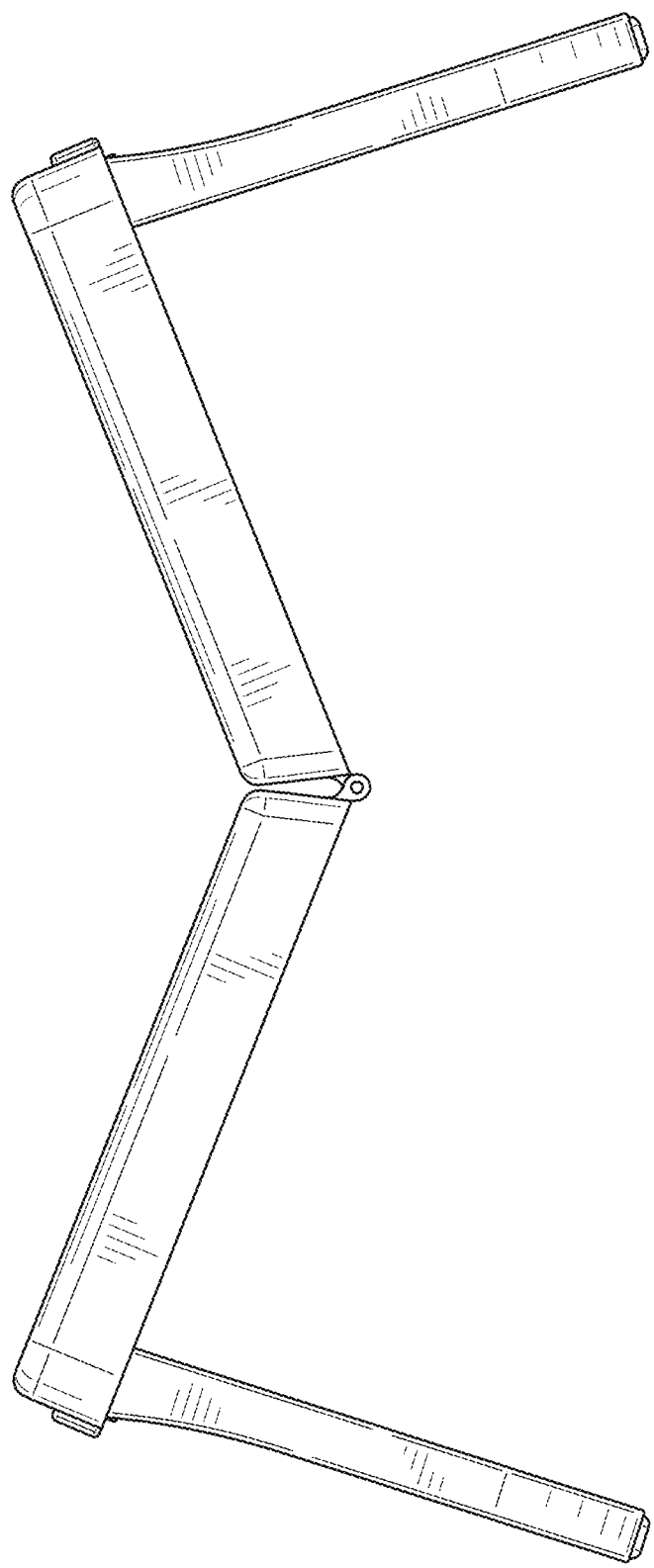
Figure 18B:
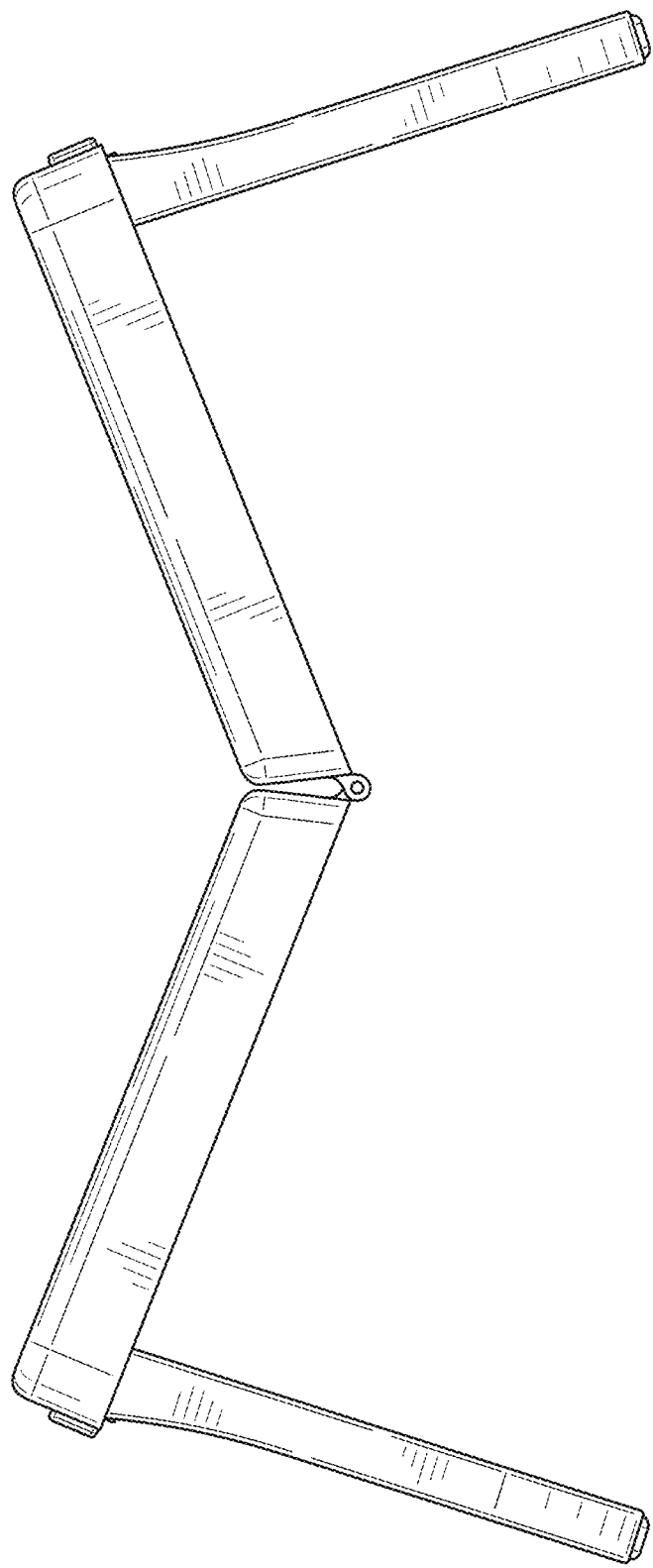
Figure 18C:
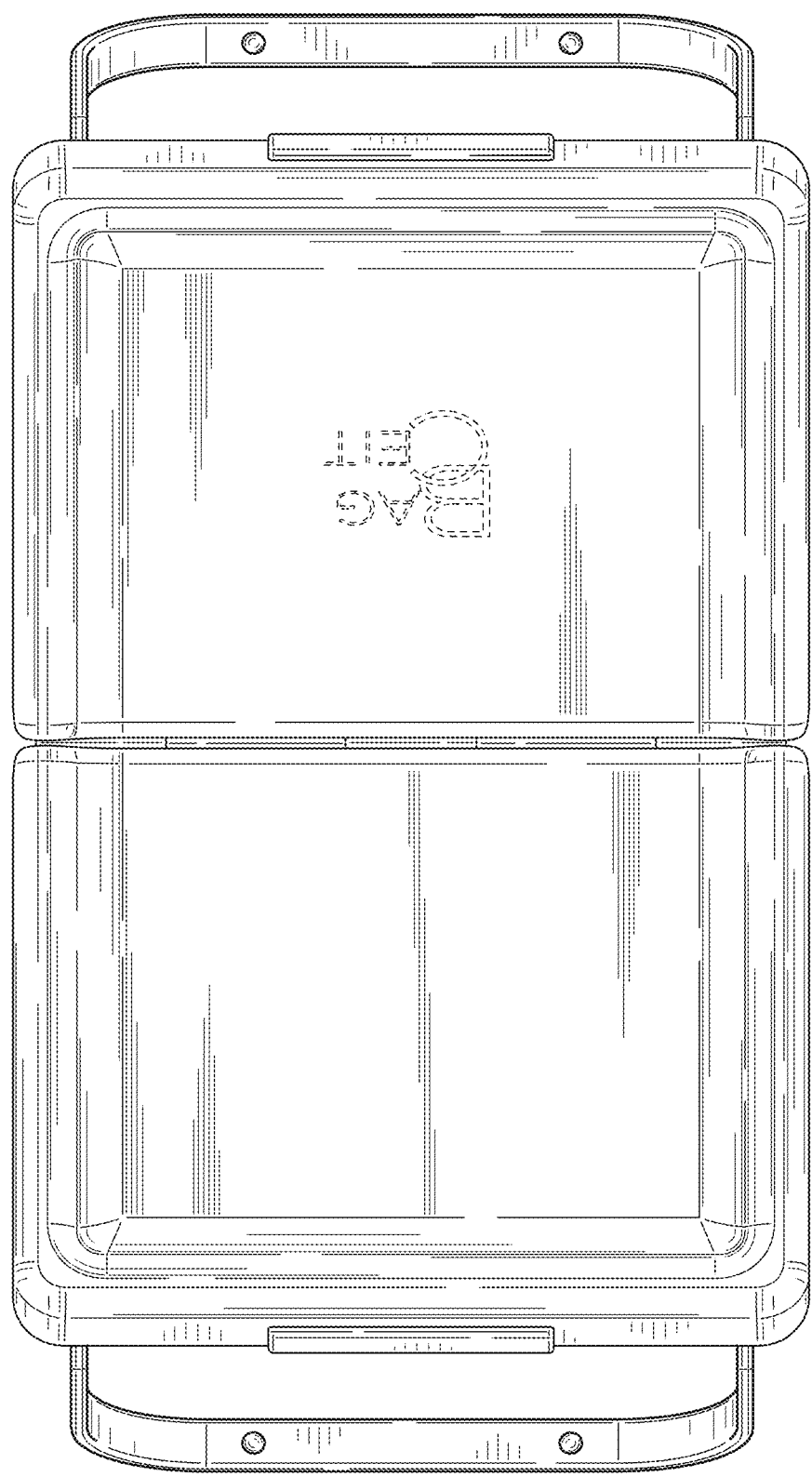
Figure 18D:
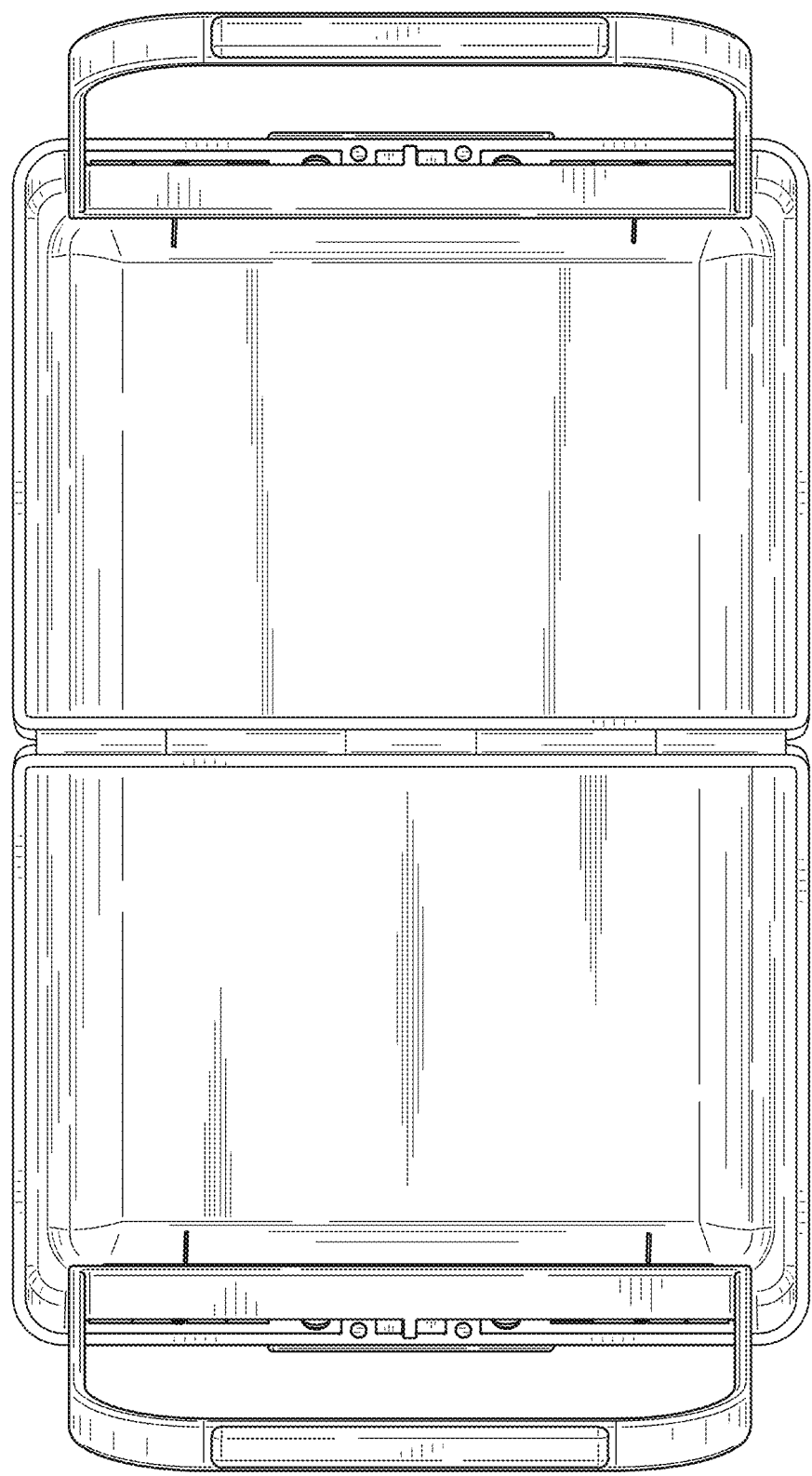
Figure 18E:
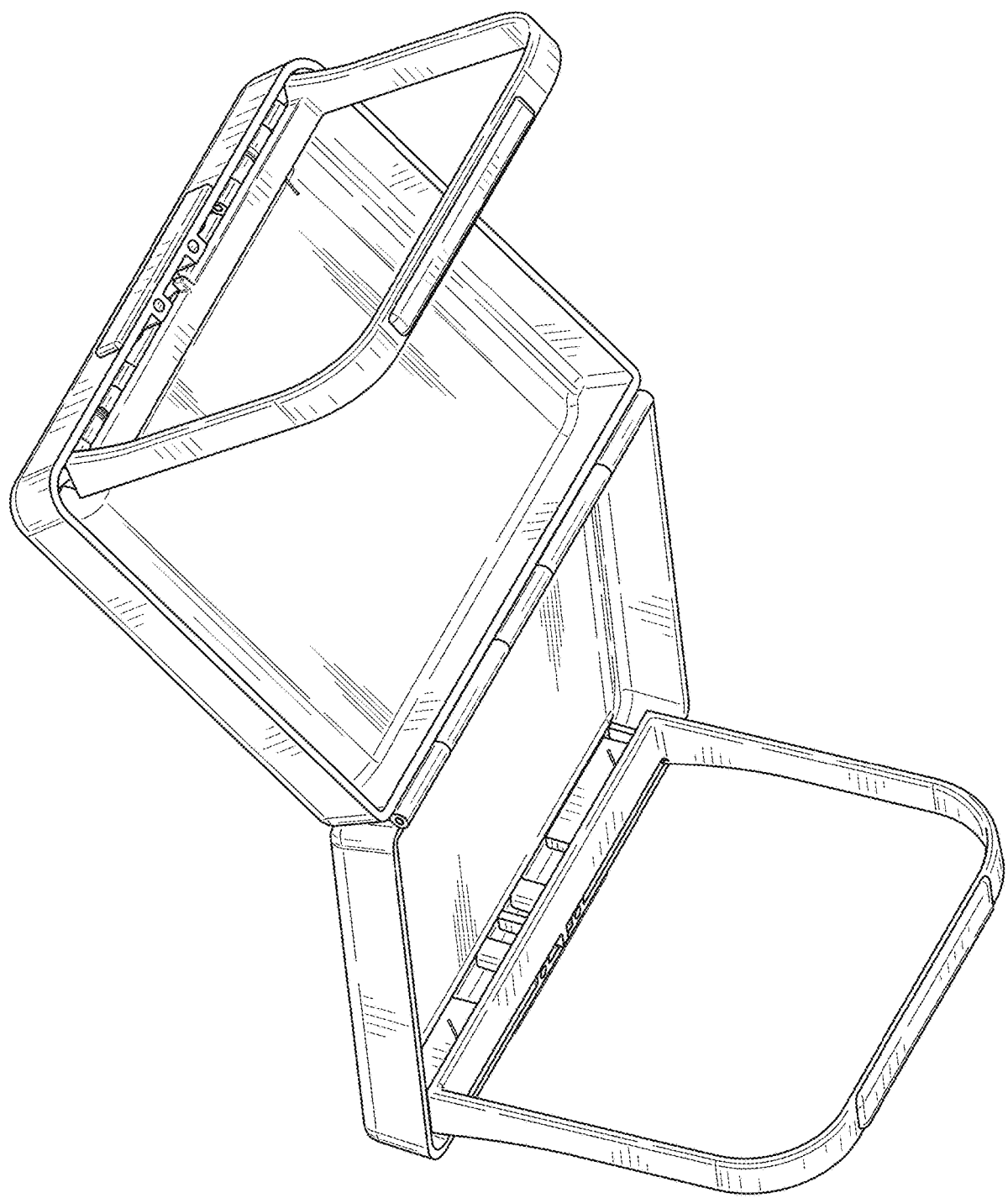
Figure 18F:
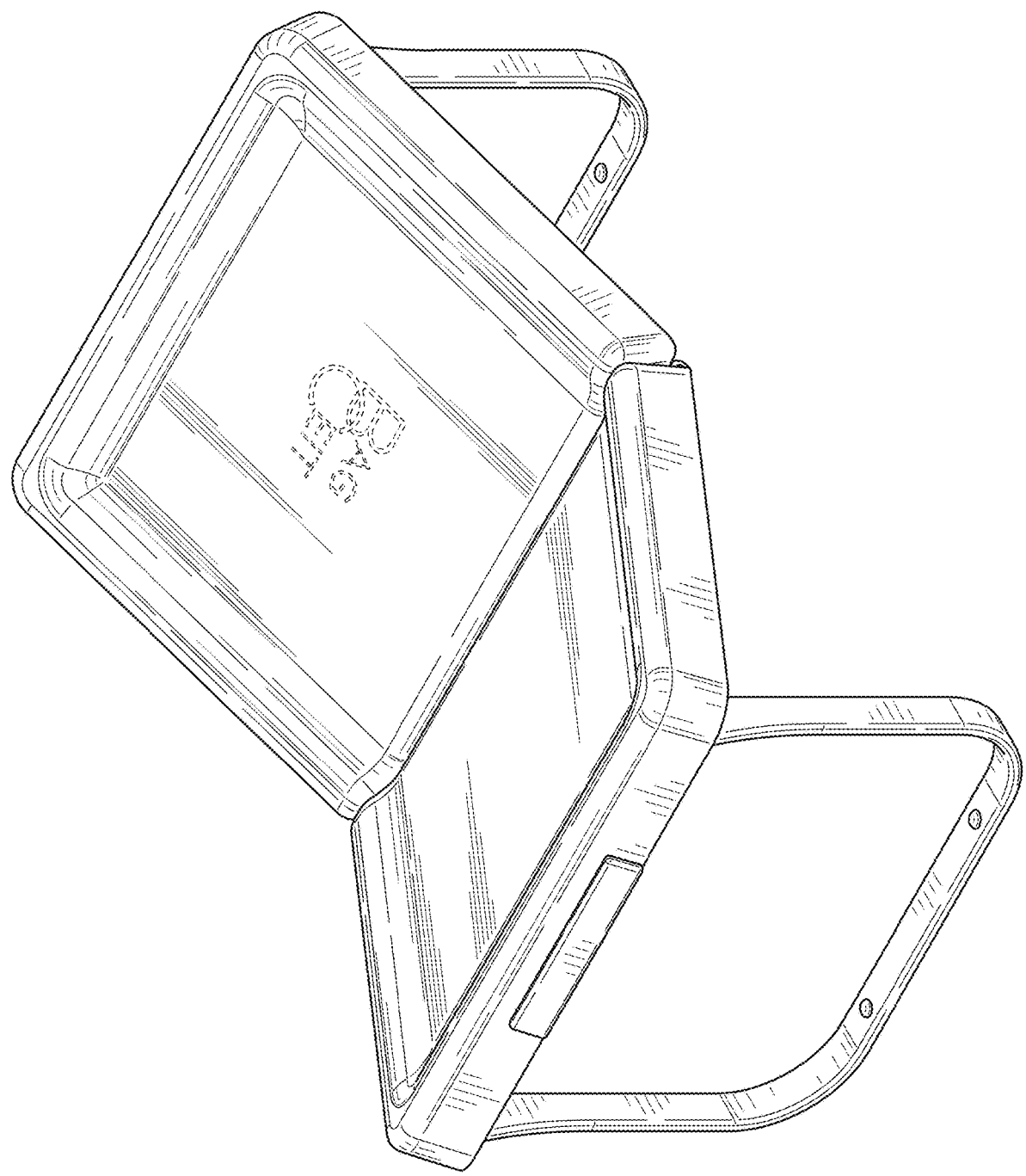
Figure 18G:
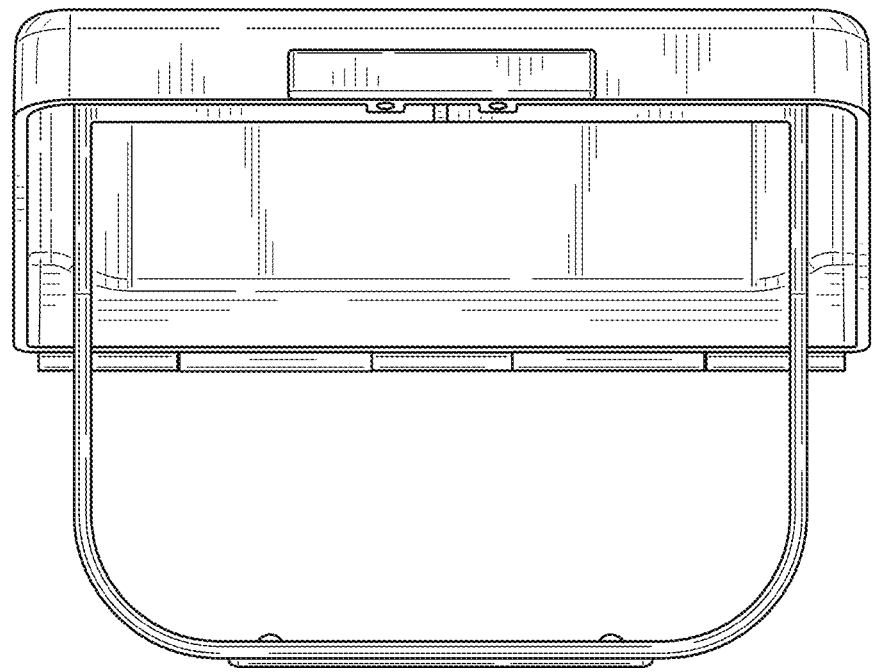
Figure 18H:
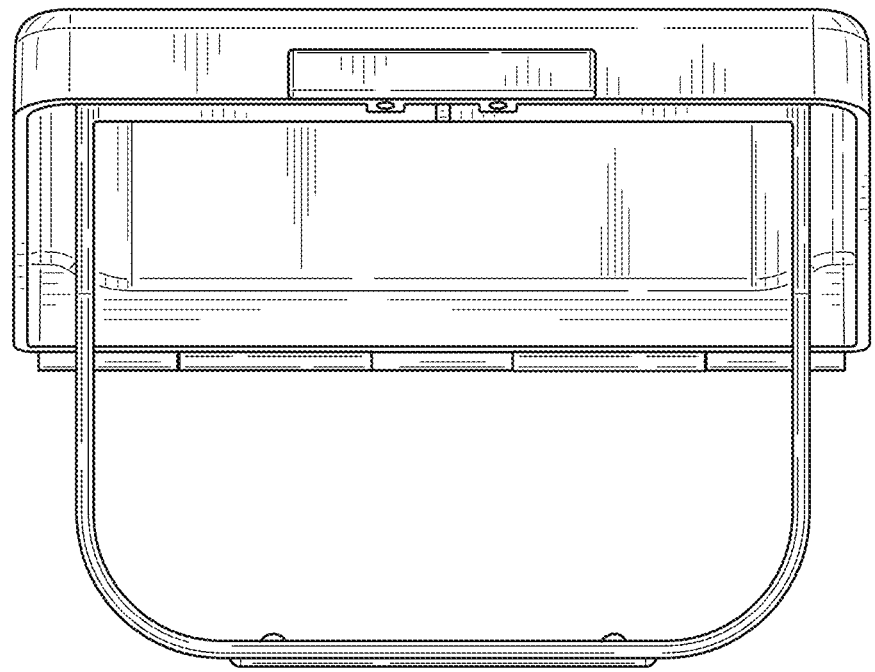
Figure 18I:
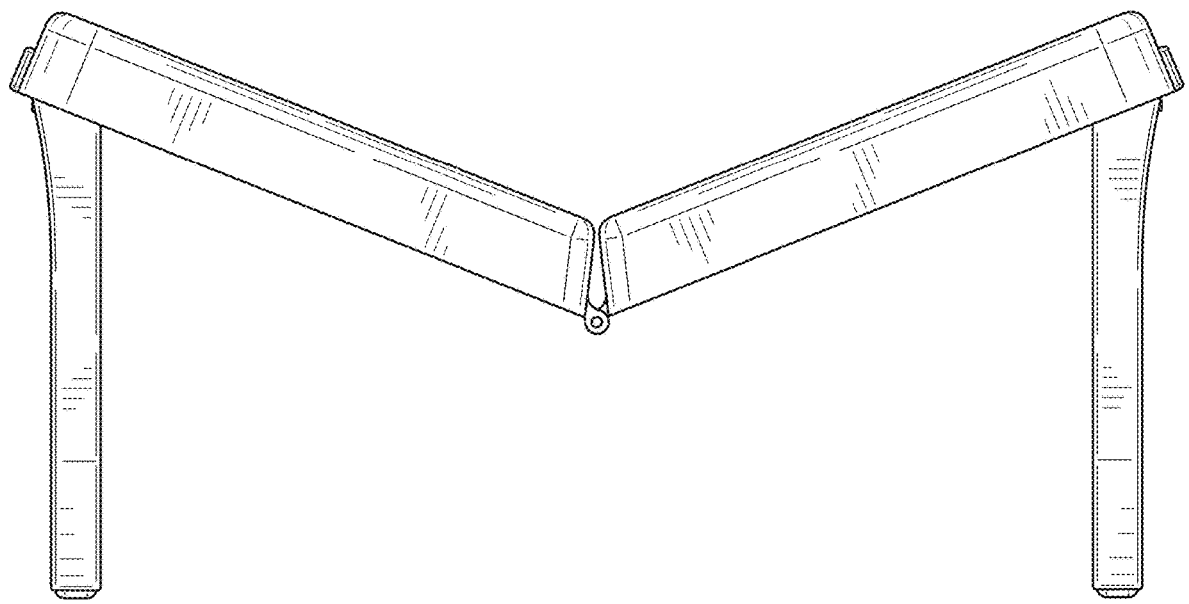
Figure 18J:
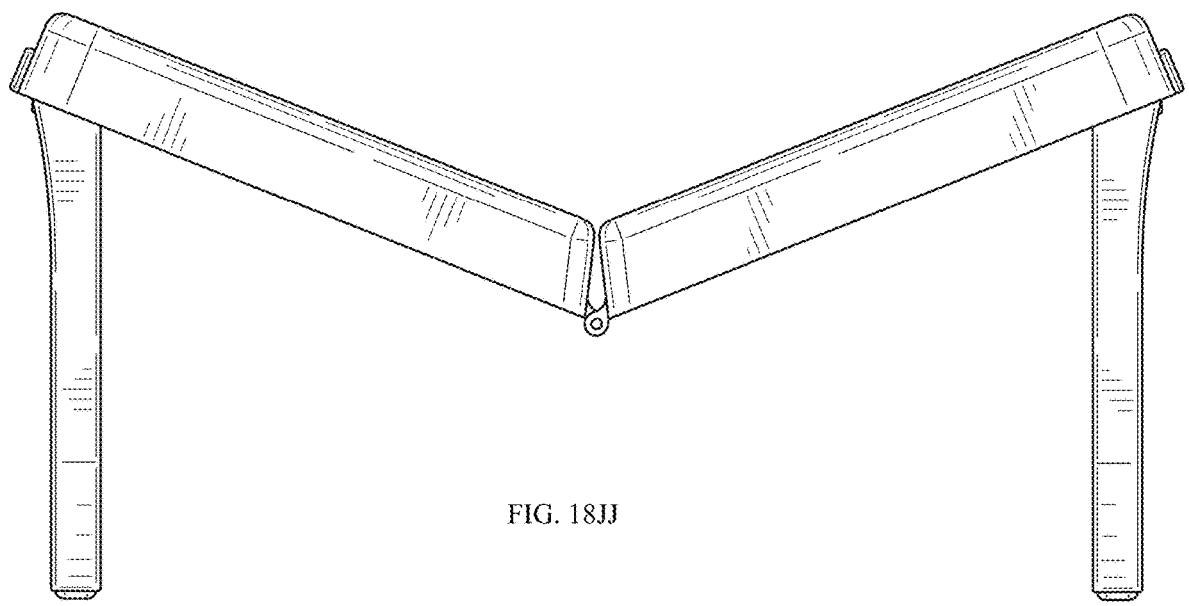
Figure 18K:
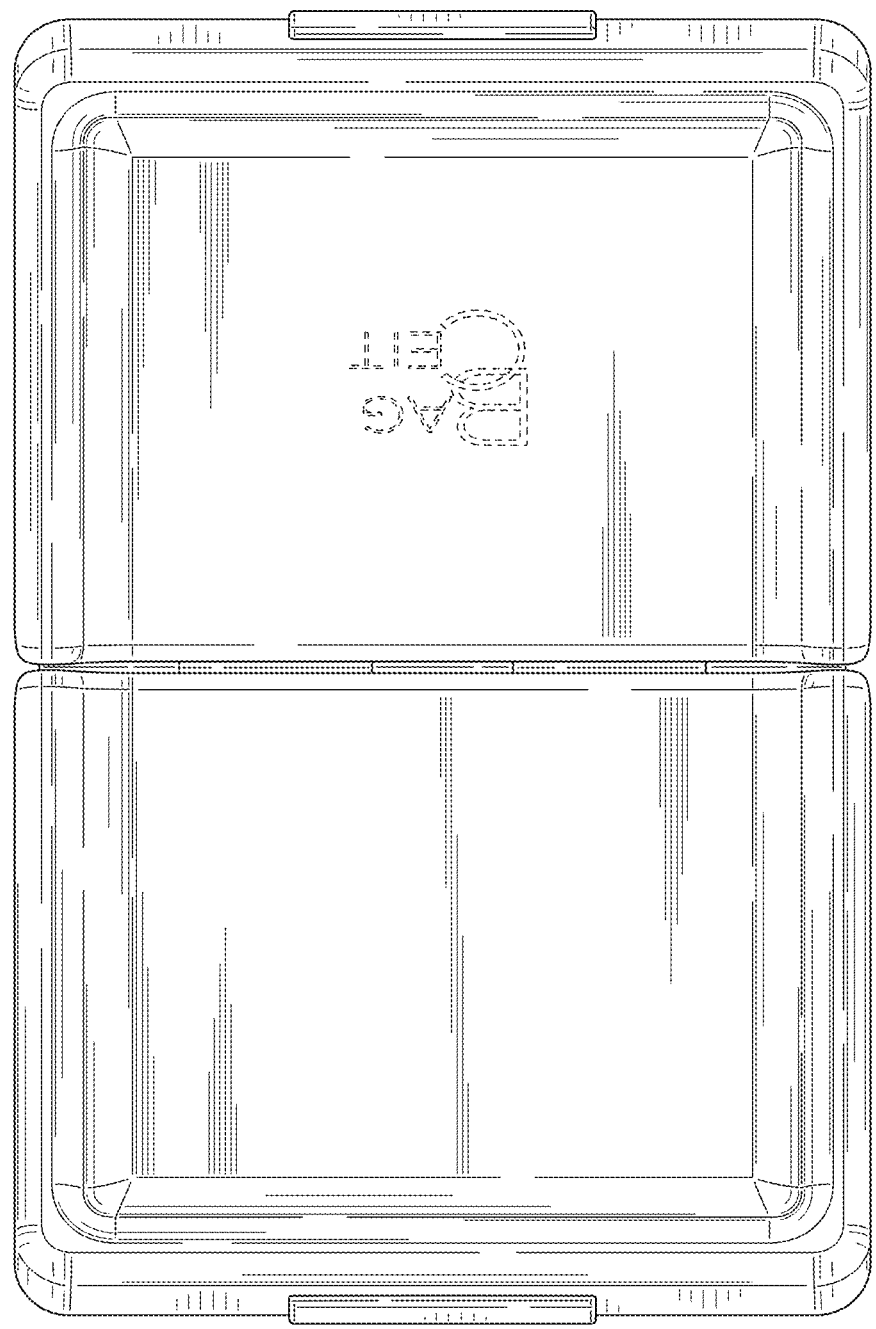
Figure 18L:
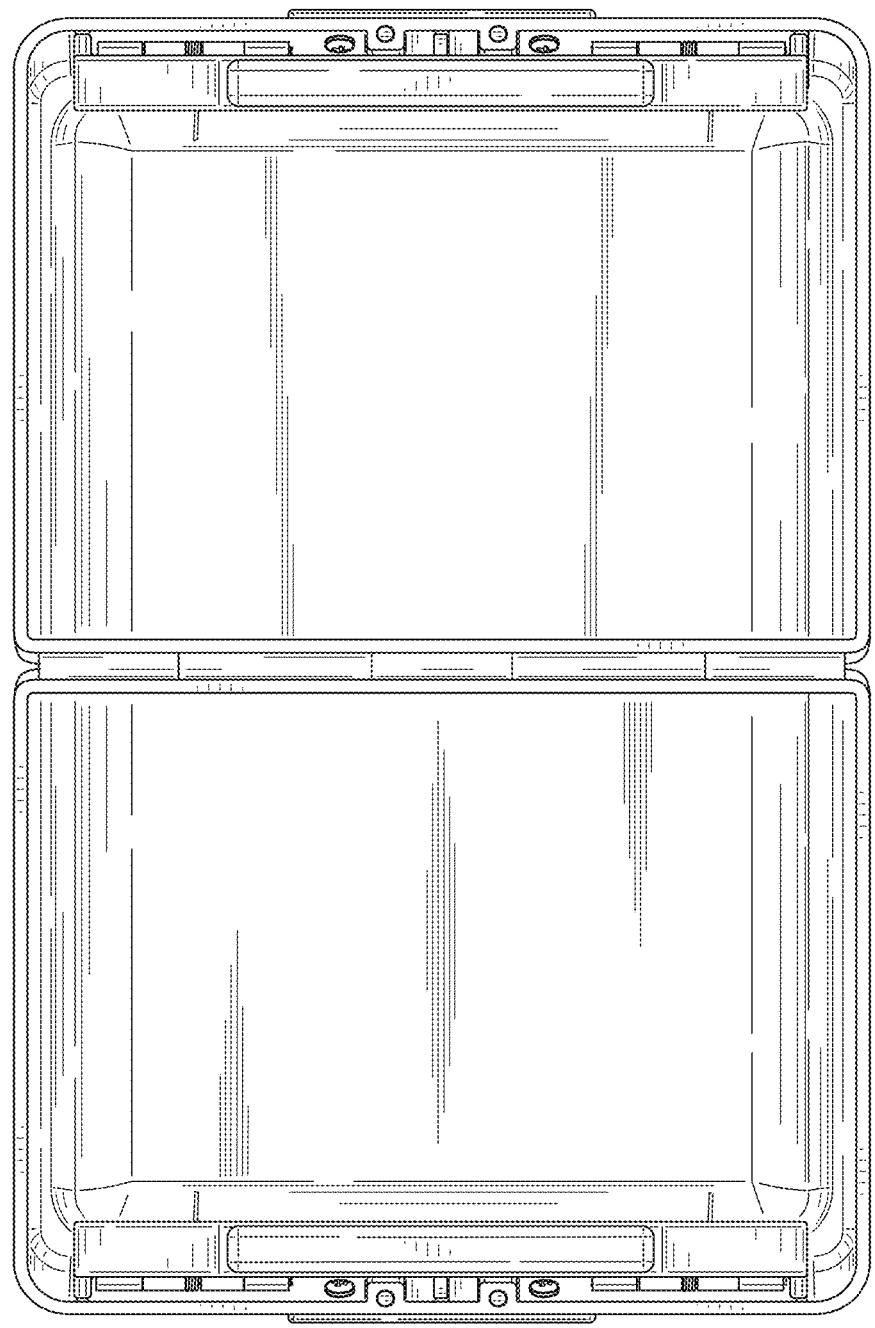
Figure 18M:
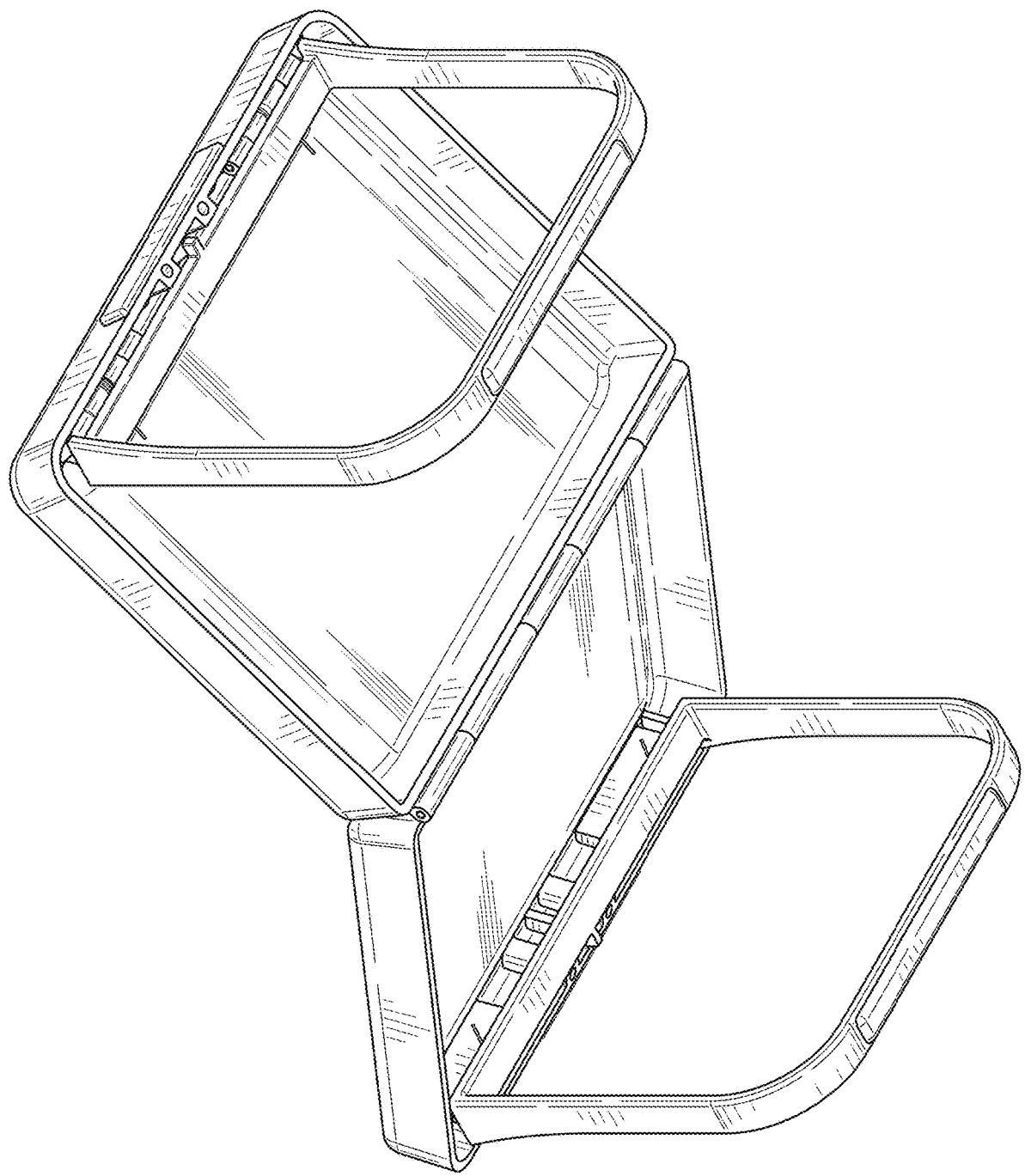
Figure 18N:
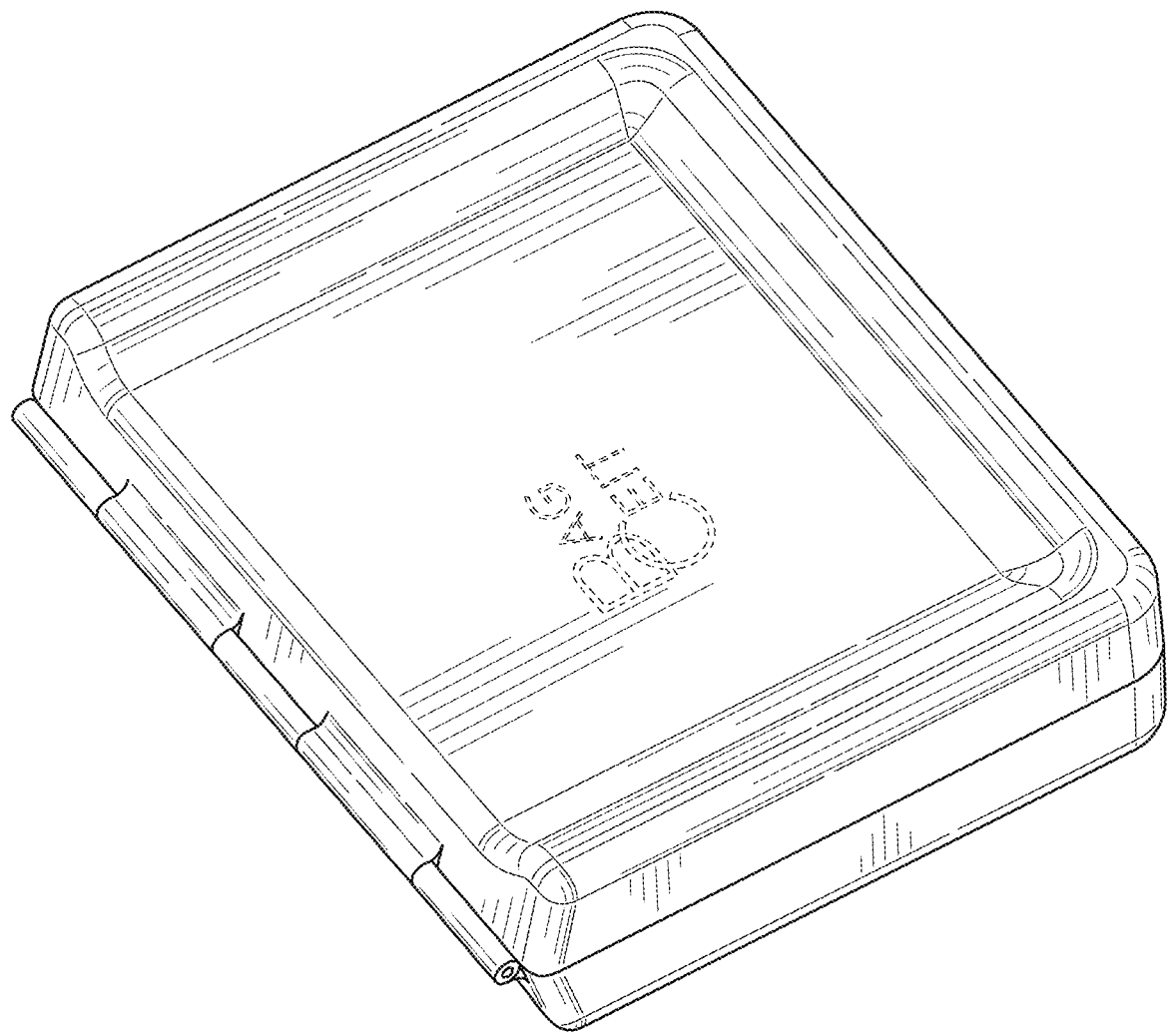
Figure 18O:
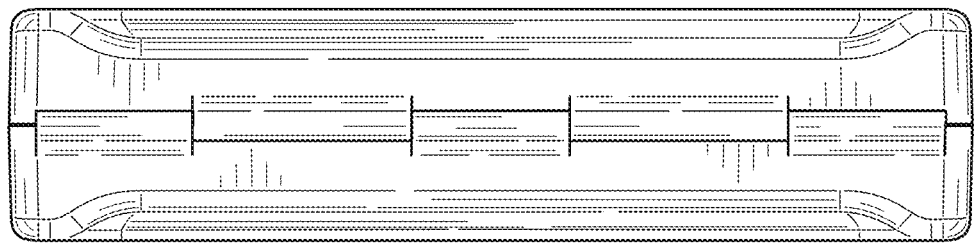
Figure 18P:
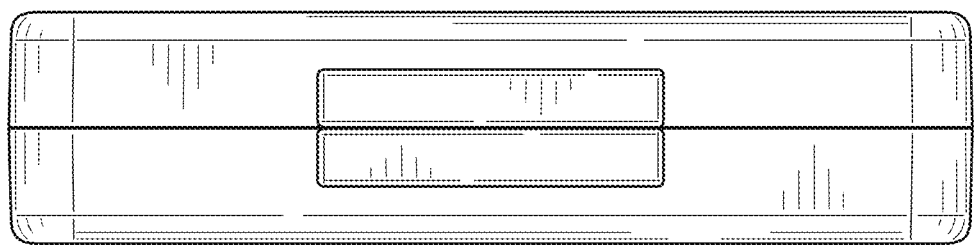
Figure 18Q:
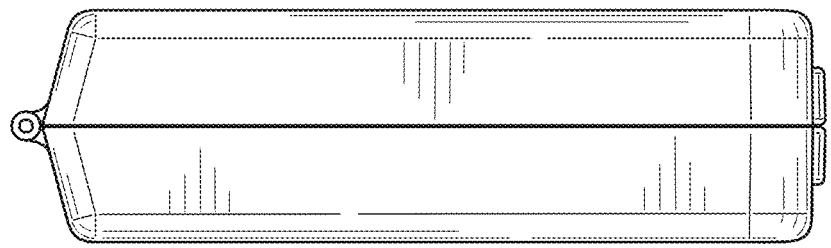
Figure 18R:
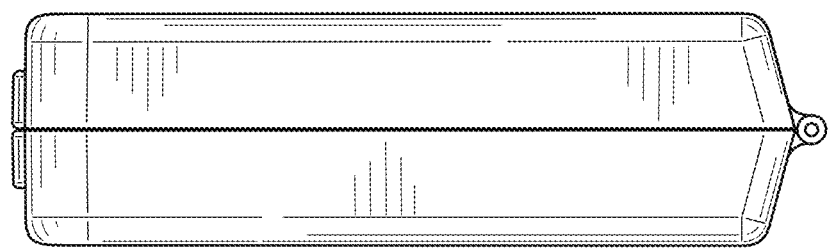
Figure 18S:
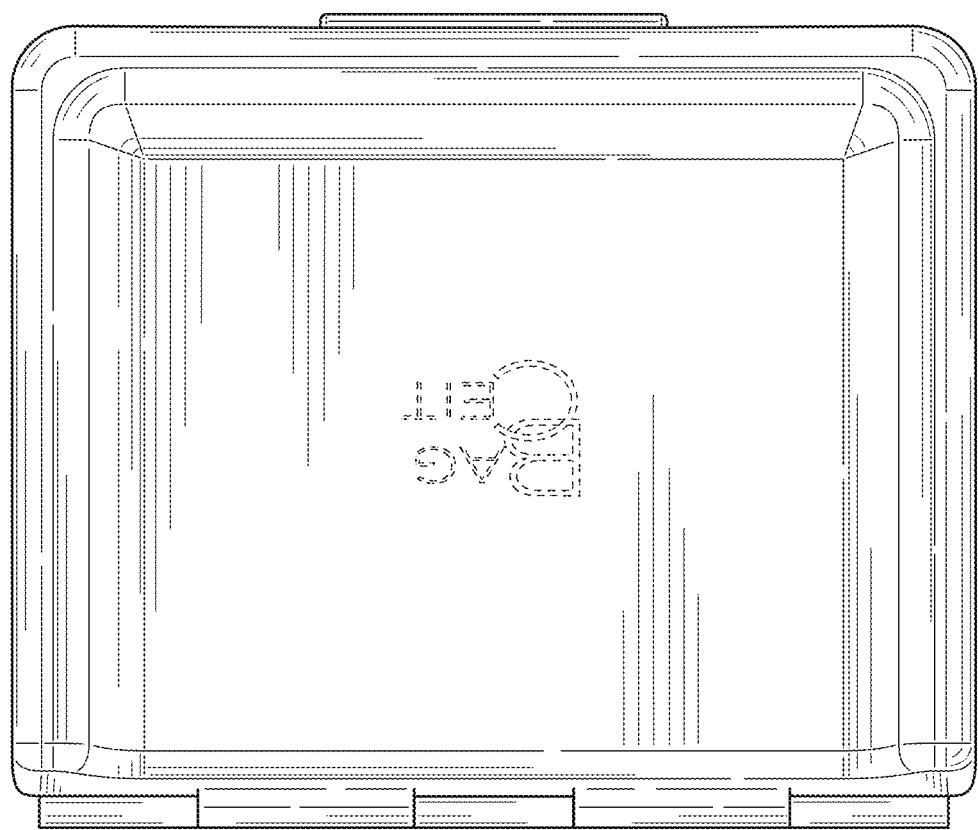
Figure 18T:
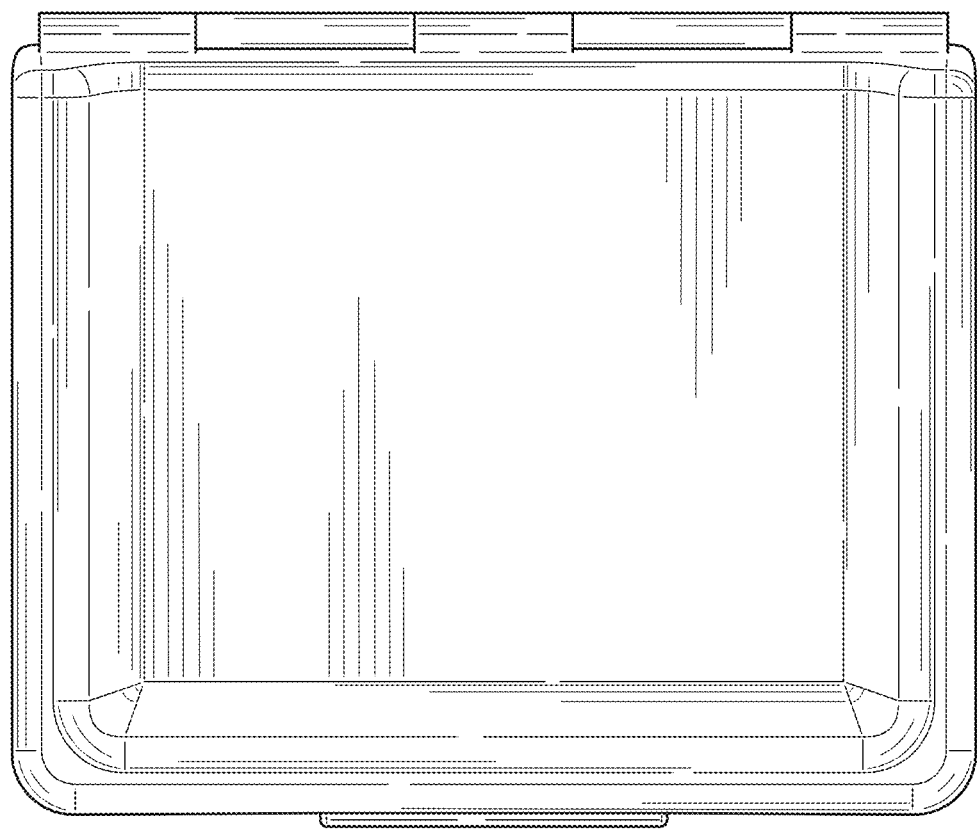

FIGS. 18Q-18W illustrate various views of an embodiment where the V shape of the stand and the surface of the enclosure shells are shown in solid lines. FIGS. 18X-18EE illustrate various views of an embodiment where the V shape of the stand and the legs (in an obtuse angle) are emphasized in solid lines. FIGS. 18FF-18TT illustrate various views of an embodiment where the full product details are shown in solid lines.

Figure 19A:
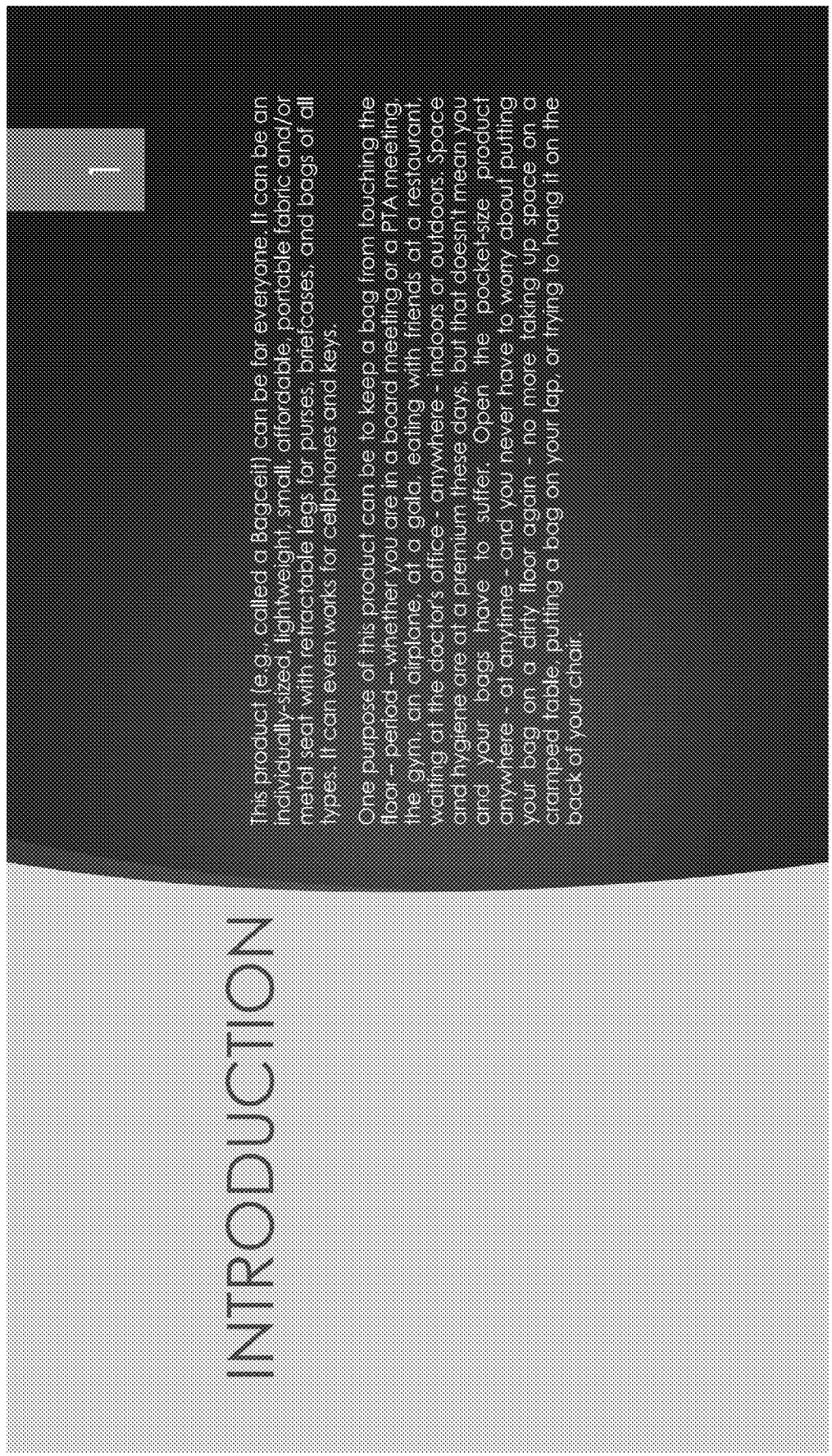
Figure 19D:
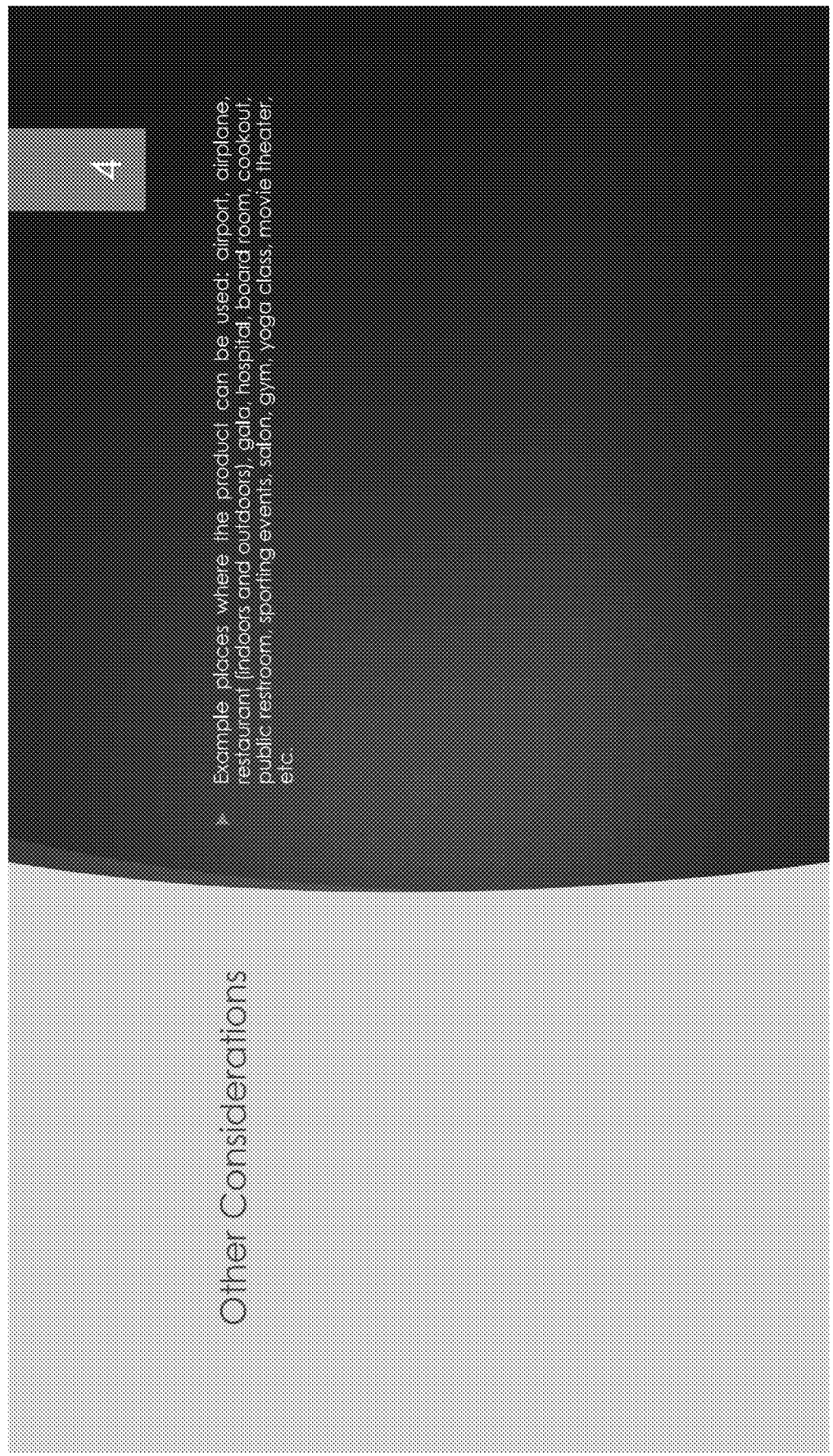

FIGS. 19A-E set forth additional information related to the product, according to various embodiments of the disclosure. As set forth in FIGS. 19A and 19C, the product (e.g., which can be called a Bagceit) can be an individually-sized, lightweight, small, inexpensive, sturdy, portable, easy to store, or easy to use, or any combination thereof. It can be made of fabric and/or metal. It can have retractable legs. It can be used for: purses, briefcases, and bags of all types. It can also be used for other items (e.g., books, computers, computer devices, cellphones, iPads, keys). The product can help keep an item from touching the floor. It can be used anywhere—indoors or outdoors (e.g., as shown in FIG. 19D: airport, airplane, restaurant, hospital, board room, cookout, restroom, sporting event, salon, gym, yoga, movie theatre, etc.). It can be stable on multiple types of floor surfaces. It can be cleaned (e.g., with antibacterial wipes, any cleaning product, anti-rust material).

Figure 19F:
Figure 19G:
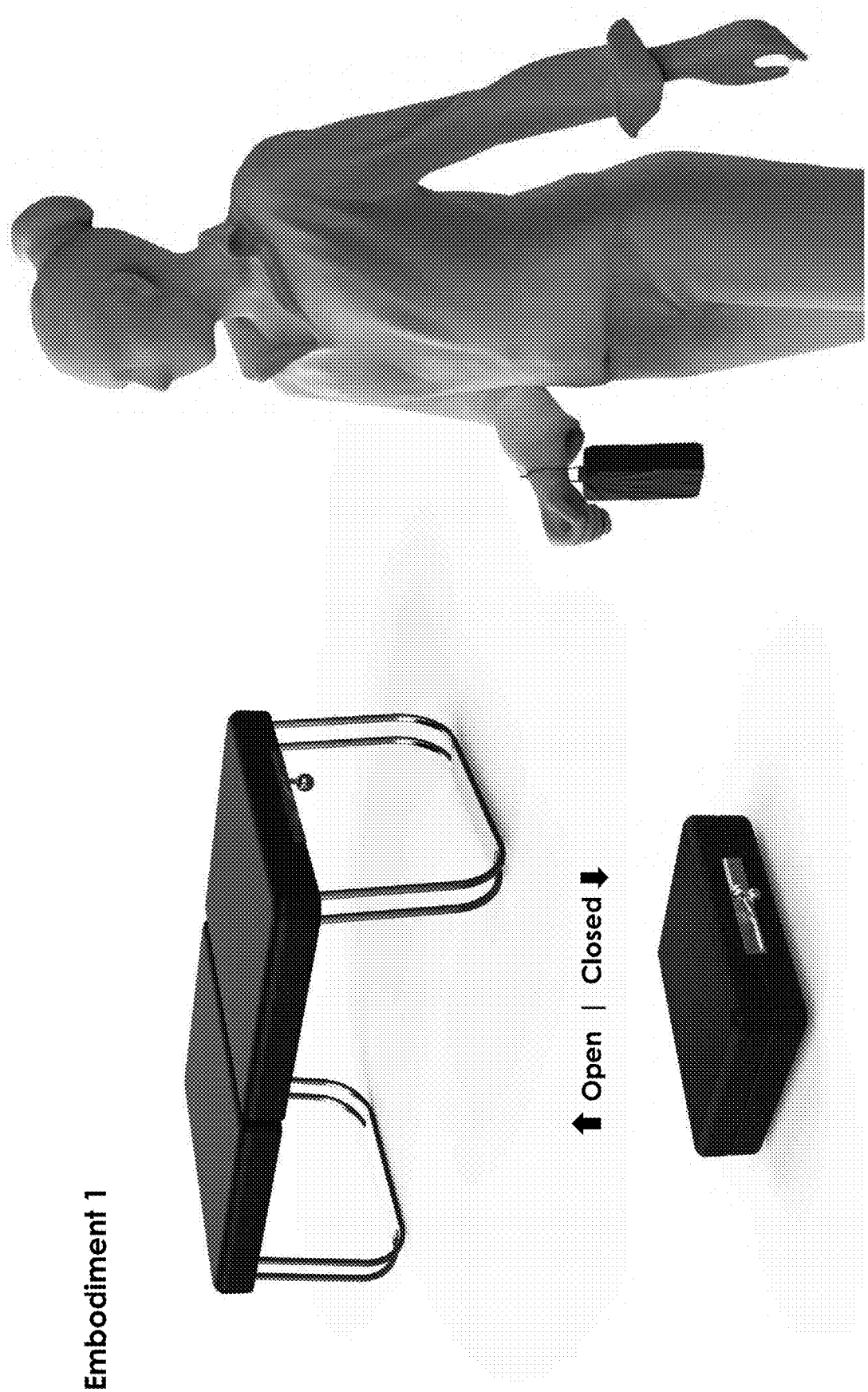
Figure 19H:
Figure 19I:
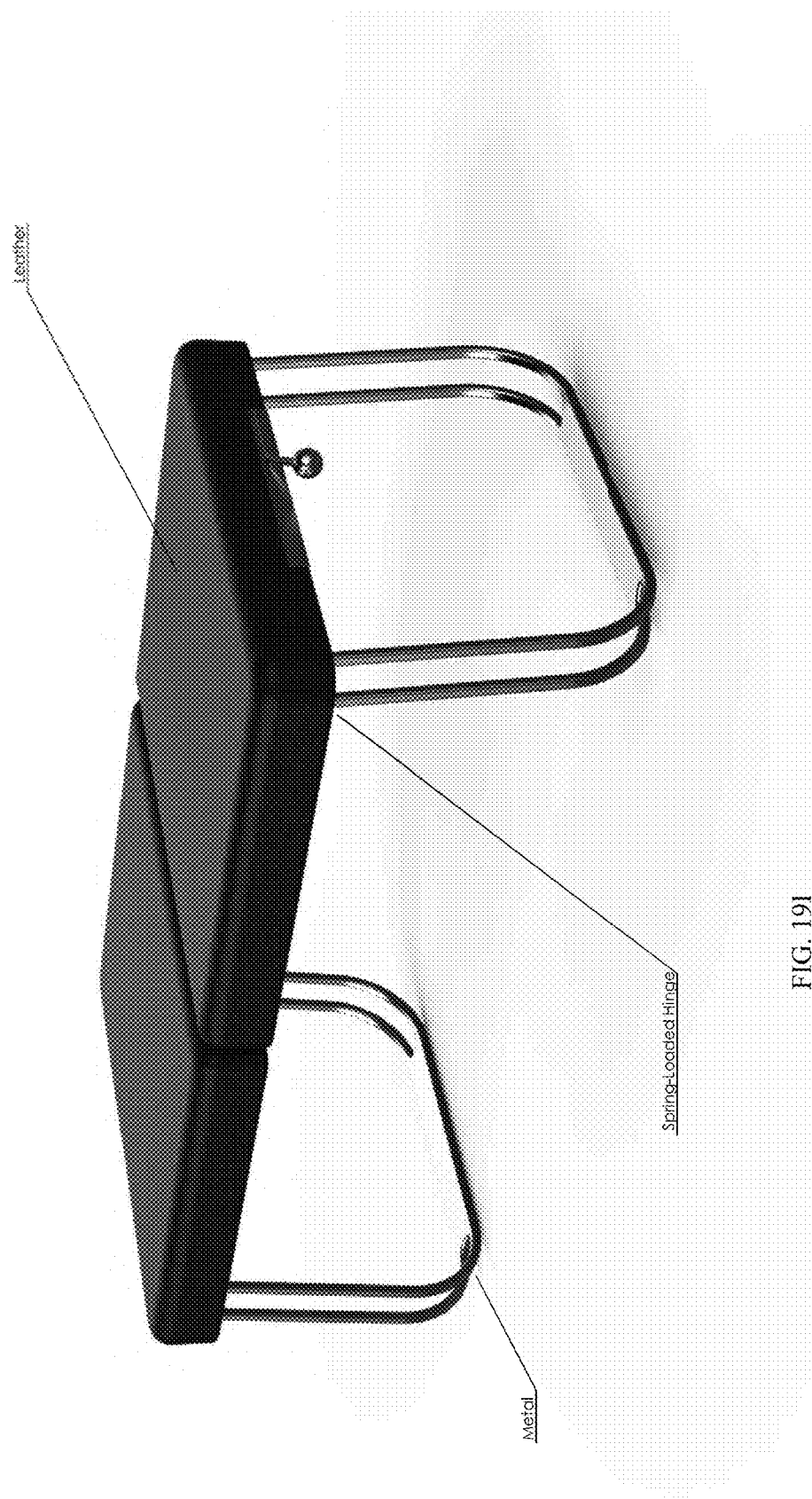
Figure 19J:
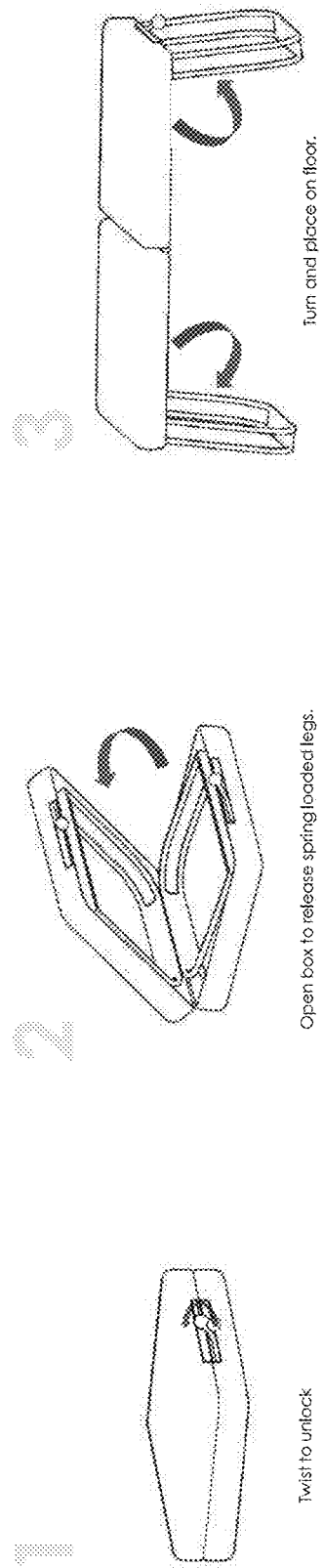
Figure 19K:
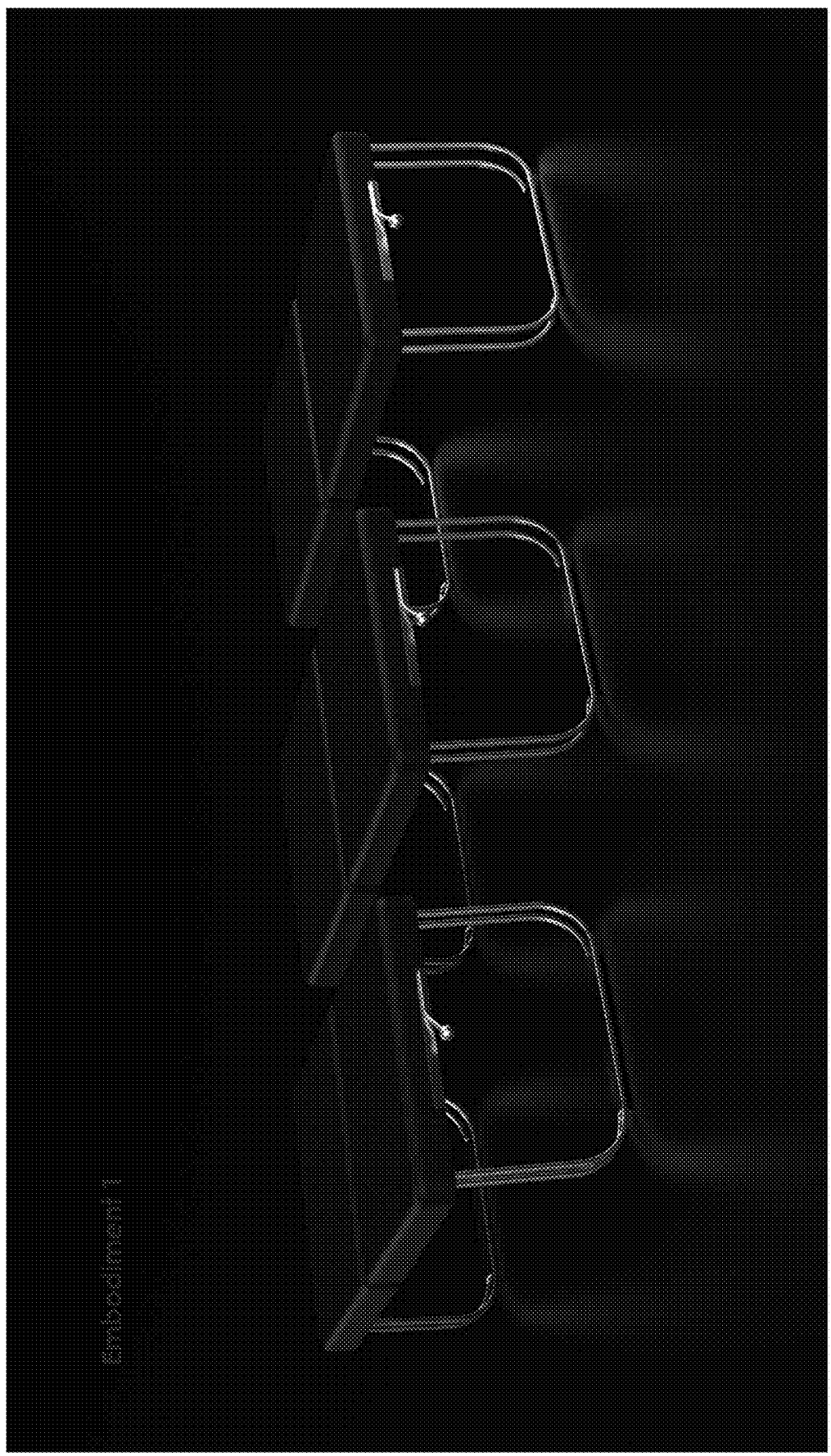
Figure 19L:
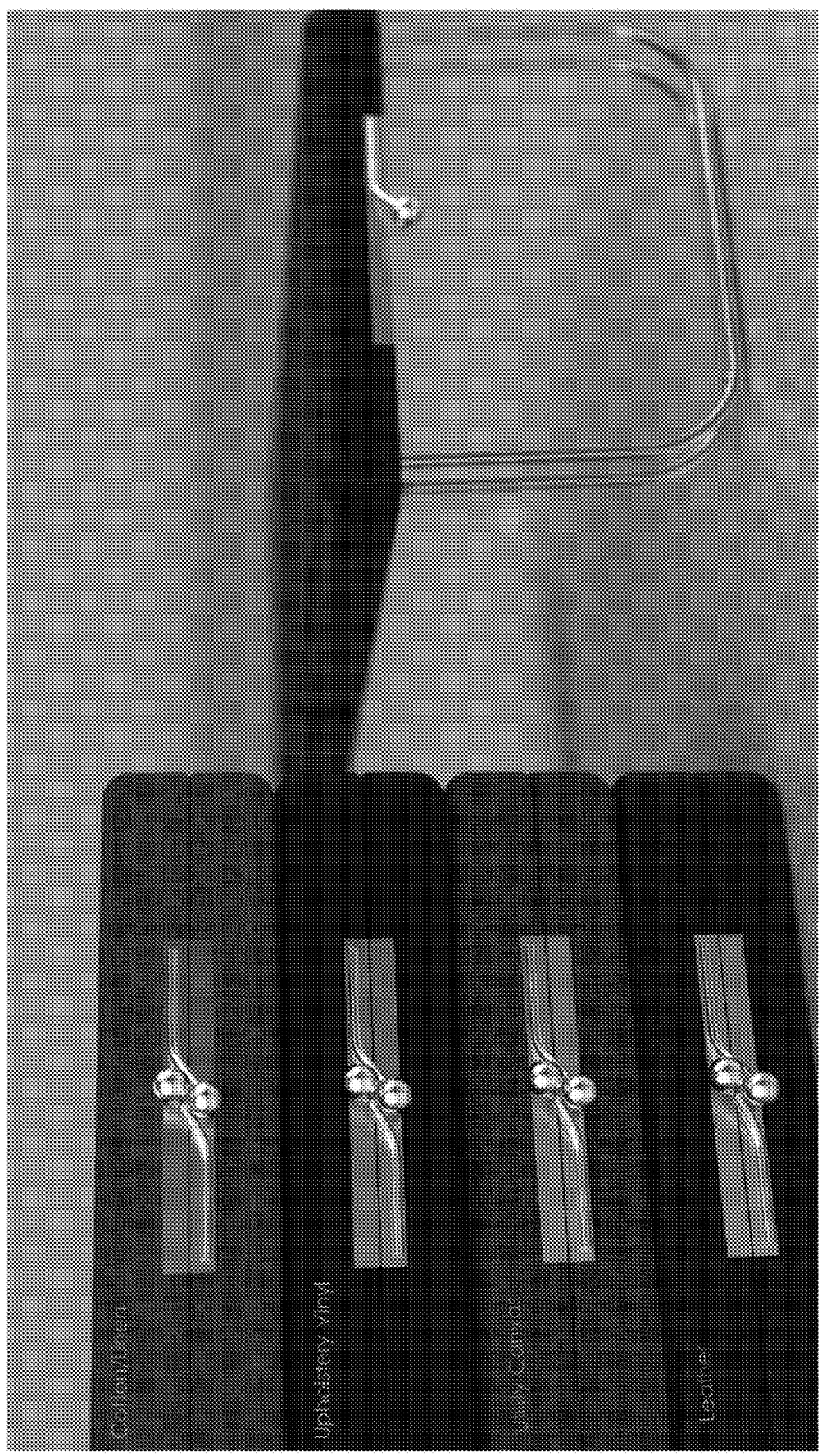
Figure 19M:
Figure 19N:
Figure 19O:
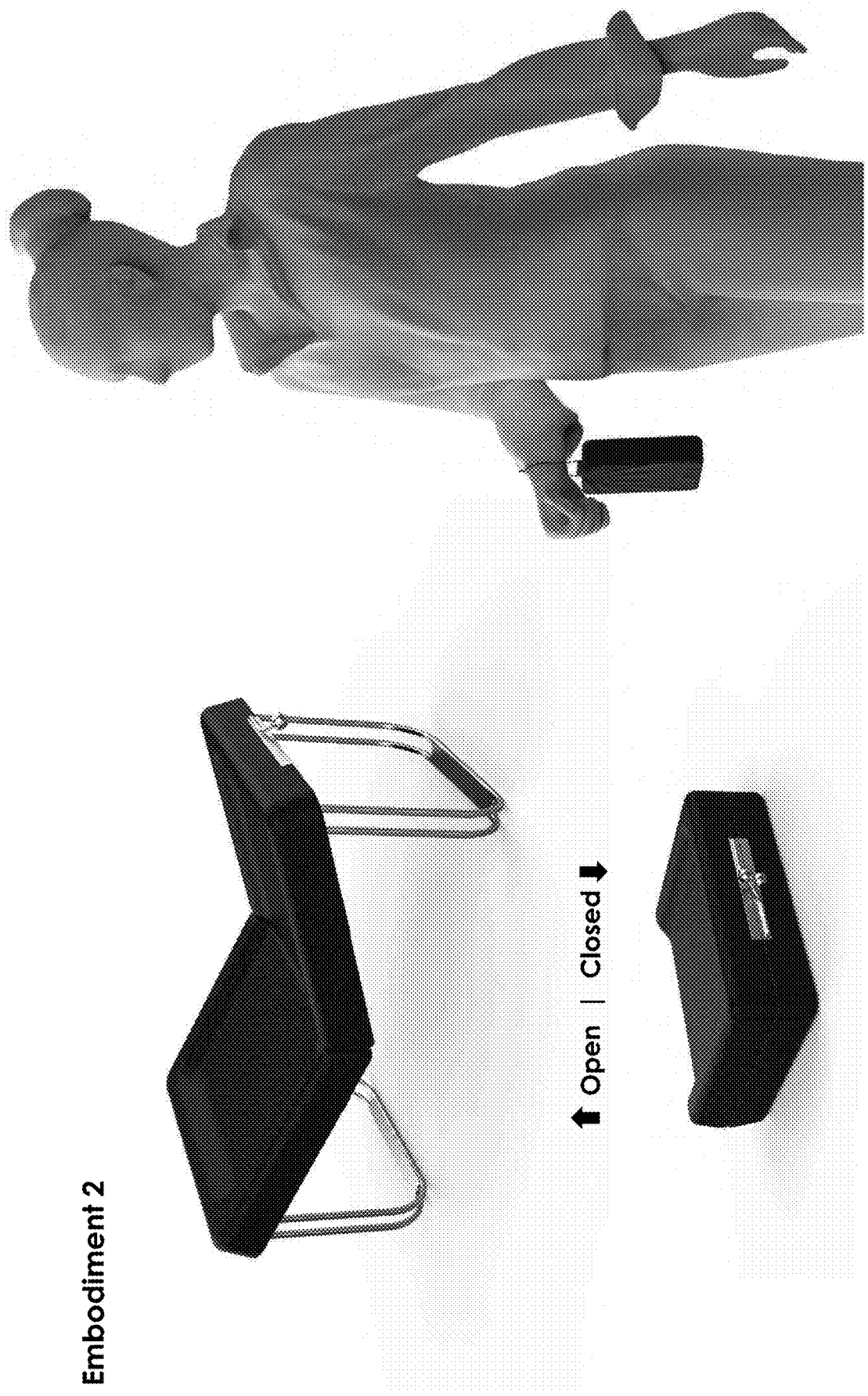
Figure 19P:
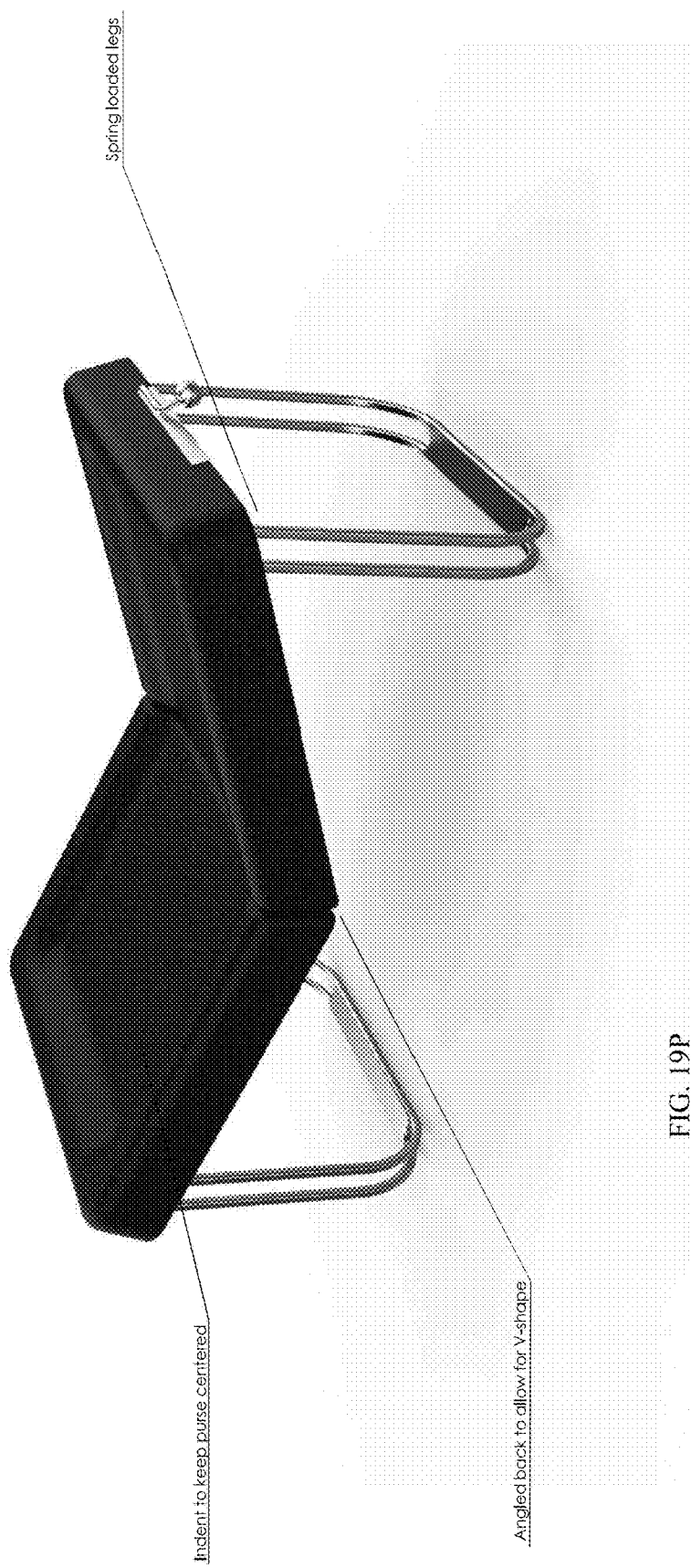
Figure 19Q:
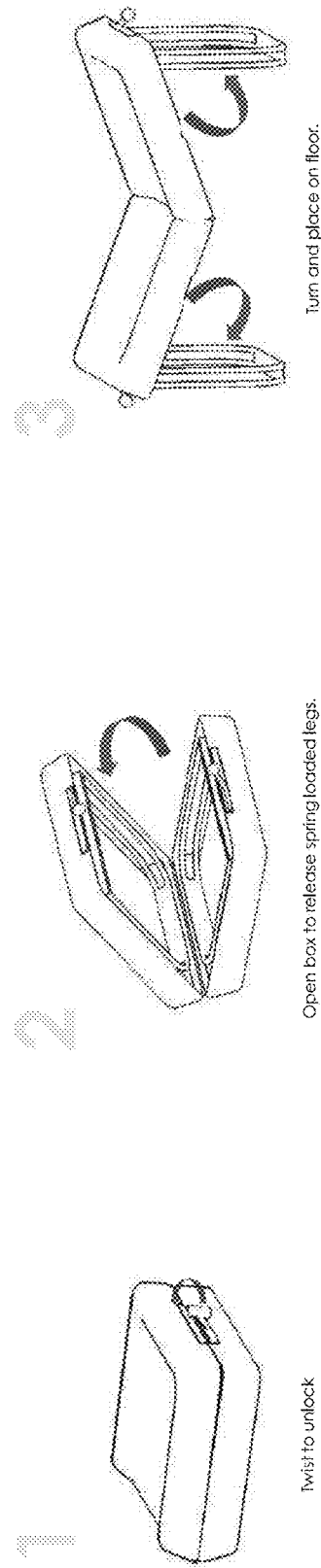
Figure 19R:
Figure 19S:
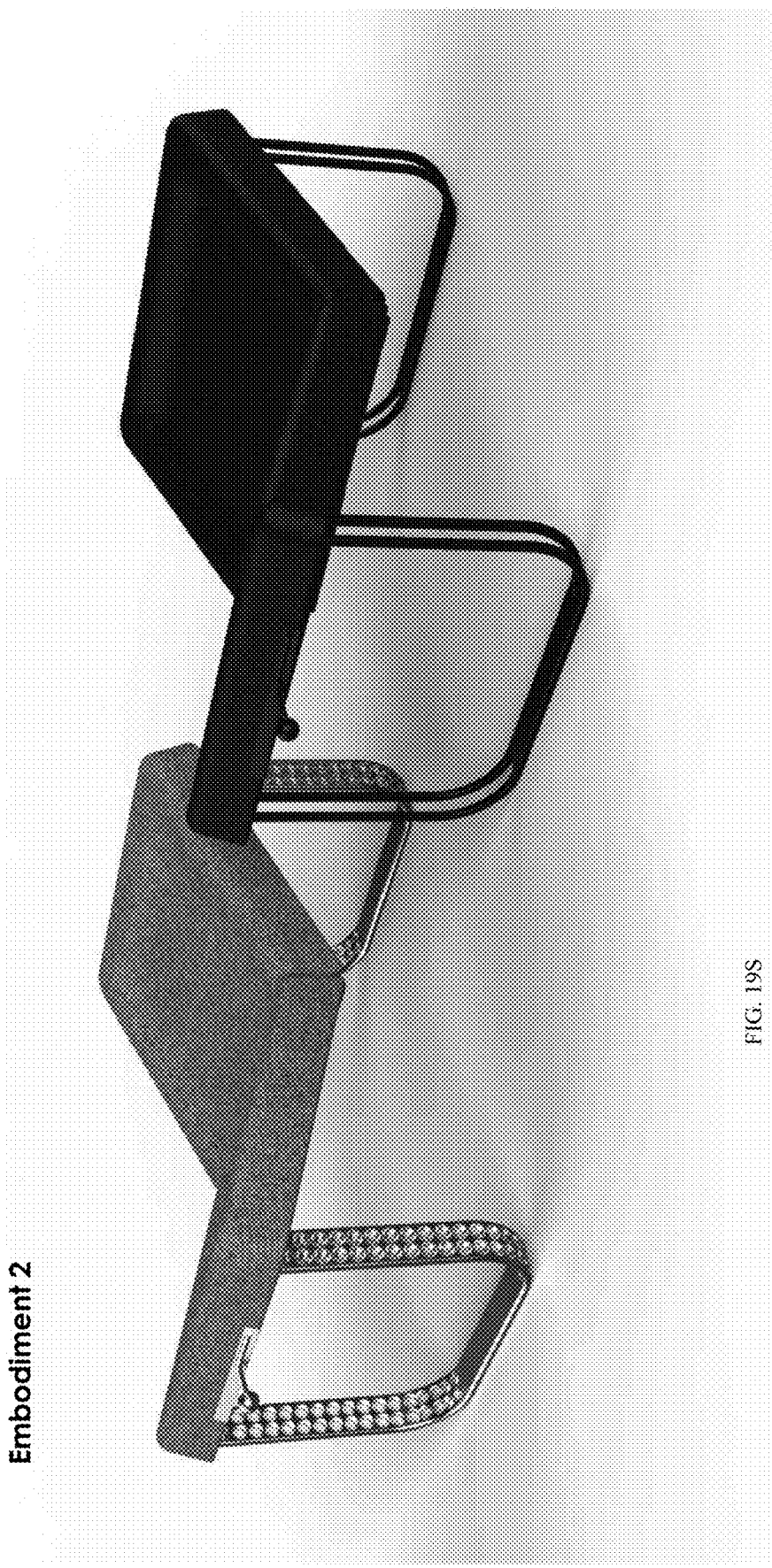
Figure 19T:
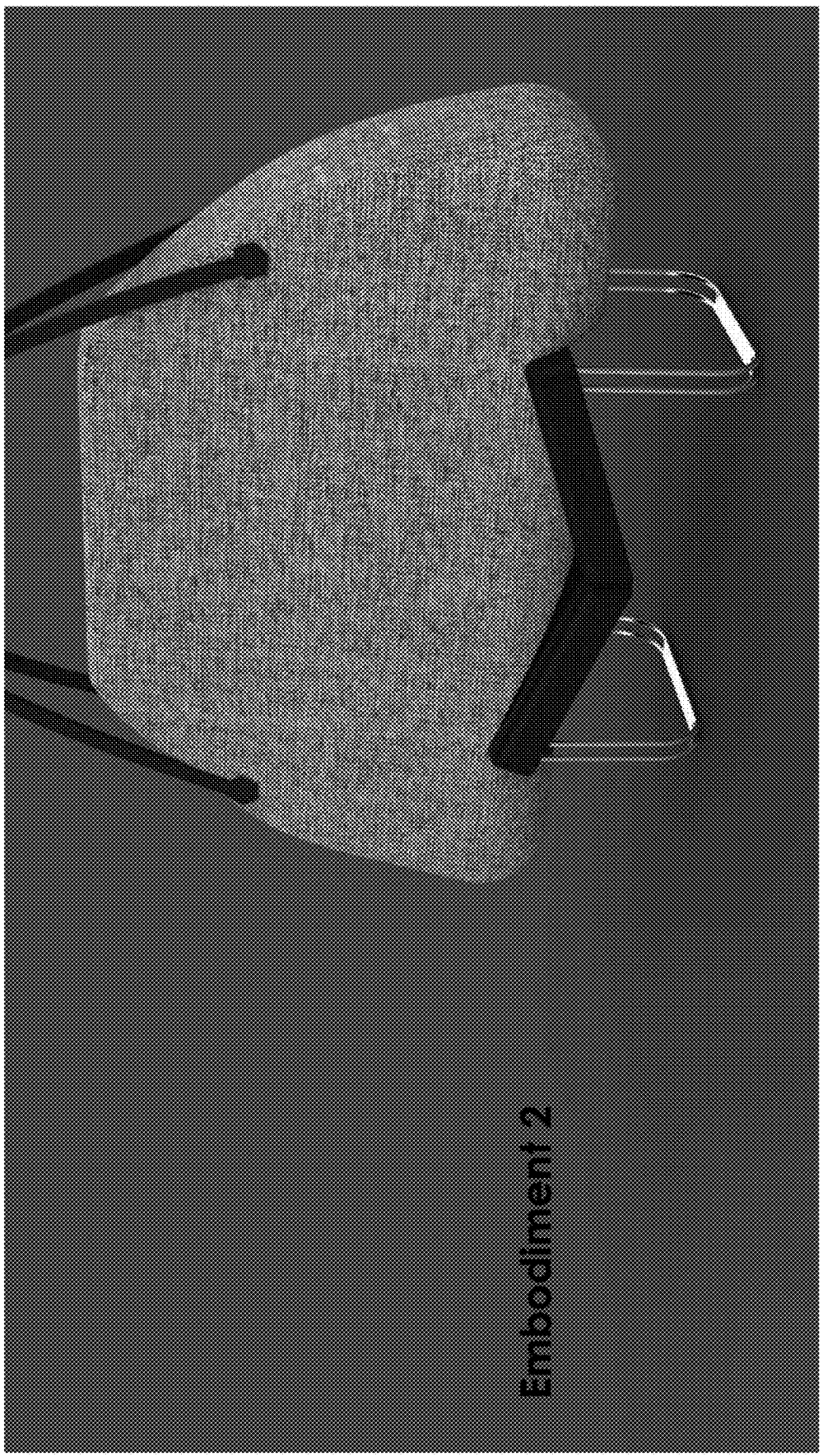
Figure 19U:
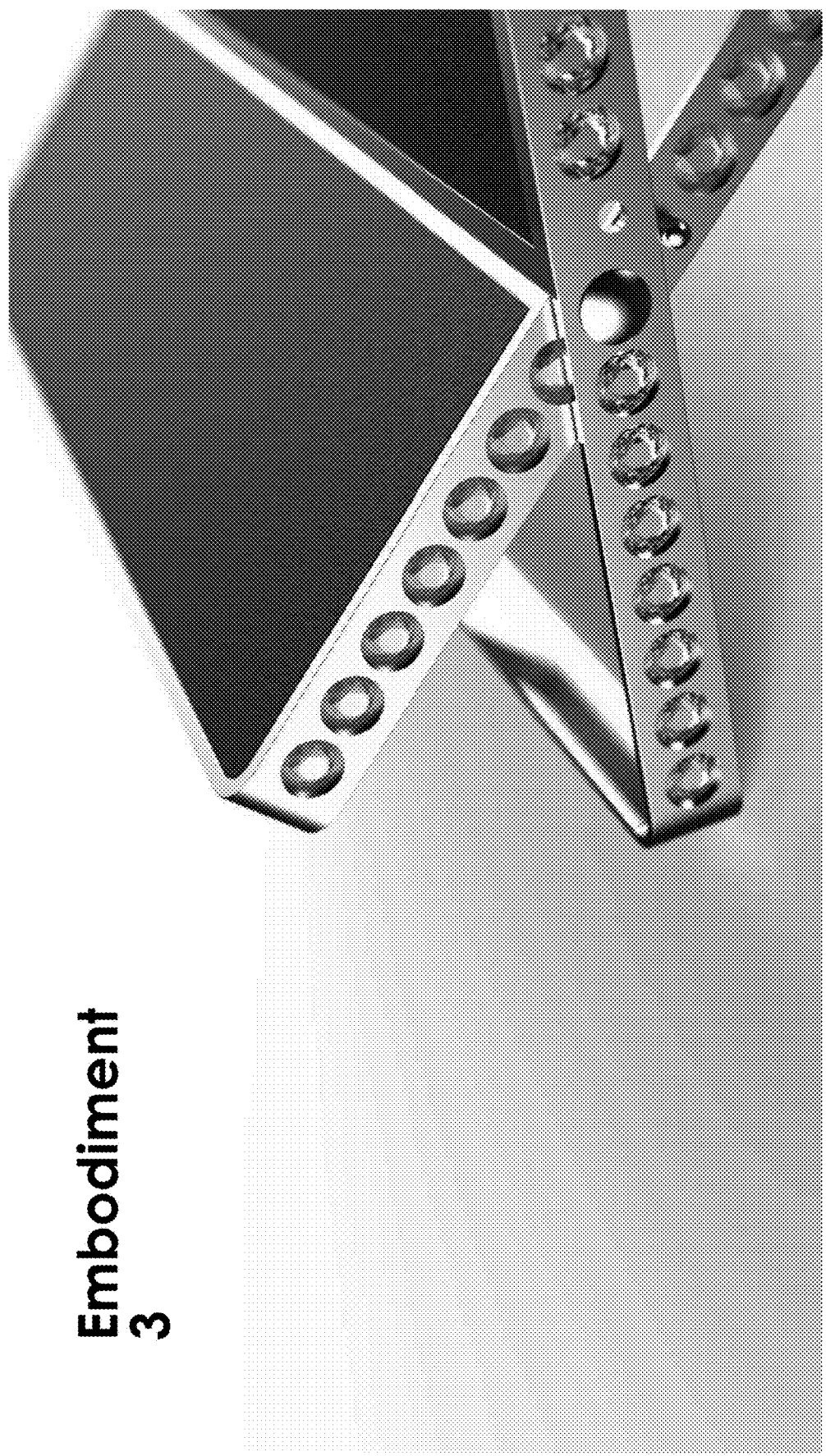
Figure 19W:
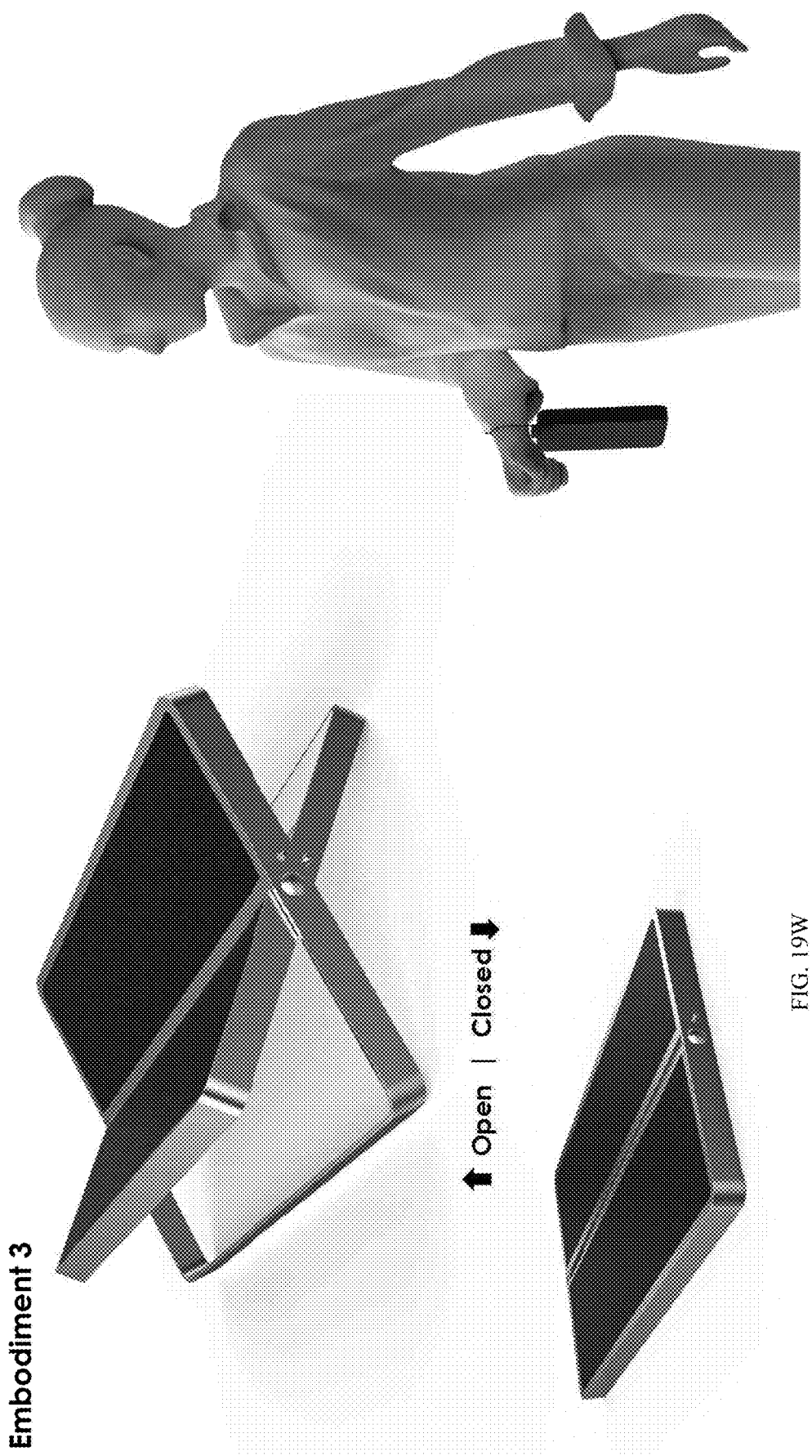
Figure 19X:
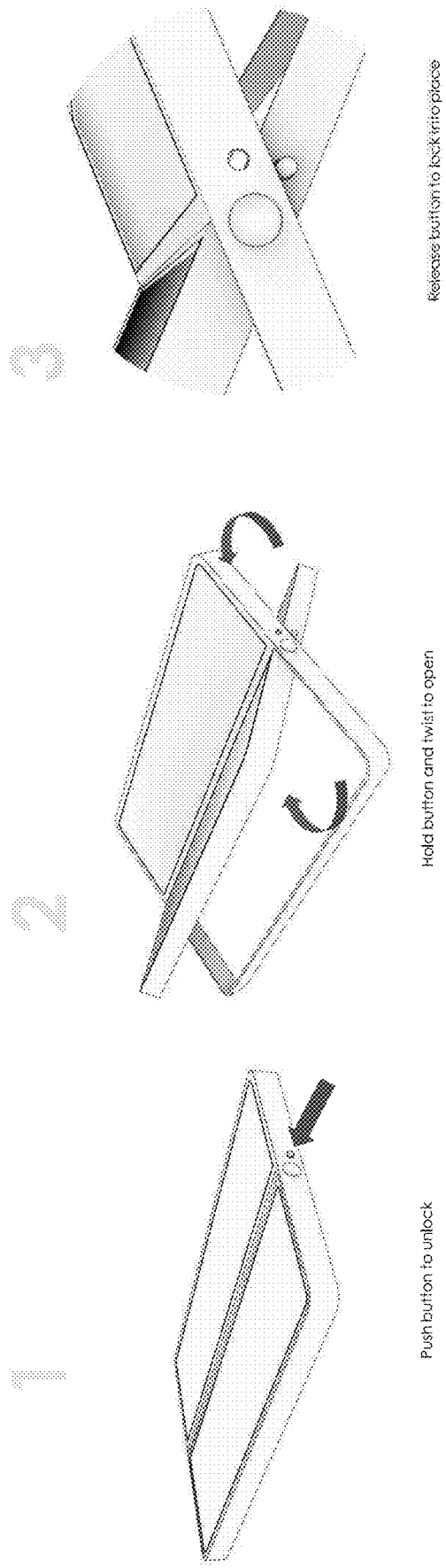
Figure 19Y:
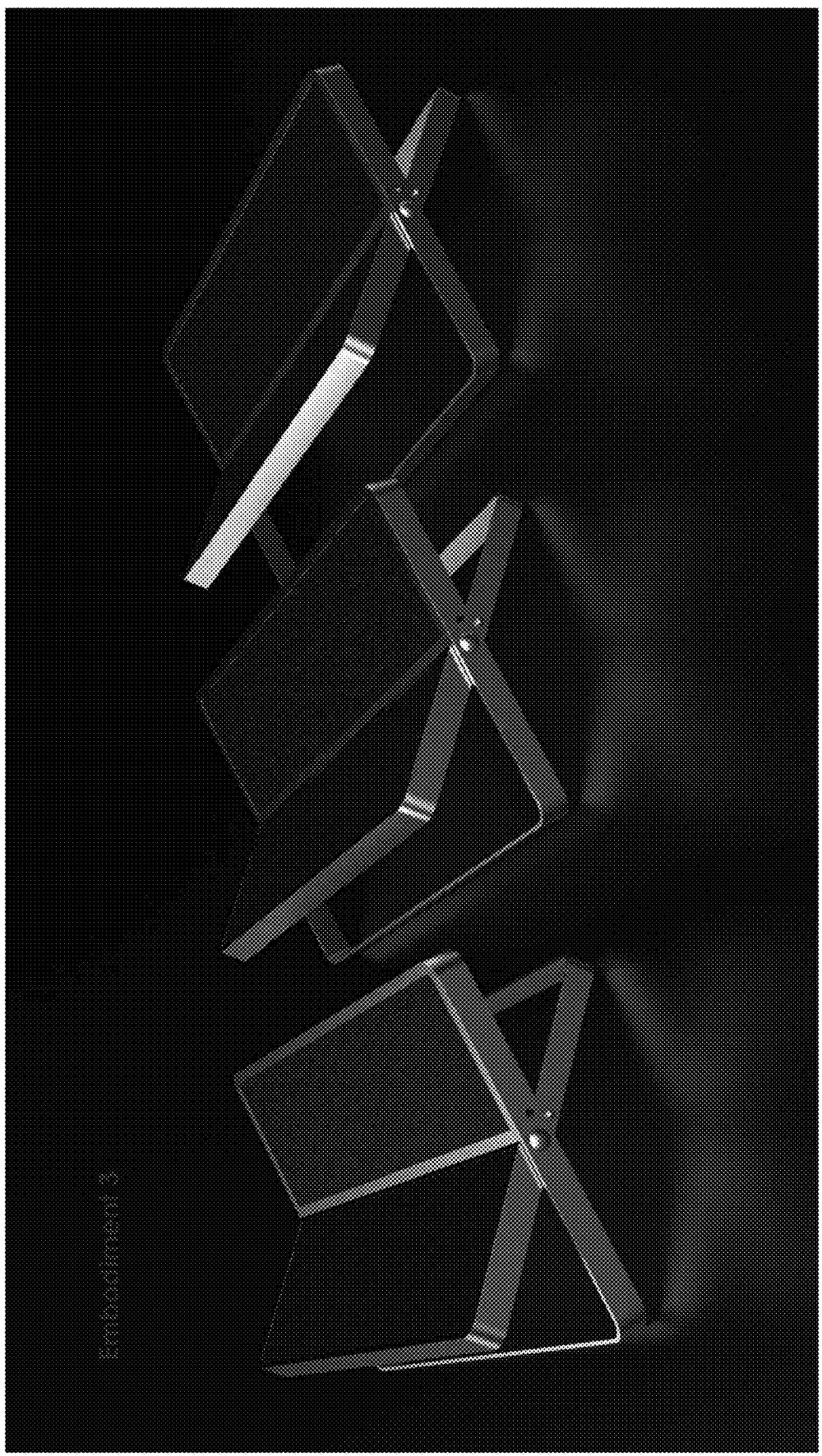
Figure 19Z:
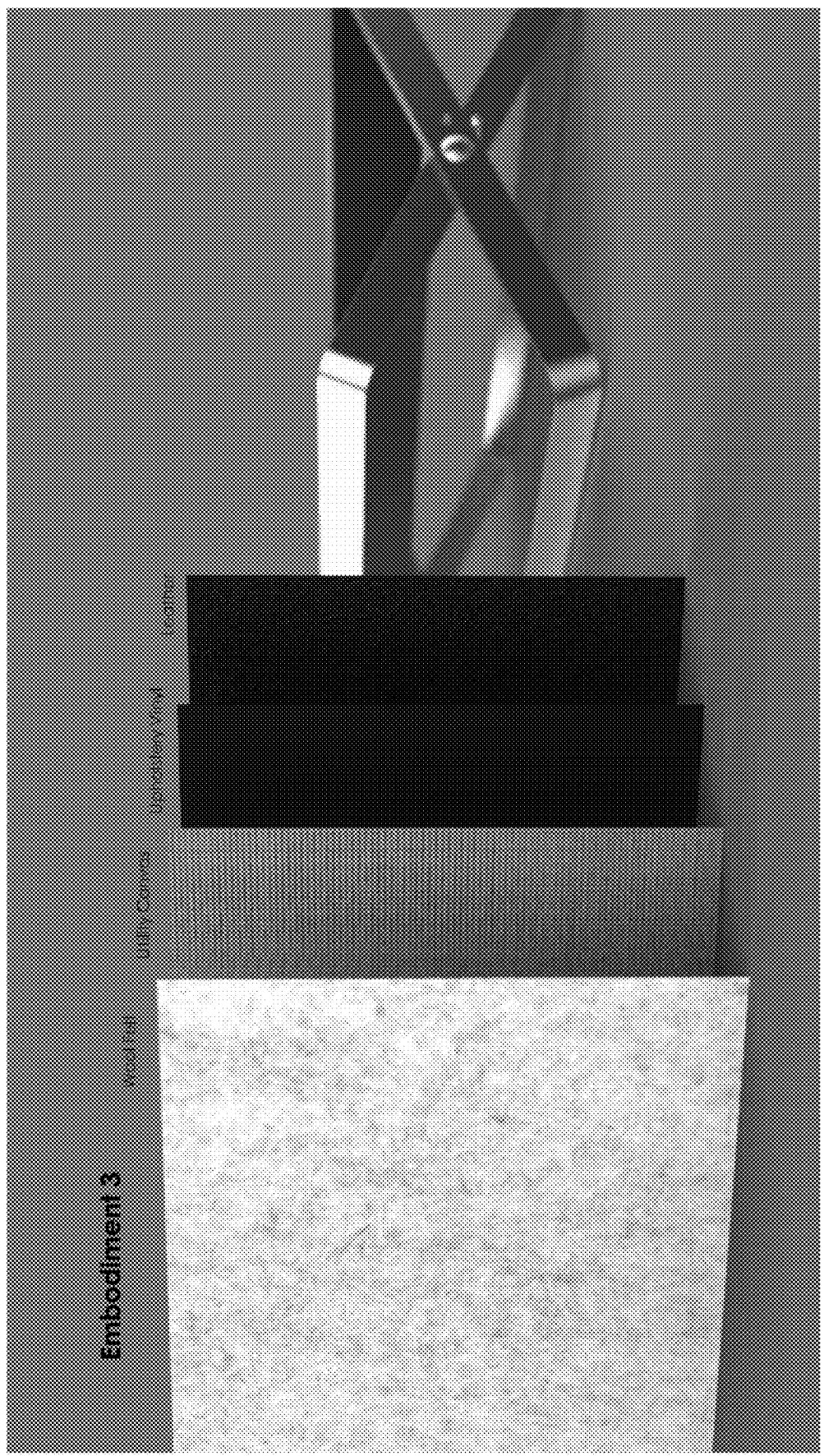
Figure 19A:
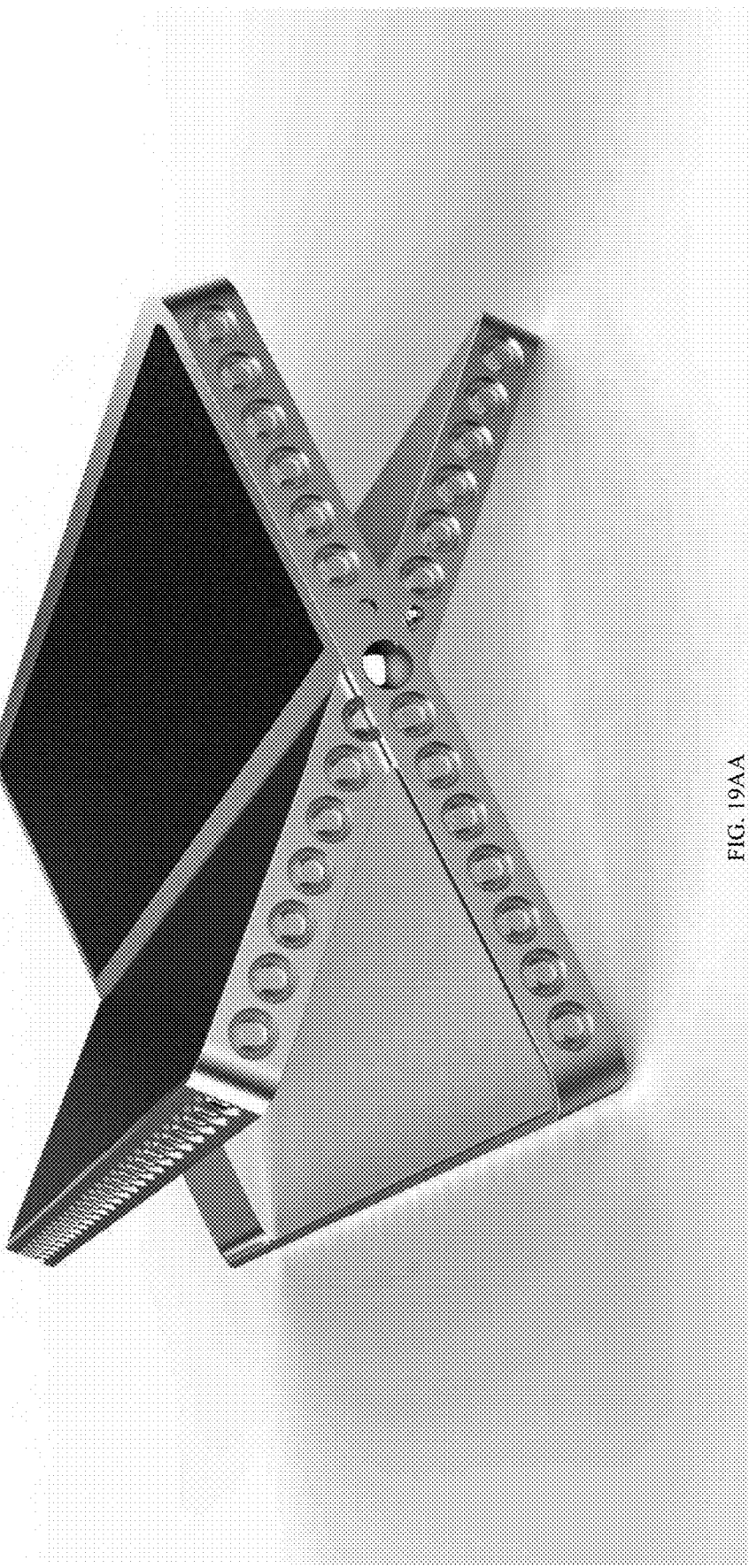
Figure 19B:

As set forth in FIG. 19B, in some embodiments, the product can include a small, low-rise seat comprised of a durable fabric (e.g., canvas, plastic) supported by lightweight, collapsible legs (e.g., metal). When the seat is open, an item can be placed upon it. The seat can slide under or sit next to a chair, or in front of a person's feet. The product can be small, so it can fit in tight spaces. When folded, the product can be smaller and more easily portable. As indicated in FIG. 19E, the product can have a strap (e.g., a wrist strap, a longer strap).

Figure 19C:
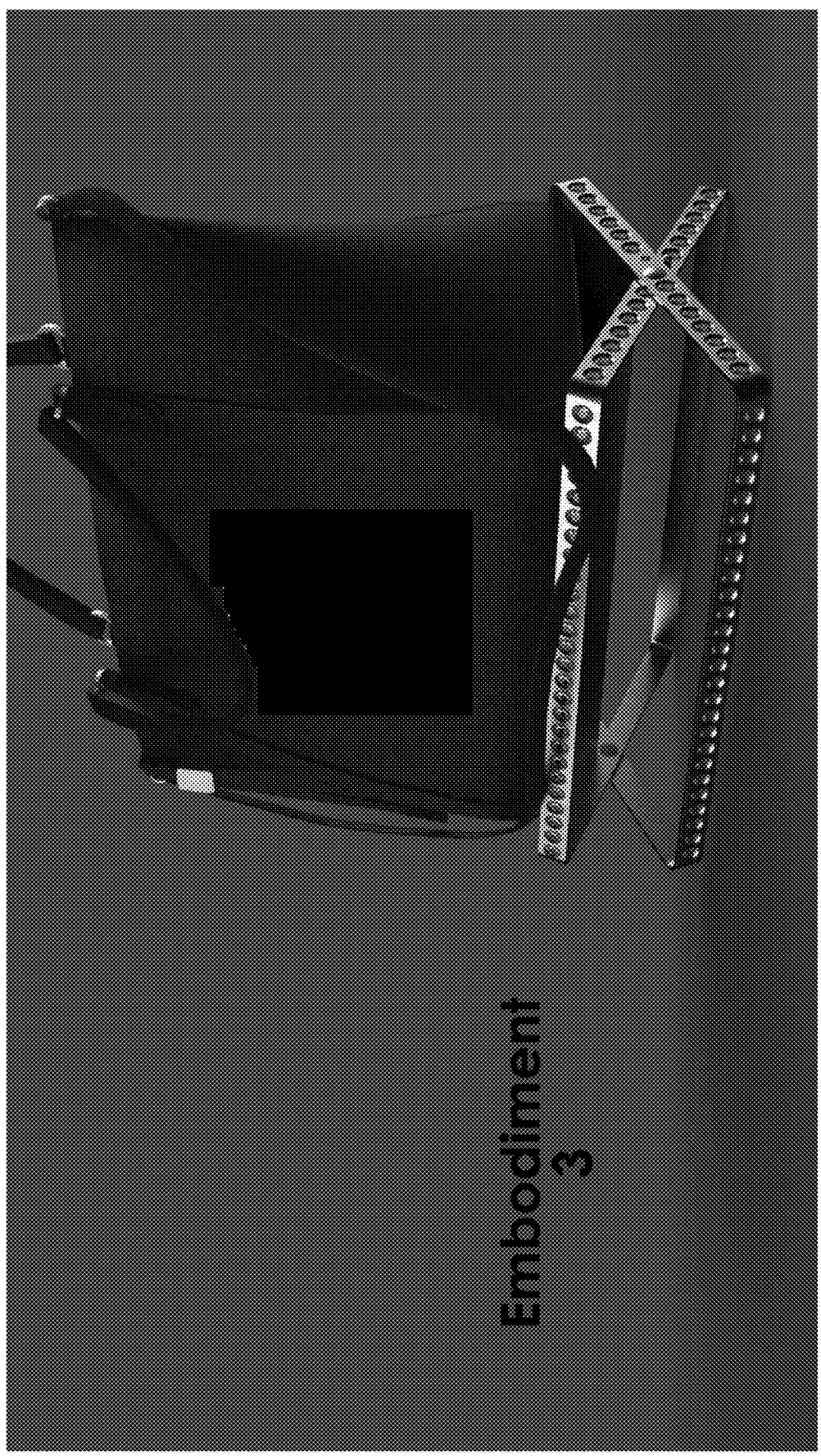
Figure 19D:
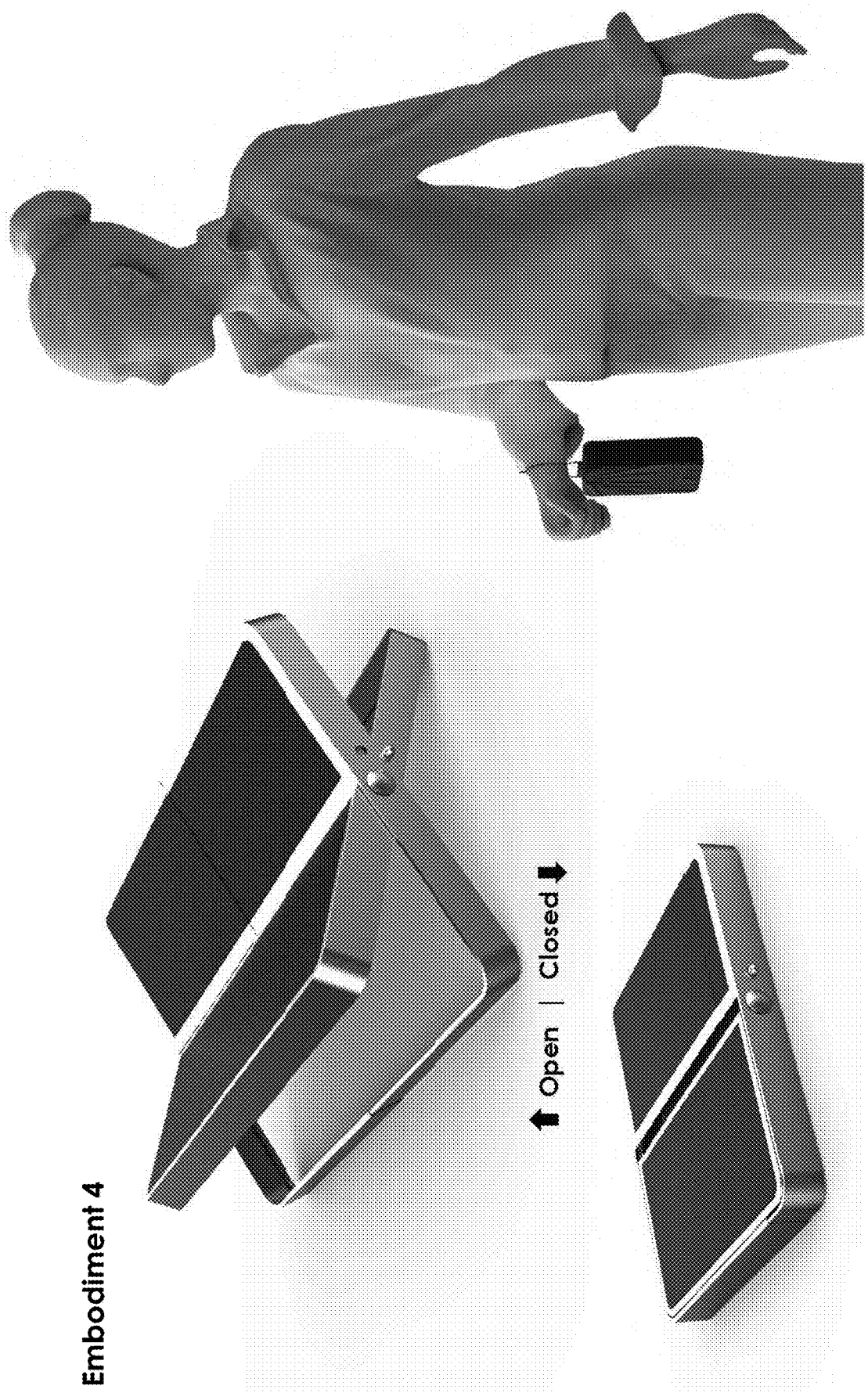
Figure 19G:
Figure 19H:
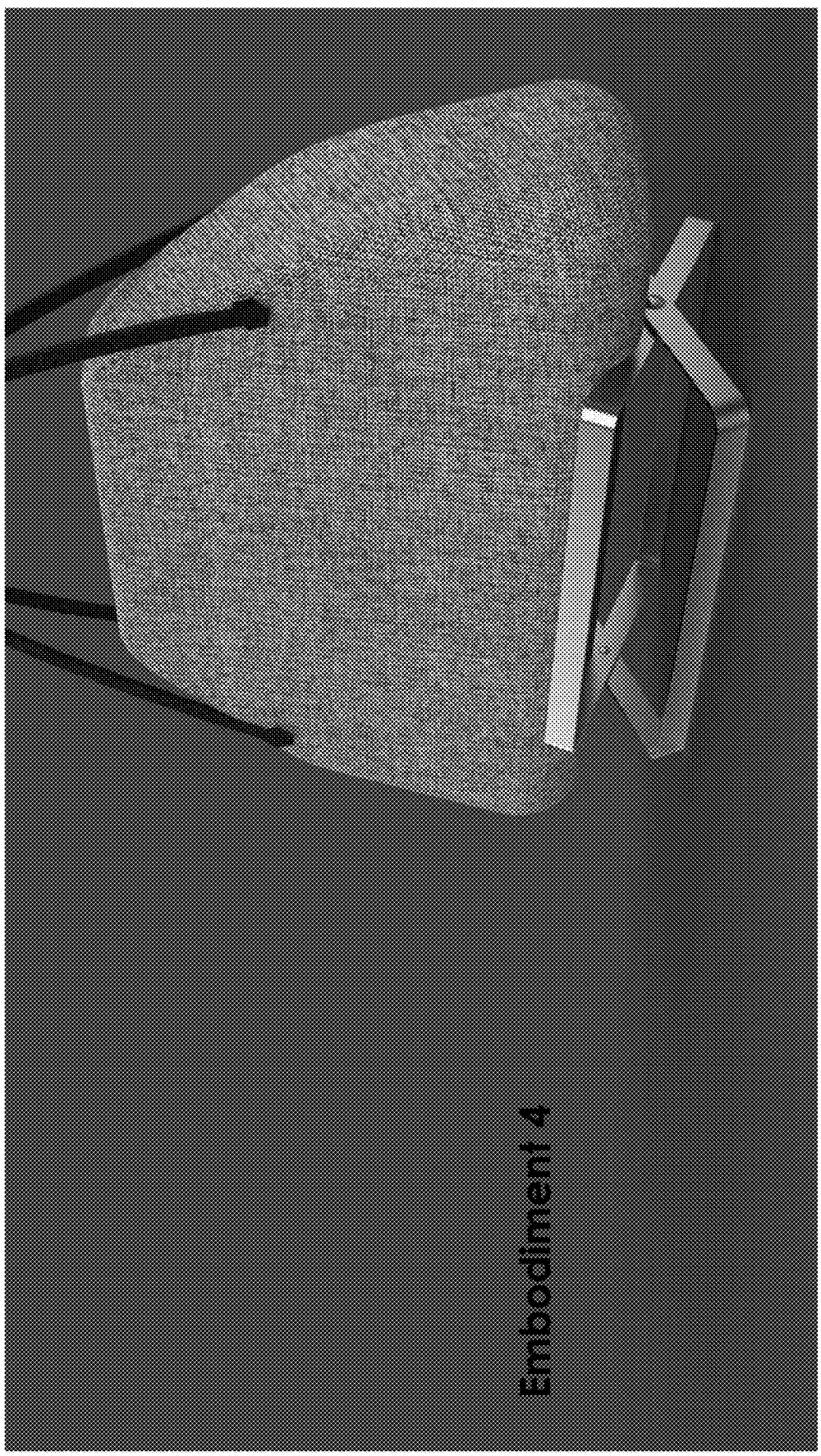
Figure 19J:
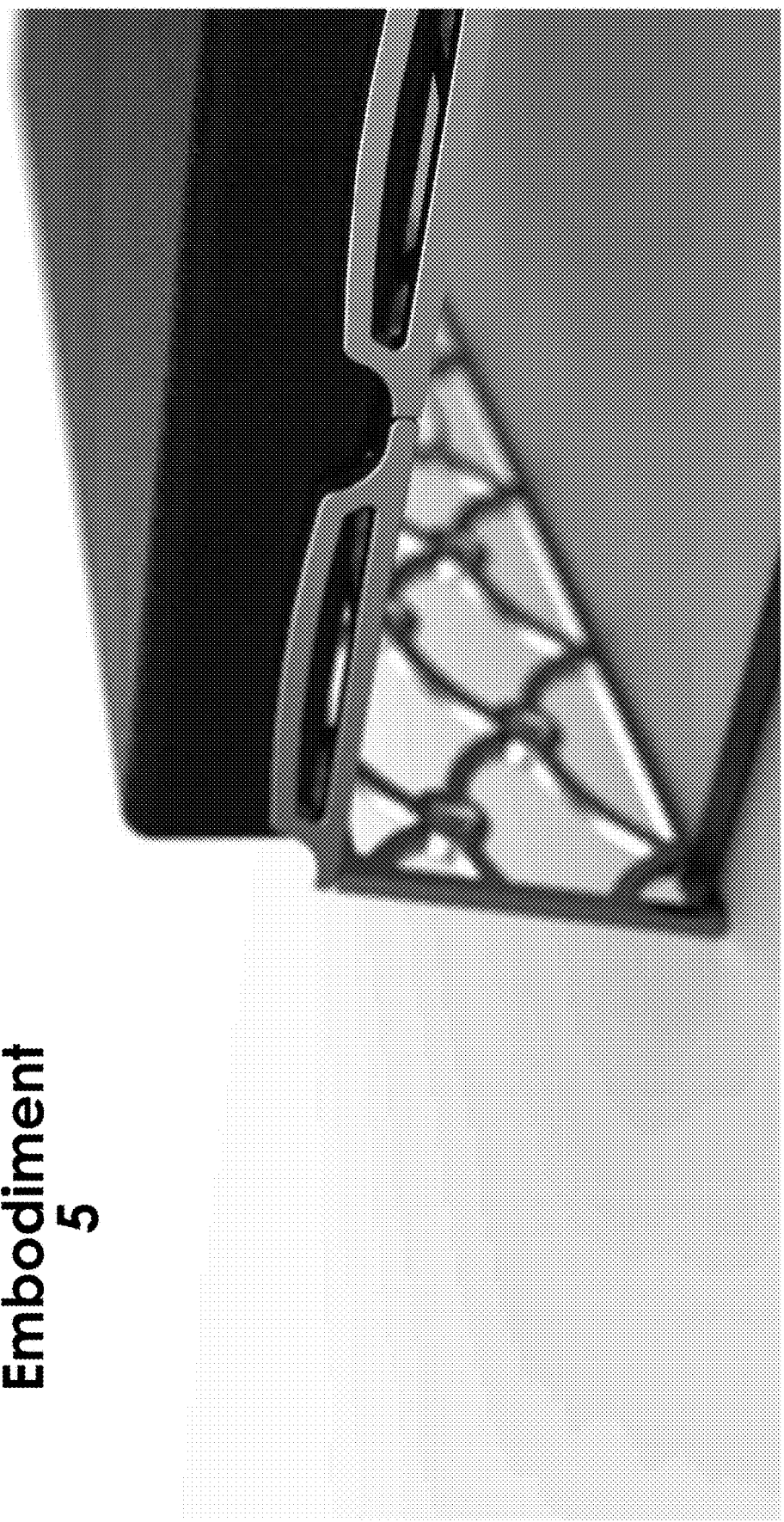
Figure 19L:
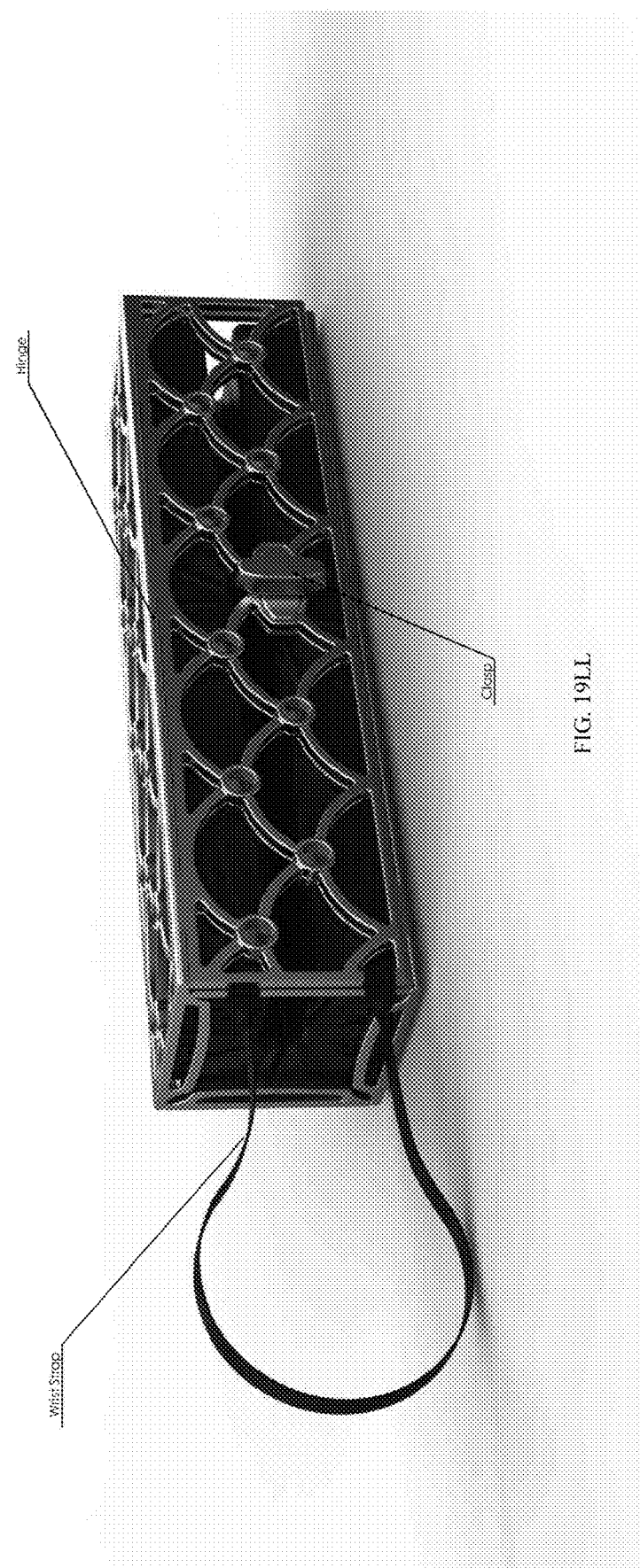
Figure 19M:
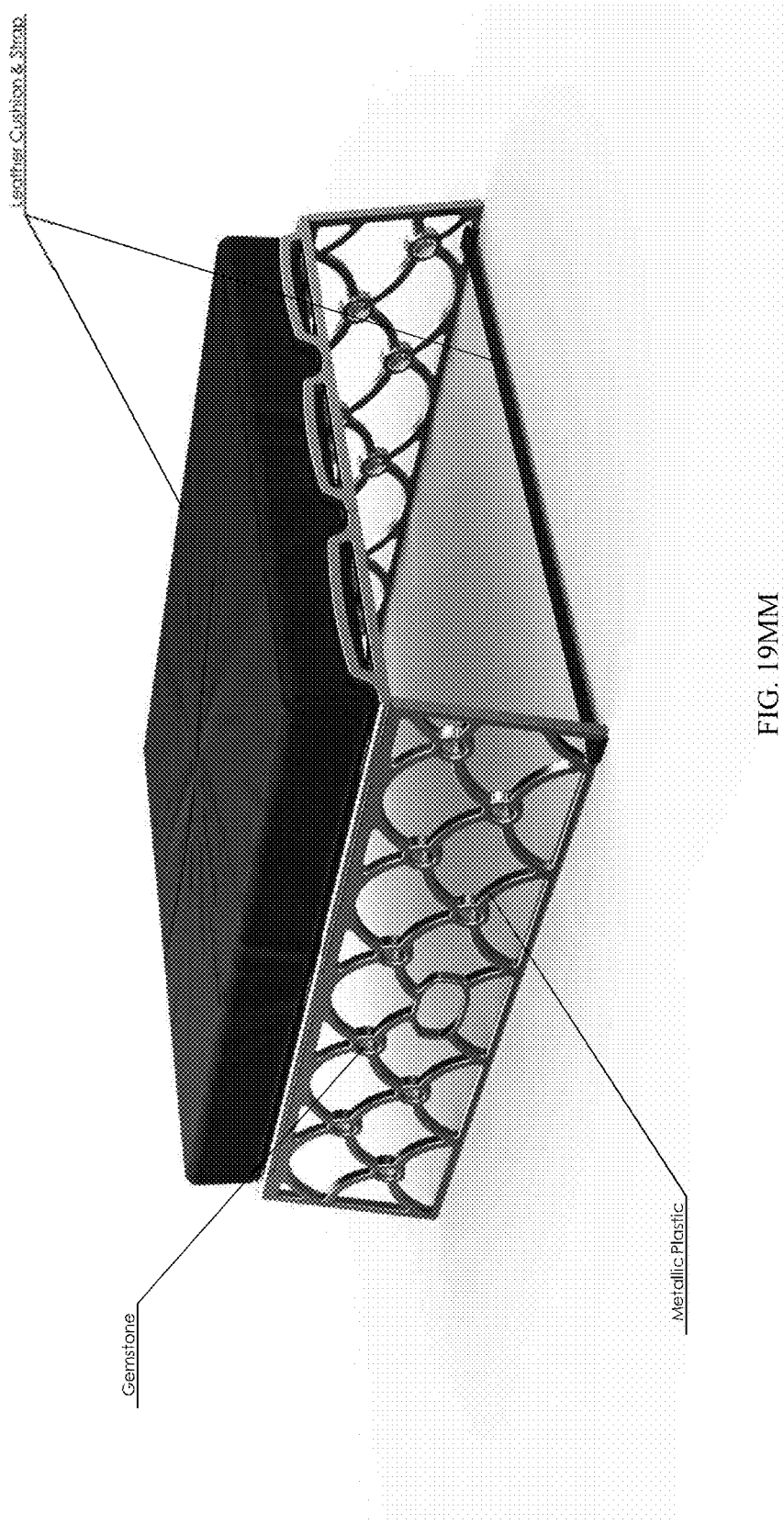
Figure 19N:
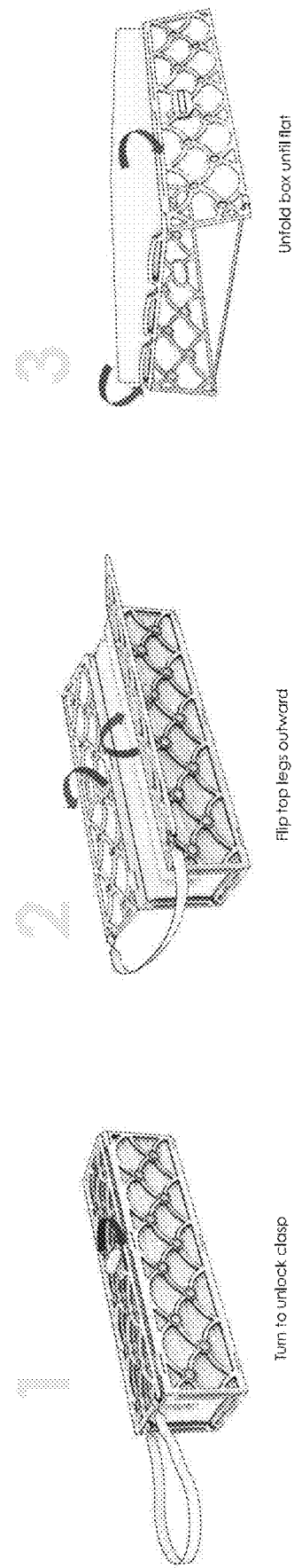
Figure 19O:
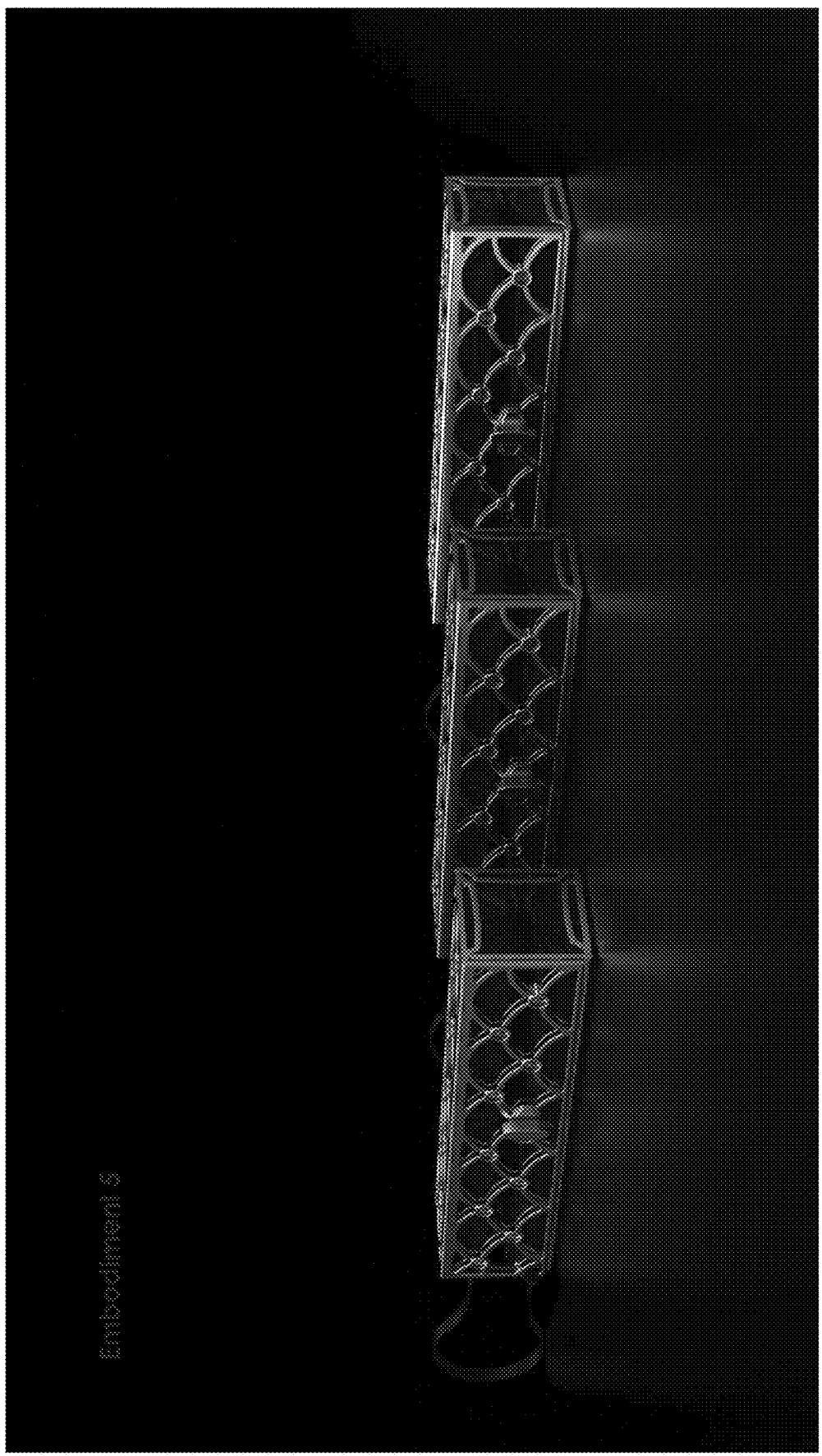
Figure 19P:
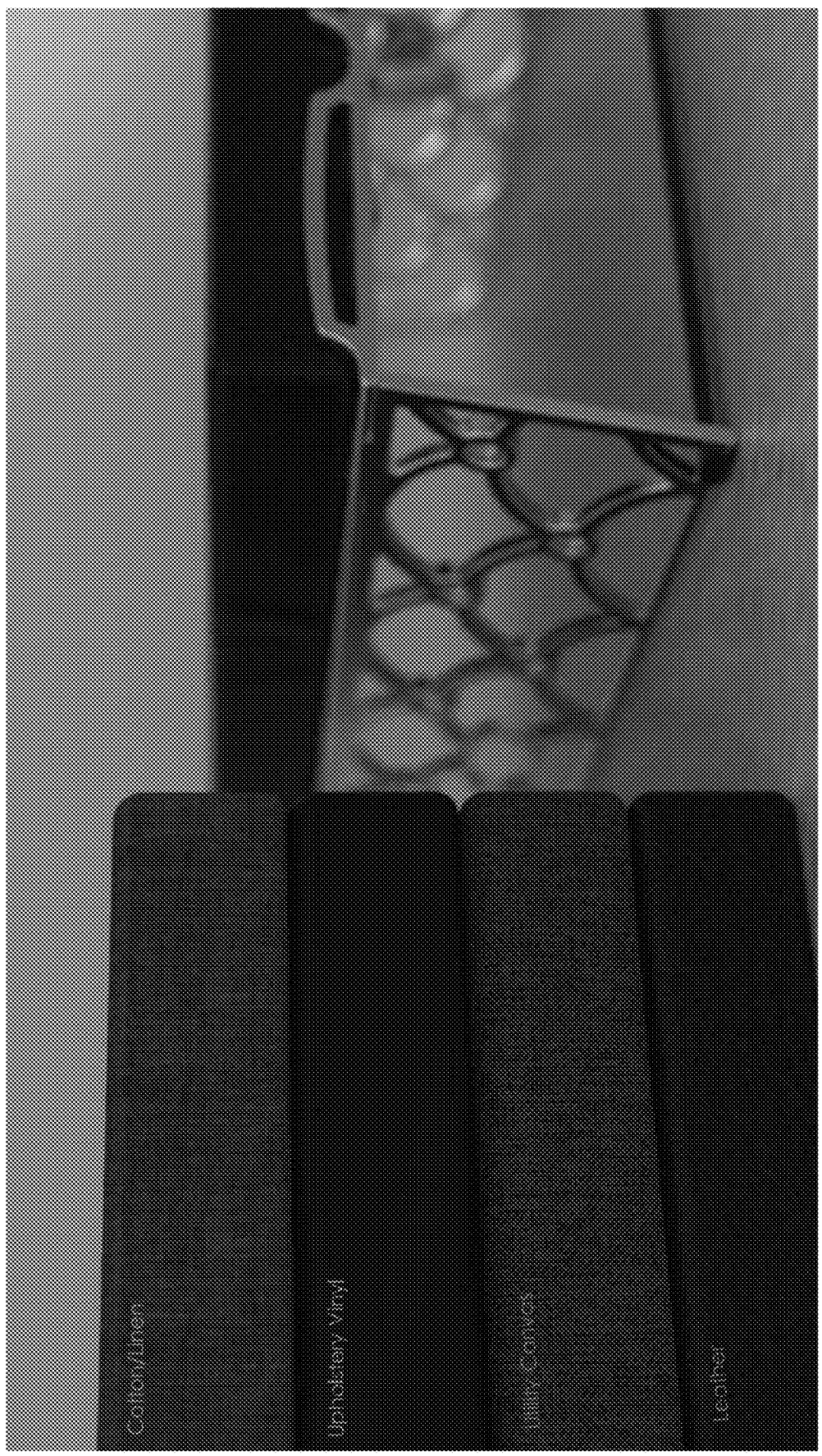
Figure 19Q:
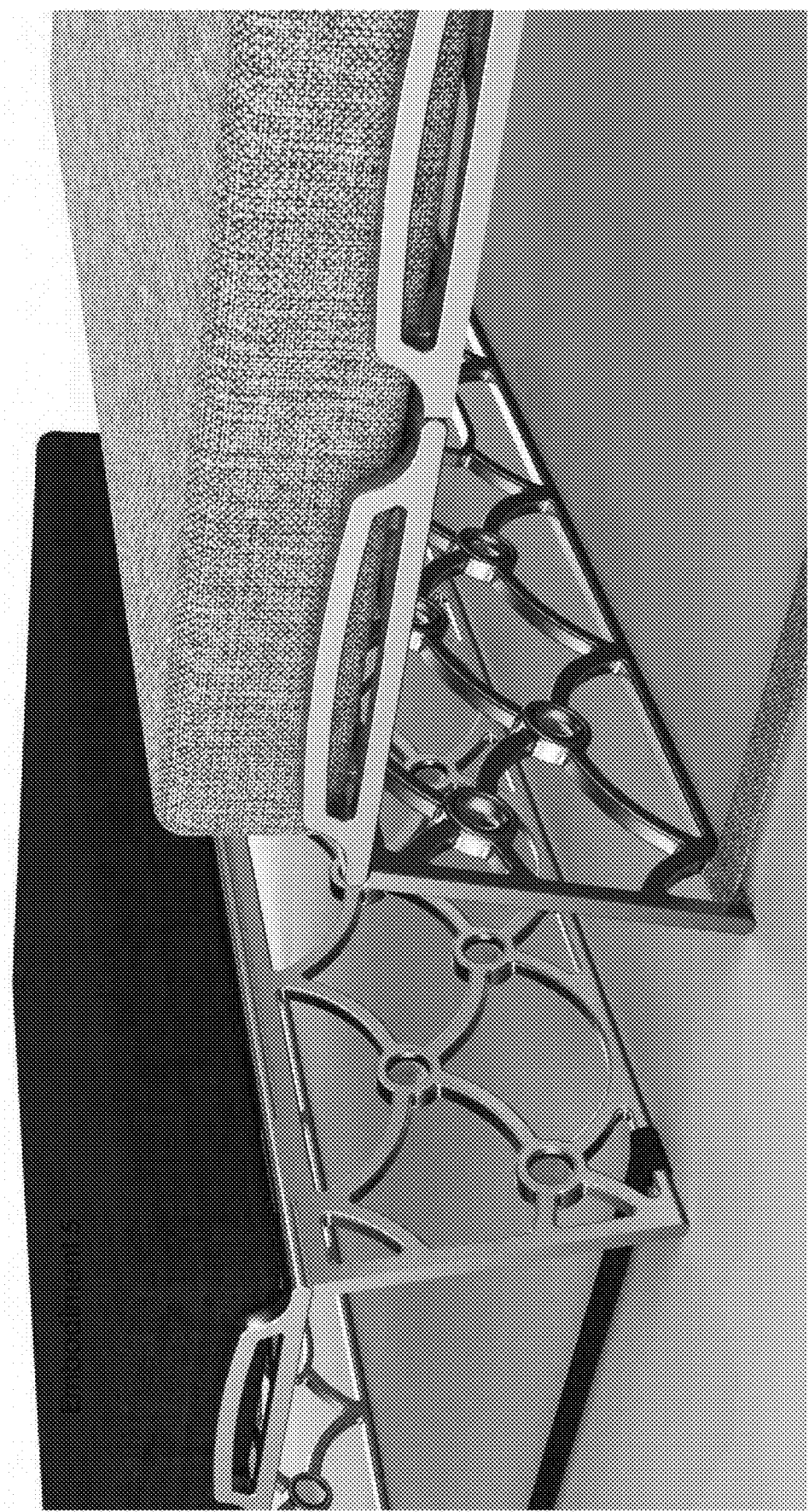
Figure 19R:
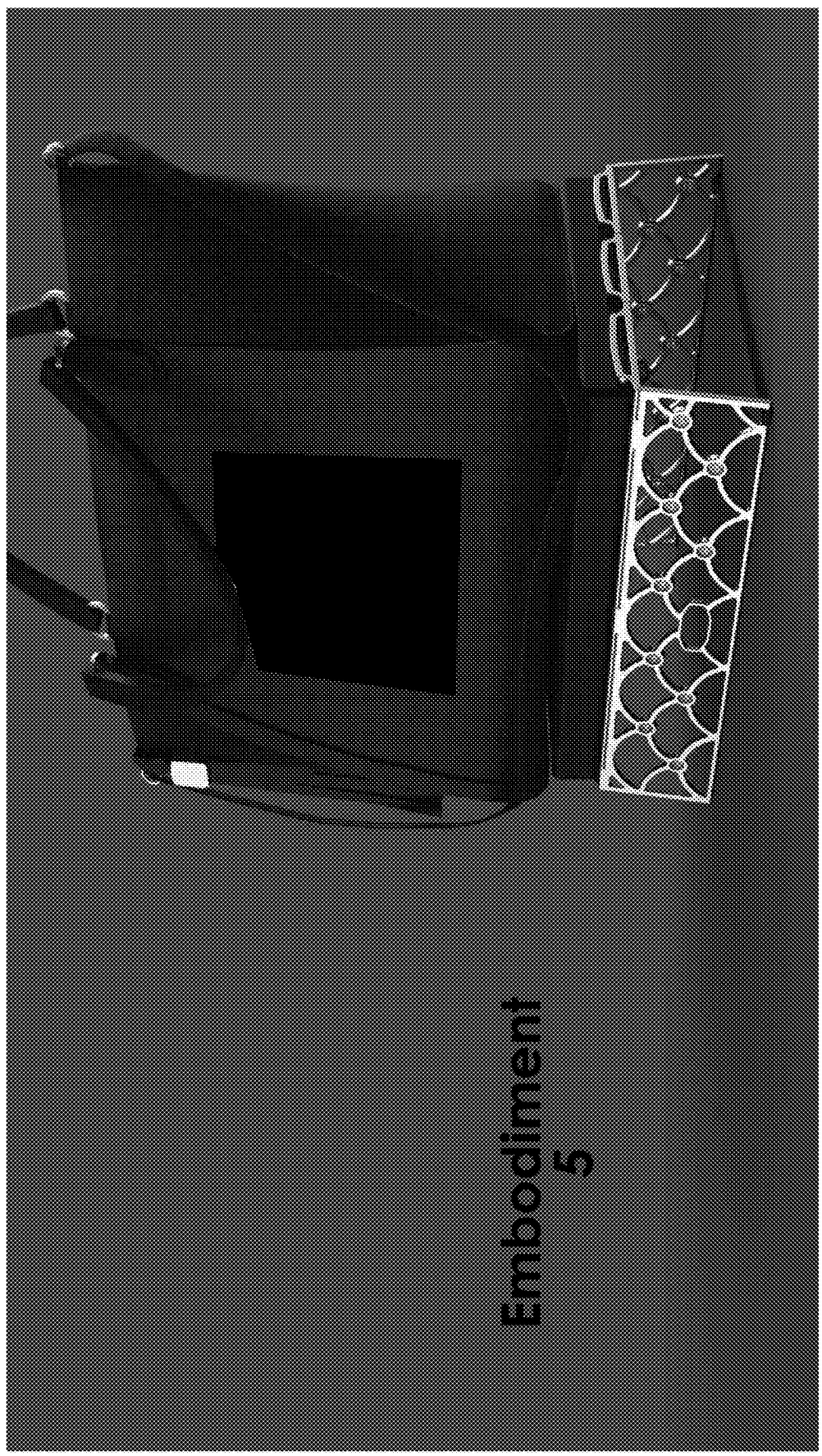
Figure 19S:
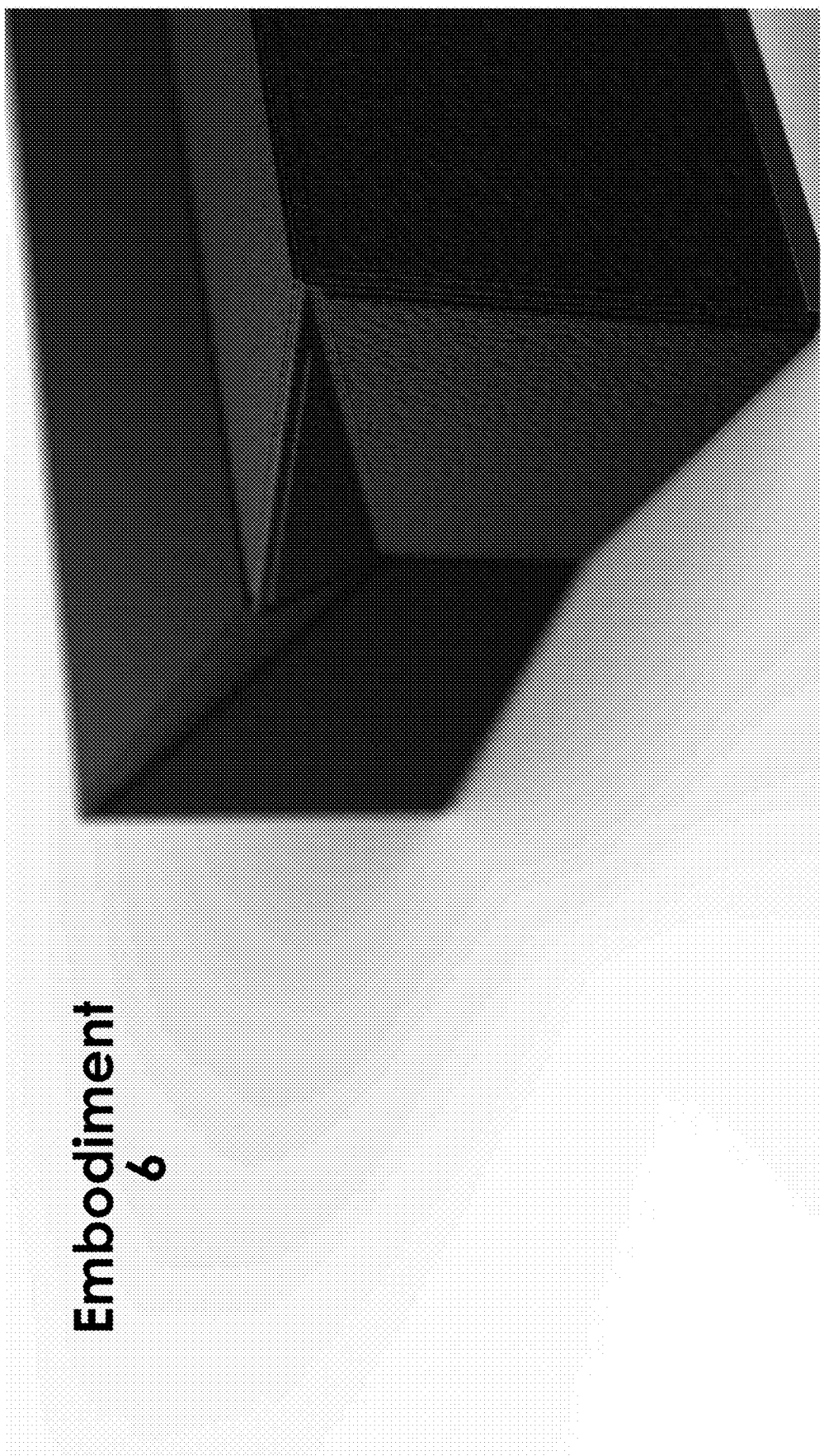
Figure 19T:
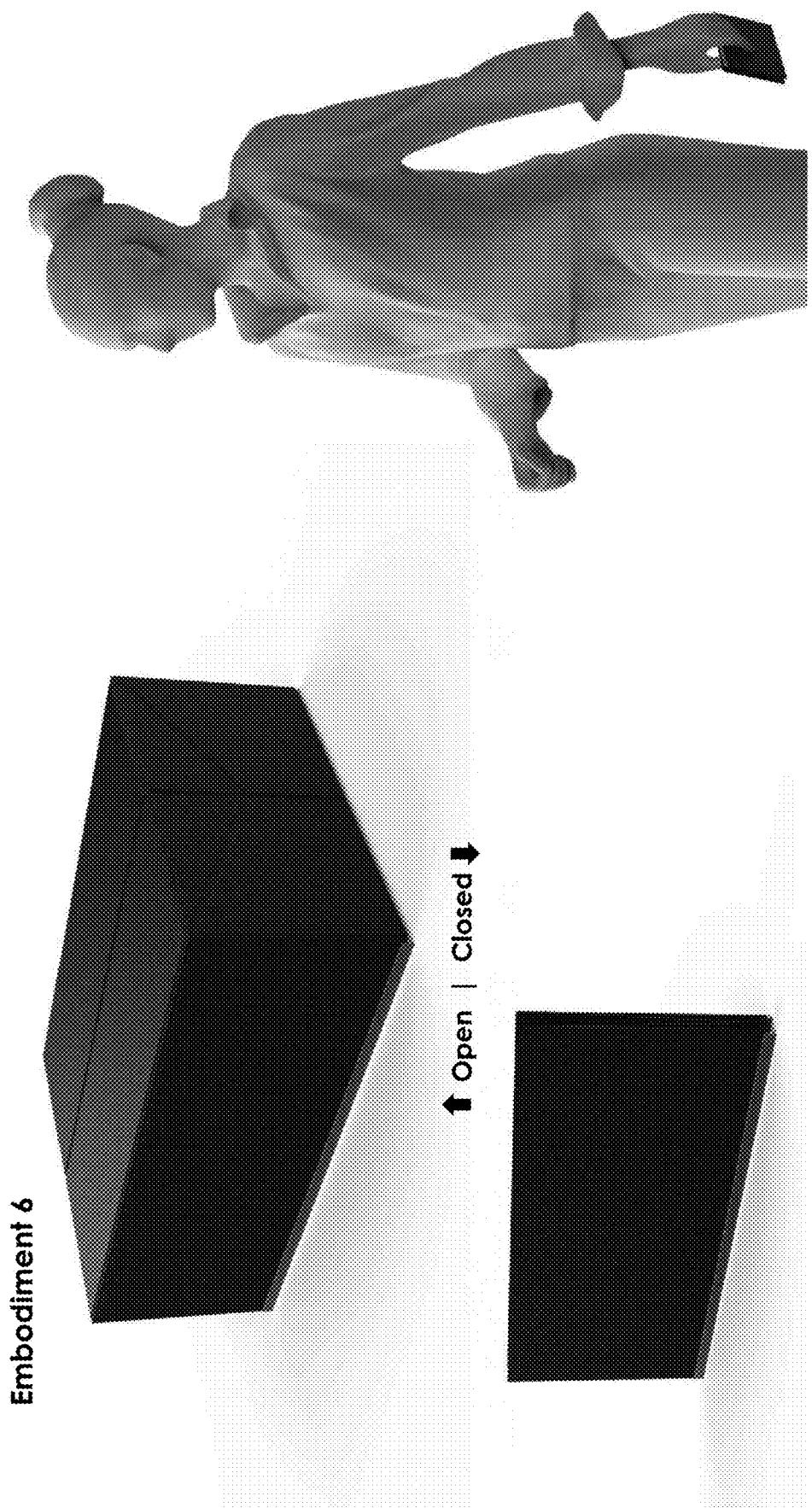
Figure 19V:
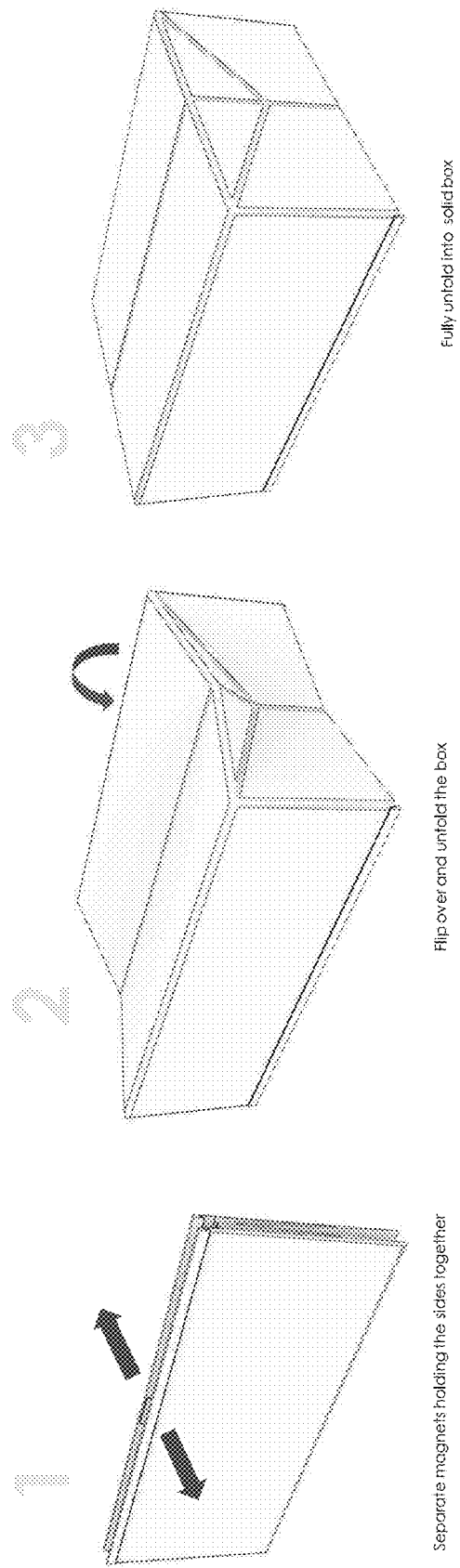
Figure 19W:
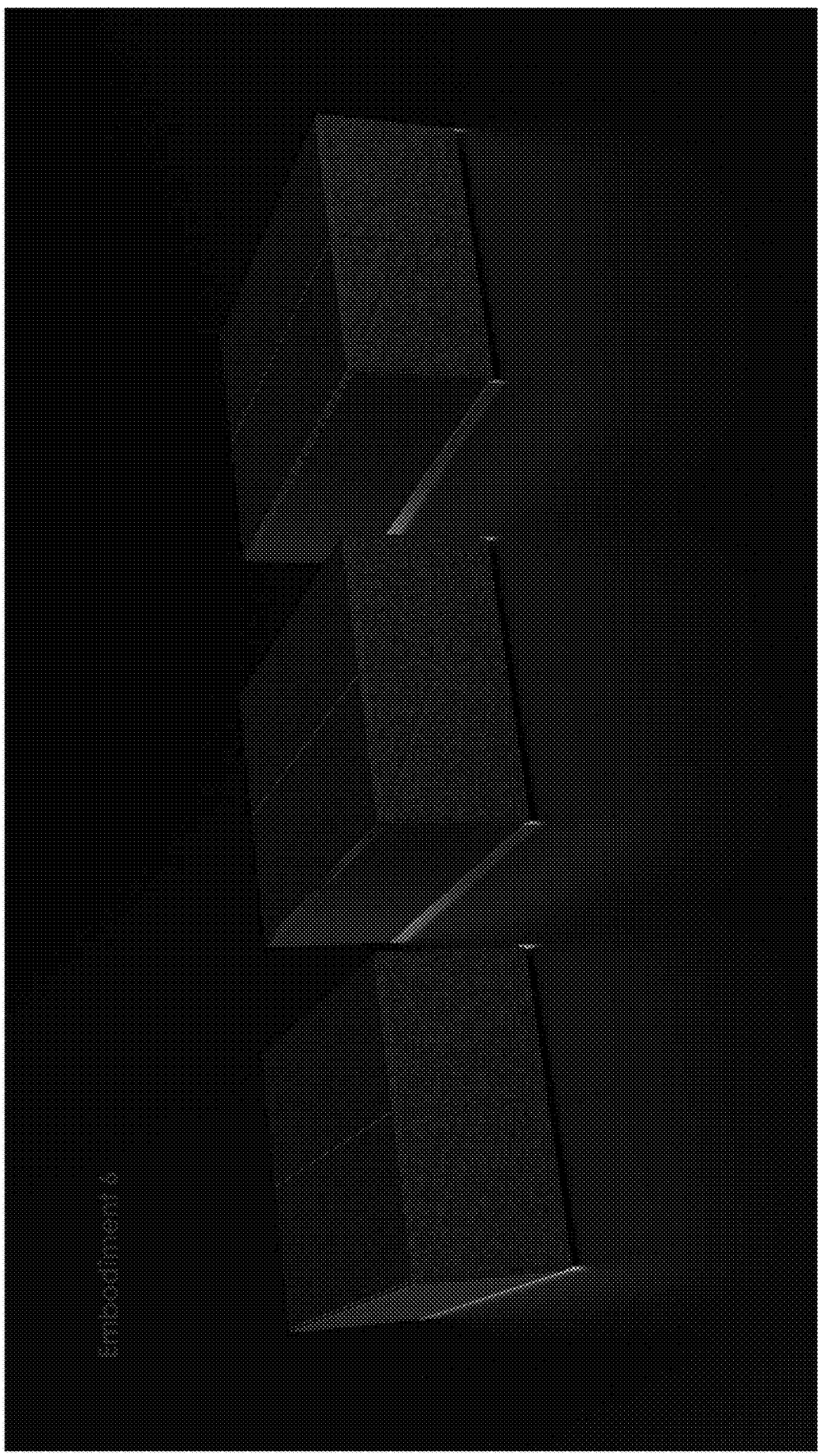
Figure 19X:
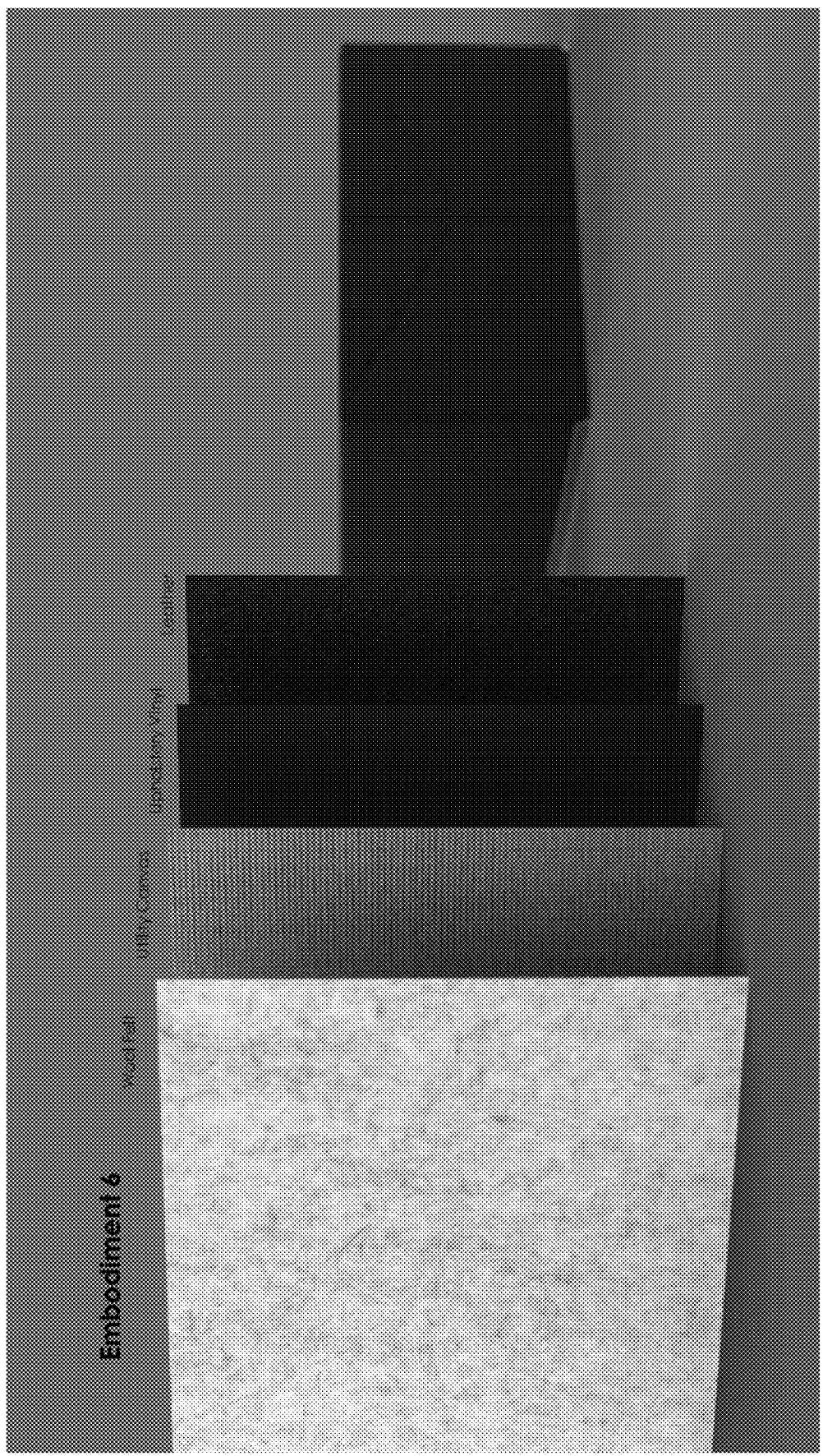
Figure 19Y:
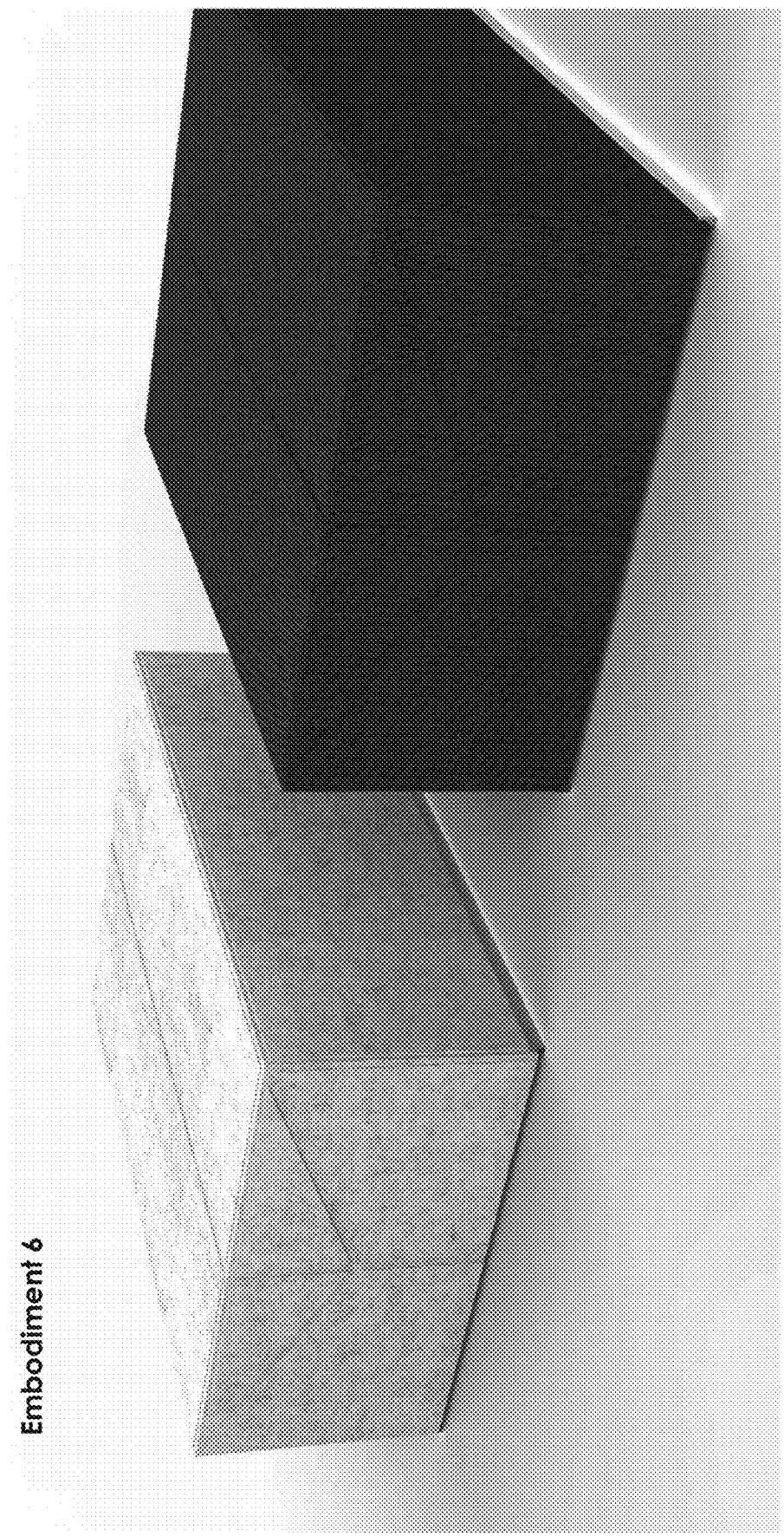
Figure 19Z:

FIGS. 19F-19AAA set forth additional embodiments 1-6 of the product, according to aspects of the disclosure. FIGS. 19F-19N illustrate details related to additional embodiment 1. FIGS. 19O-19T illustrate details related to additional embodiment 2. FIGS. 19U-19CC illustrate details related to additional embodiment 3. FIGS. 19DD-19II illustrate details related to additional embodiment 4. FIGS. 19JJ-19RR illustrate details related to additional embodiment 5. FIGS. 19SS-19ZZ illustrate details related to additional embodiment 6. FIG. 19AAA illustrates additional embodiments 1-6. It should be noted that any detail(s) or feature(s) of any aspects or embodiment discussed throughout this application can be used with any other detail(s) or feature(s) of any other aspect or embodiment discussed throughout this application.

In some aspects of the disclosure, a microban can be used on any of the parts of the product used to hold items to help hinder the growth of bacteria. For any parts of the product with plastic in them (e.g., enclosures (e.g., ABS), clips (e.g., ABS), feet (e.g., rubber)), additives can be mixed in with polymers then the part can be manufactured. For any parts of the product with metal in them (e.g., clasps (e.g., 304 stainless steel), legs (e.g., aluminum)), additives can be mixed into the epoxy, which can be applied after the parts have been manufactured. The following references (all dated May 12, 2020), which are incorporated by reference, discuss additional hygienic features and materials that can be used in any parts of the product used to hold items, according to aspects of the disclosure:

https://materialdistrict.com/article/bacteria-fighting-materials/ https://aabme.asme.org/posts/material-resists-bacteria-prevents-infection-saves-lives https://plasticpartsinc.com/plastic-decorating The following references, which are incorporated by reference, discuss a microban additive that can be used (e.g., with ABS, metal, rubber) and a biocote additive that can be used, according to aspects of the disclosure.

https://www.microban.com/antimicrobial-solutions/applications/antimicrobial-plastics https://www.biocote.com/treatable-materials/plastics-polymers/

The following references, which are herein incorporated by reference, discuss example textures/biomimicry (e.g., sharklet, leaves, leather material over plastic enclosures) that can be used, according to aspects of the disclosure). In some aspects of the disclosure, the product used to hold items can be made using recycled plastic, metal, and/or rubber.

https://www.sharklet.com/ https://www.wired.com/2014/06/empzeal-superhydrophobic-leaf/

It is to be understood that the disclosed subject matter is not limited in its application to the details of construction and to the arrangements of the components set forth in the description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other products, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter. For example, the steps and/or limitations in the specification, drawings, and/or claims may be performed in an order other than the order set forth in the specification, drawings, and/or claims.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A product for holding an item, comprising:
   enclosure shells connected together at peripheral edges forming supporting surfaces such that said supporting surfaces of the enclosure shells form an upright v-shape surface when in a fully open position; and
   legs that connect to the enclosure shells, the legs configured to hold up the upright v-shape surface when opened.

2. The product of claim 1, wherein the legs are configured to open automatically when the product is opened.

3. The product of claim 2, wherein the legs open automatically due to springs.

4. The product of claim 1, wherein the legs are configured to close when a user pushes the legs.

5. The product of claim 4, wherein a bottom of the legs do not need to be touched to close the product.

6. The product of claim 1, wherein a microban additive can be used on part or all of the product.

7. The product of claim 1, wherein a biocote additive can be used on part or all of the product.

8. The product of claim 1, wherein the enclosure shells are connected using a hinge.

9. The product of claim 8, wherein the supporting surfaces of the enclosure shells are locked in a v-shaped structure when the product is in the fully open position.

10. A method of manufacturing a product to hold items, comprising:
    connecting enclosure shells at peripheral edges forming supporting surfaces such that said supporting surfaces of the enclosure shells form an upright v-shape surface when the product is in a fully open position;
    connecting legs to the enclosure shells, the legs configured to hold up the upright v-shape surface when opened.

11. The method of claim 10, wherein the legs are connected to the enclosure shells using a spring.

12. The method of claim 11, wherein the spring is a tension spring.

13. The method of claim 10, wherein the legs are configured to open automatically due to springs.

14. The method of claim 10, wherein the legs are configured to close when a user pushes on the legs.

15. The method of claim 10, wherein the legs are configured such that a bottom of the legs do not need to be touched to close the product.

16. The method of claim 10, wherein a microban additive is added to part or all of the product.

17. The method of claim 10, wherein a biocote additive is added to part or all of the product.

18. The method of claim 10, wherein the enclosure shells are connected using a hinge.

19. The method of claim 18, wherein the supporting surfaces of the enclosure shells are locked in a v-shaped structure when the product is in the fully open position.

\* \* \* \* \*